US009944469B2

(12) United States Patent
Rhodes, II et al.

(10) Patent No.: US 9,944,469 B2
(45) Date of Patent: Apr. 17, 2018

(54) SYSTEMS, METHODS, AND APPARATUS FOR IMPROVED CONVEYOR SYSTEM

(71) Applicant: Rhodes Systems International, Inc., Louisville, KY (US)

(72) Inventors: Arthur Bernard Rhodes, II, Prospect, KY (US); Christopher Michael Valentine, Louisville, KY (US); Dustin Allen Rhodes, West Point, KY (US)

(73) Assignee: Rhodes Patent Holdings, LLC, Louisville, KY (US)

( * ) Notice: Subject to any disclaimer, the term of this patent is extended or adjusted under 35 U.S.C. 154(b) by 14 days.

(21) Appl. No.: 14/818,185

(22) Filed: Aug. 4, 2015

(65) Prior Publication Data

US 2016/0068348 A1 Mar. 10, 2016

Related U.S. Application Data

(63) Continuation-in-part of application No. 14/216,272, filed on Mar. 17, 2014, now abandoned, and a continuation-in-part of application No. 13/223,234, filed on Aug. 31, 2011, now Pat. No. 9,096,383.

(60) Provisional application No. 62/076,968, filed on Nov. 7, 2014, provisional application No. 61/793,030, filed on Mar. 15, 2013.

(51) Int. Cl.
*B65G 35/06* (2006.01)

(52) U.S. Cl.
CPC .................................. *B65G 35/06* (2013.01)

(58) Field of Classification Search
USPC ............................... 198/469.1, 463.1, 474.1
See application file for complete search history.

(56) References Cited

U.S. PATENT DOCUMENTS

| 2,564,090 | A | * | 8/1951 | Ziemann | ................ B65G 37/00 198/584 |
| 4,218,034 | A | * | 8/1980 | Magill | ..................... B64F 1/00 244/114 R |
| 4,944,228 | A | * | 7/1990 | Rhodes | .................... B61B 10/04 104/172.2 |
| 4,964,001 | A | * | 10/1990 | Hirayama | ............... G11B 15/07 360/94 |
| 2015/0353059 | A1 | * | 12/2015 | Gabrysch | ................ B60S 3/004 198/722 |

\* cited by examiner

*Primary Examiner* — Gene O Crawford
*Assistant Examiner* — Lester III Rushin
(74) *Attorney, Agent, or Firm* — Duncan Galloway Egan Greenwald, PLLC; Kevin T. Duncan

(57) ABSTRACT

The invention relates generally to conveying systems, for moving work pieces from work station to work station including conveyors which generally move at a constant speed and include load carrying units which can be coupled for movement therewith between work stations and uncoupled from the conveyor so that they will be stationary at the work stations while work is done on a work piece carried by the load carrying units. More particularly, the present invention pertains to improved systems, methods, and apparatuses for providing locomotion and control to a conveyor system including surface-mounted drive system and adjustable, automatic take-up system with floating drive chassis. The present invention also pertains to elevated conveyor systems comprising many of the same components as the surface-mounted conveyor systems.

16 Claims, 45 Drawing Sheets

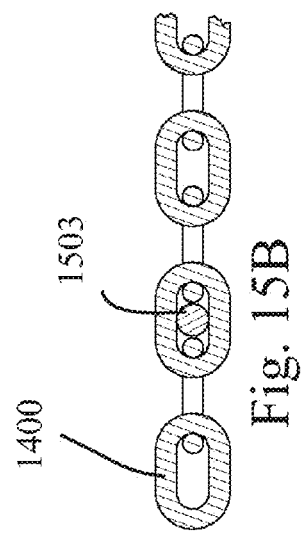
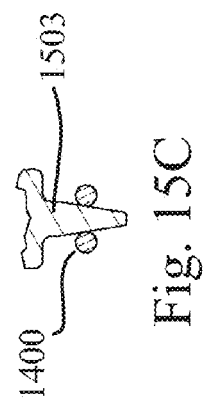
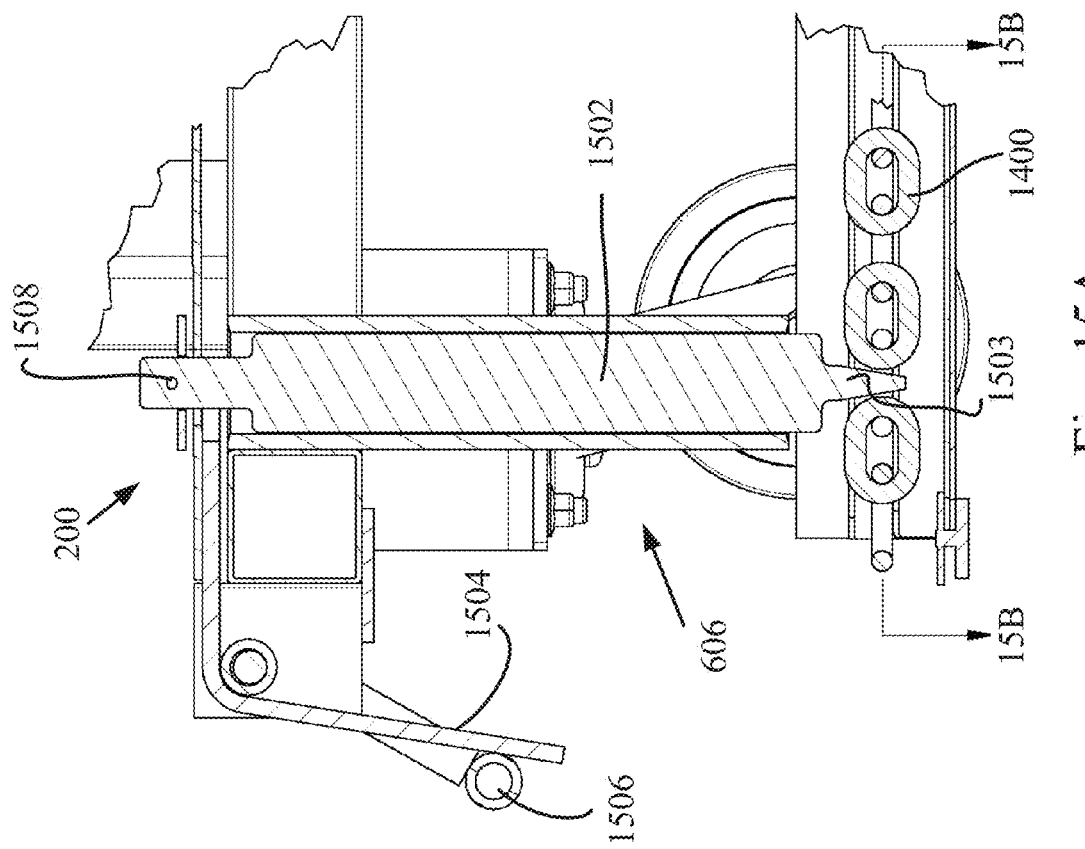

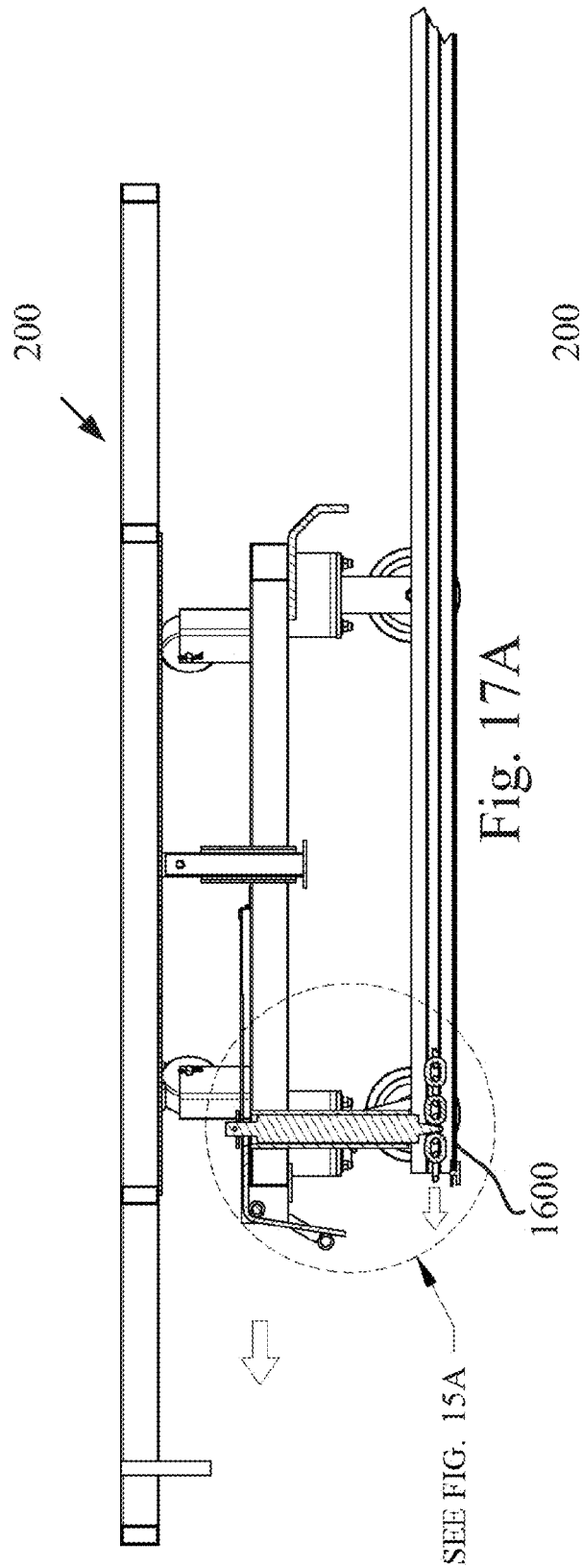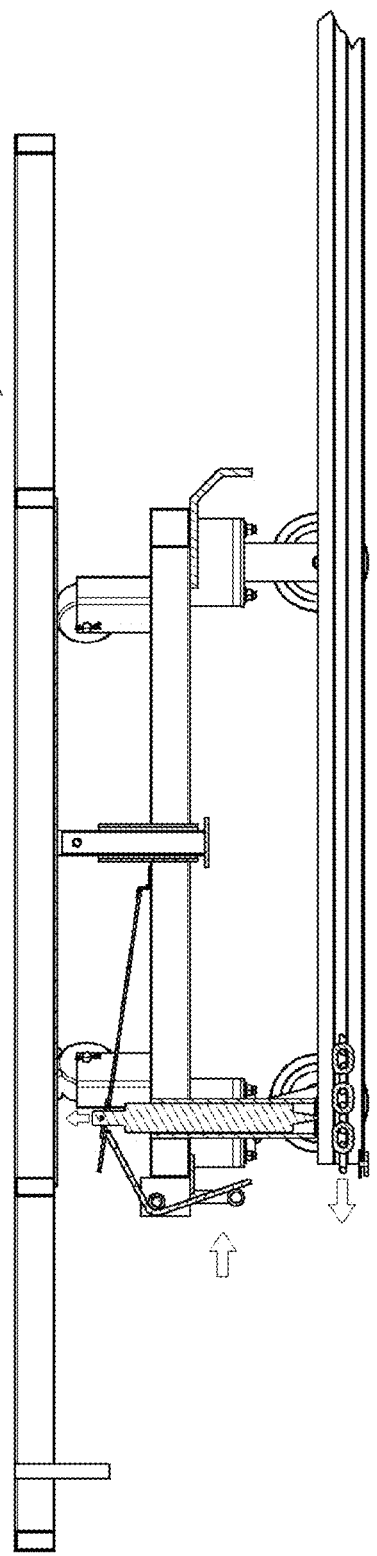

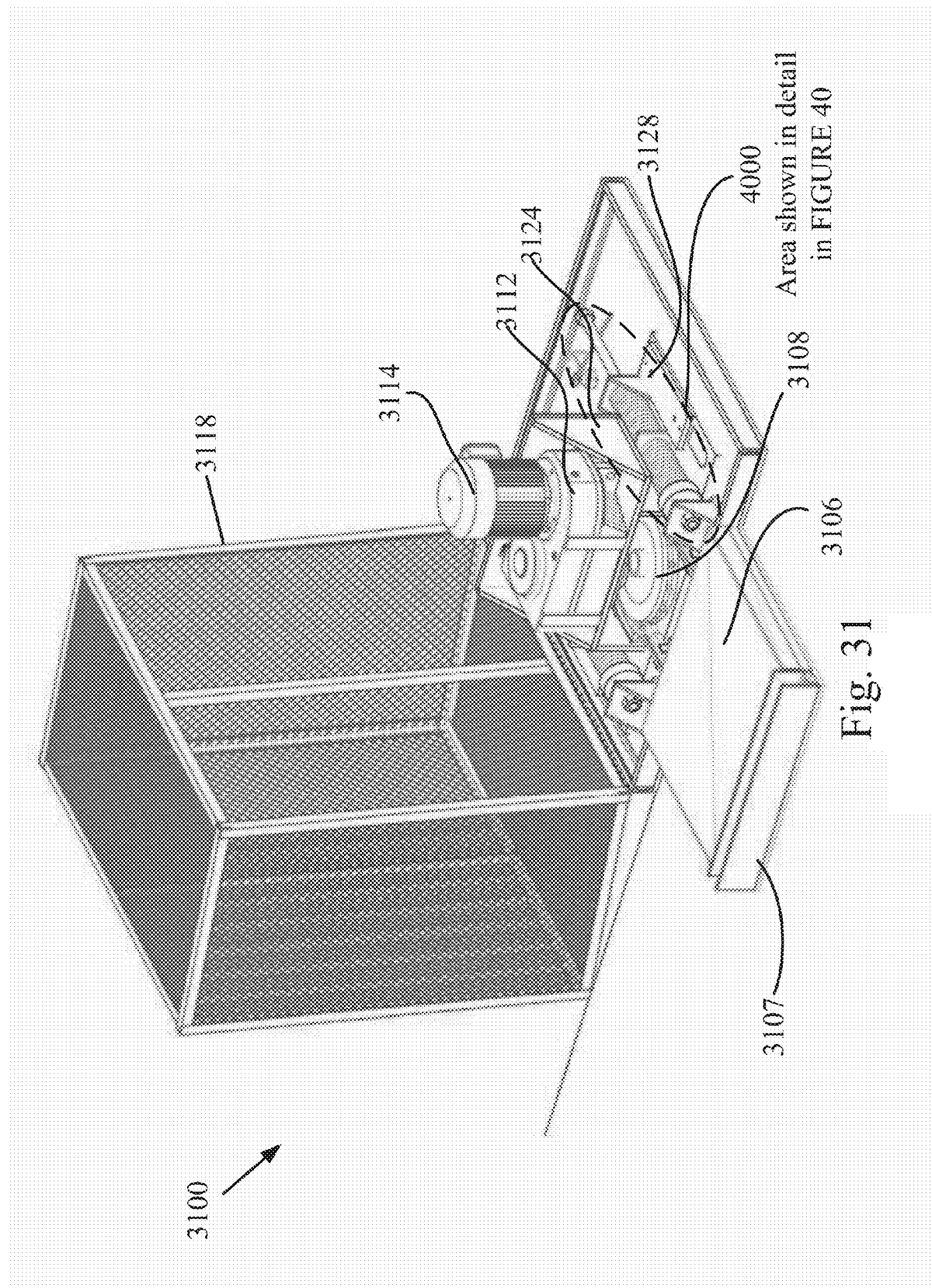

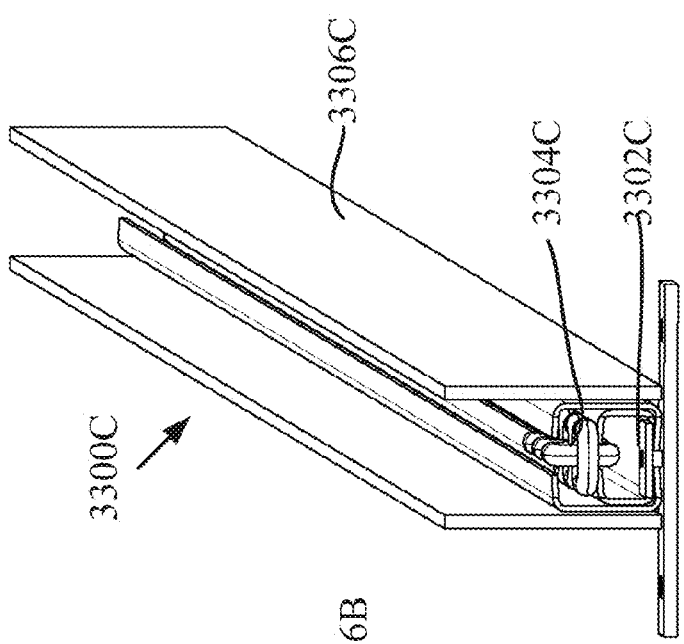
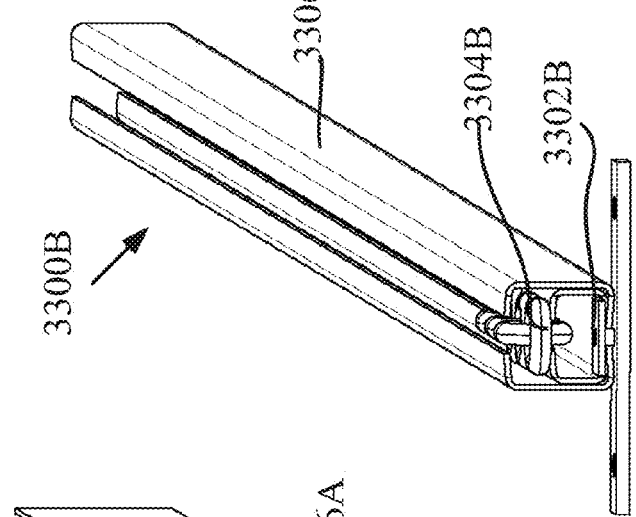
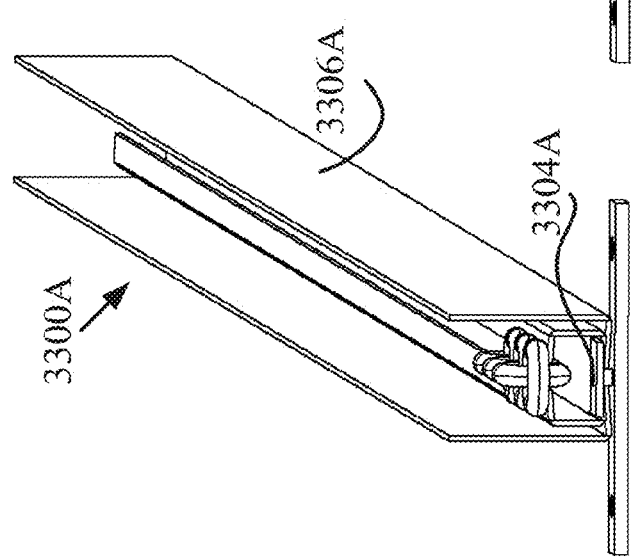

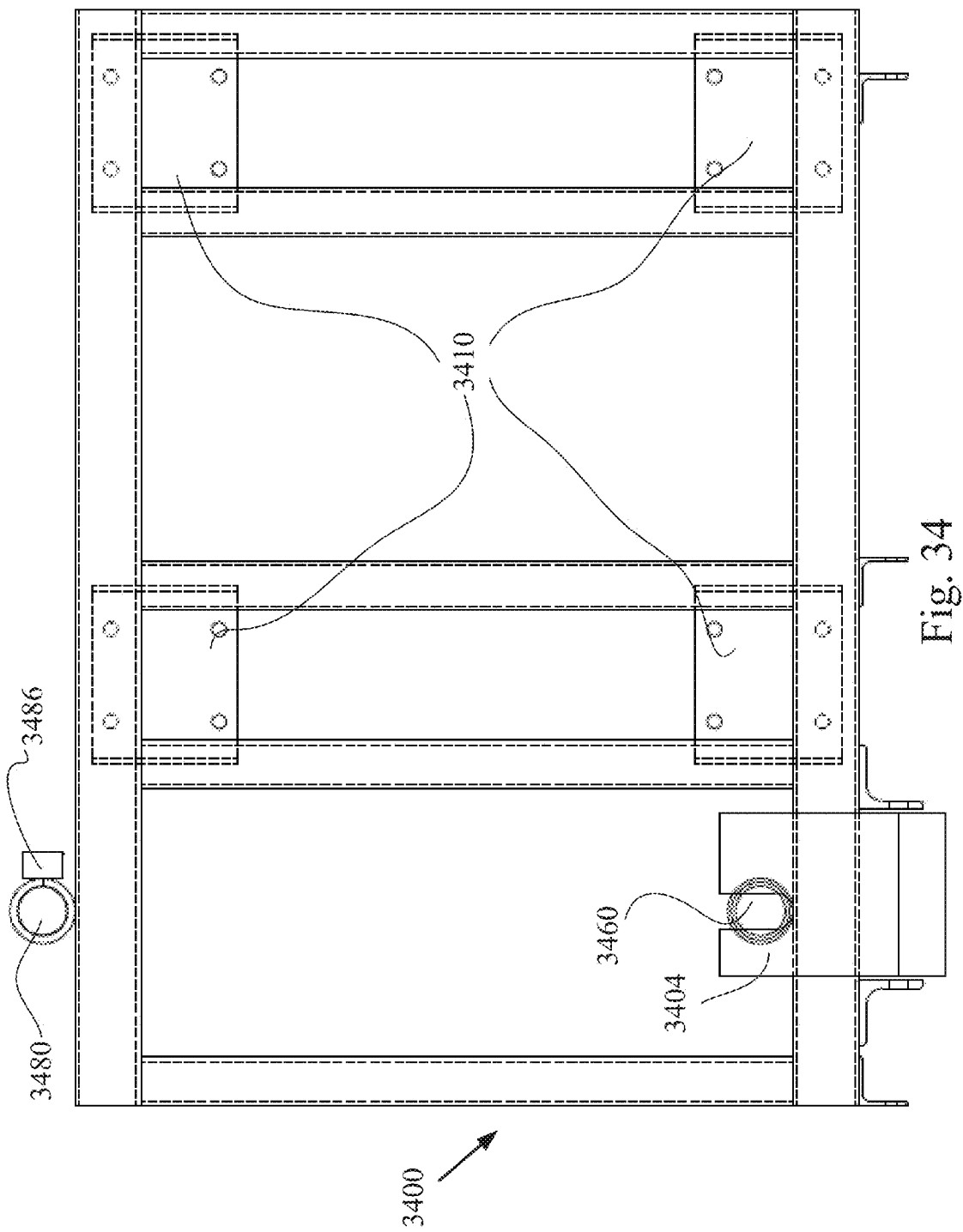

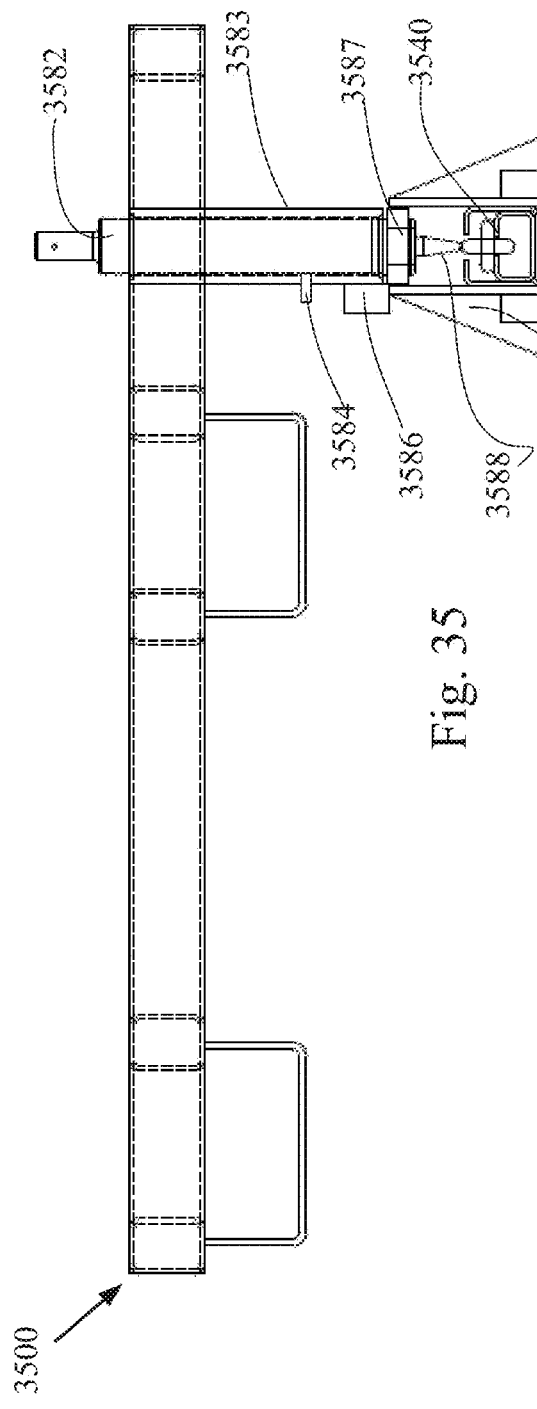
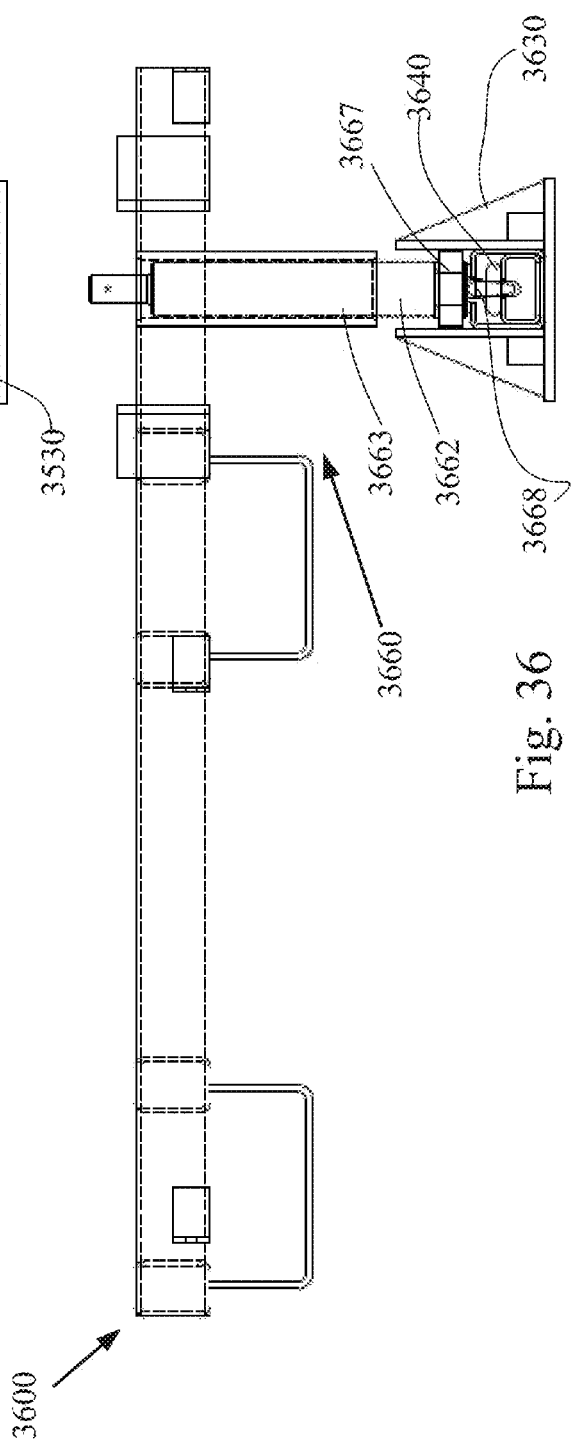

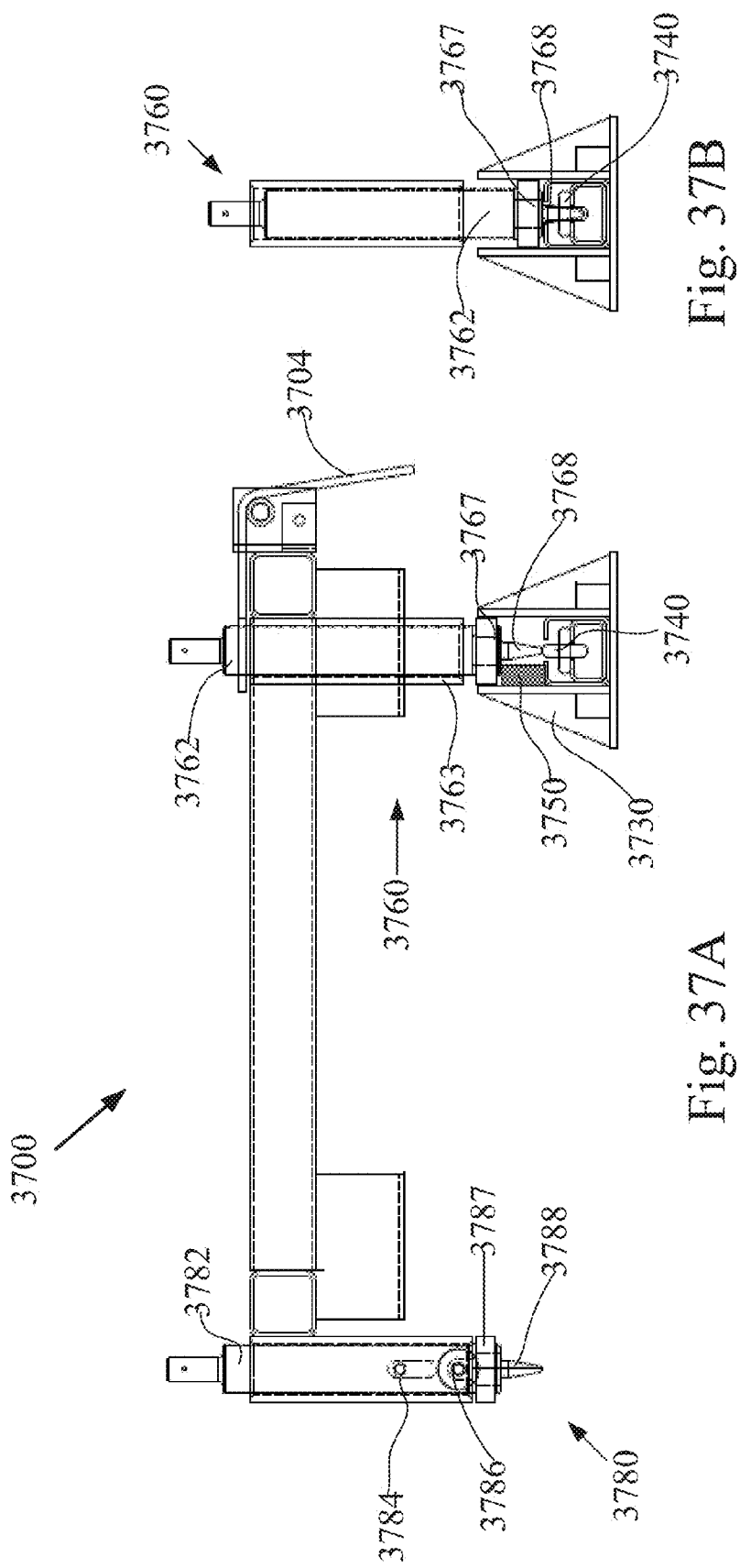

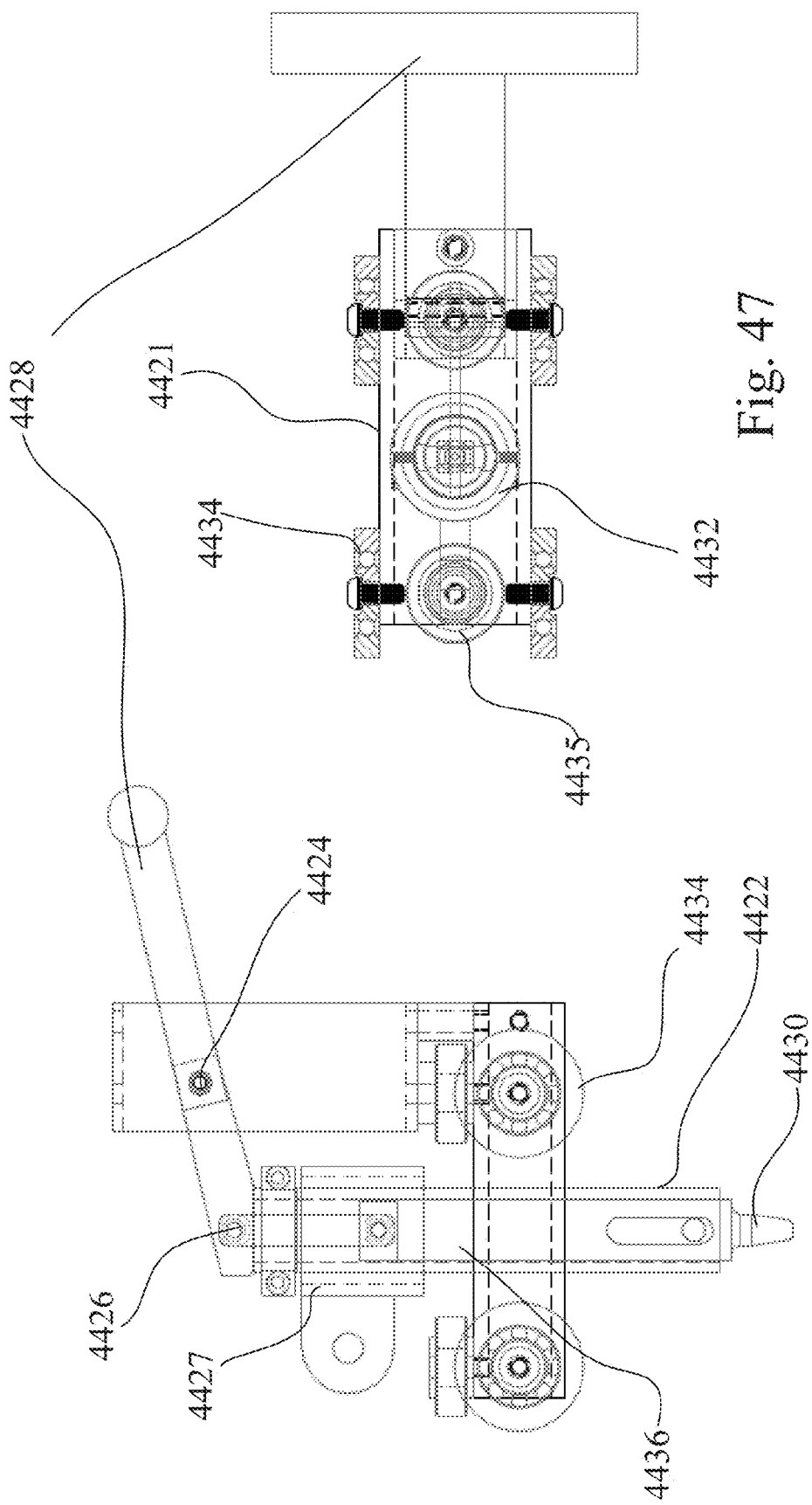

SYSTEMS, METHODS, AND APPARATUS FOR IMPROVED CONVEYOR SYSTEM

CROSS-REFERENCE TO RELATED APPLICATION

The present invention claims benefit of priority to and is a continuation-in-part of each of the following: U.S. Provisional Patent Application 61/793,030, with a filing date of Mar. 15, 2013, and entitled "SYSTEMS, METHODS, AND APPARATUS FOR IMPROVED CONVEYOR SYSTEM DRIVE" (Rhodes et al.); U.S. patent application Ser. No. 14/216,272, with a filing date of Mar. 17, 2014, and entitled "SYSTEMS, METHODS, AND APPARATUS FOR IMPROVED CONVEYOR SYSTEM DRIVE" (Rhodes et al.); U.S. Provisional Patent Application 62/076,968, with a filing date of Nov. 7, 2014, and entitled "SYSTEMS, METHODS, AND APPARATUS FOR SYNCHRONOUS SET CENTER ENDLESS CHAIN DRIVE SYSTEM" (Rhodes et al.); and U.S. patent application Ser. No. 13/223,234, with a filing date of Aug. 31, 2011, and entitled "SYSTEMS, METHODS, AND APPARATUS FOR IMPROVED CONVEYOR SYSTEM DRIVE" (Rhodes), issued as U.S. Pat. No. 9,096,383 on Aug. 4, 2015, each of which is incorporated herein in the entirety.

FIELD OF THE INVENTION

The invention relates generally to conveying systems, and various related components, for moving work pieces from work station to work station including conveyors which generally move at a constant speed and include load carrying units which can be coupled for movement therewith between work stations and uncoupled from the conveyor so that they will be stationary at the work stations while work is done on a work piece carried by the load carrying units. More particularly, the present invention pertains to improved systems, methods, and apparatuses for providing locomotion and control to a conveyor system including surface-mounted drive system and adjustable, automatic take-up system with floating drive chassis, without losing center on the load carrying units.

BACKGROUND OF THE INVENTION

In the manufacturing industry today, many manufacturers utilize conveyor systems for easily and quickly moving products through various stages of the manufacturing process. For example, in the furniture industry, a piece of furniture may be placed on a conveyor cart connected to a conveyor system which passes through sanding stations, paint booths, finishing stations, hardware stations, etc. Existing conveyor systems typically consist of a series of conveyor carts upon which various items may be placed, a drive chain housing secured to the floor of the manufacturing facility through which a drive chain passes which pulls the conveyor carts, and a drive mechanism for providing locomotion to the chain and thereby moving the conveyor carts.

Examples of known conveying systems are set forth in a number of U.S. patents including U.S. Pat. Nos. 4,438,702; 4,638,740; 4,644,869; 4,770,285; 4,944,228; 4,947,978; 5,065,678; 5,299,680; 5,368,152; 5,538,126; 5,549,050, which Applicant hereby incorporates by reference in their entirety. In these conveyor systems, the load carrying units are provided with vertically movable pins for engaging and disengaging with movable endless chains which move at a constant and continuous speed. Many different means have been used for moving these vertical pins from an engaging to a disengaging position and problems have been encountered in maintaining these pins in a disengaged position as the endless chain continues to move beneath the pins. U.S. Pat. Nos. 4,944,228; 5,368,152; 5,538,126; and 5,549,050, which Applicant hereby incorporates by reference in their entirety, teach various means for stabilizing the engaging pins in a disengaged position.

Other embodiments of these conveying systems include overhead conveyers for propelling a carrier moveably along a track by an endless conveyor chain disposed within the track. The carrier is detachably connected to the chain and includes an uncoupling assembly for detaching the carrier from the chain. U.S. Pat. Nos. 6,378,440; 6,827,200; and 6,843,358, which Applicant hereby incorporates by reference in their entirety, relate to various overhead conveyers.

In typical conveying system configurations, the drive mechanism of current conveyor systems must be placed below the level of the drive chain (i.e., below the surface of the floor). To do this, a large cavity must be created in the manufacturing room floor directly adjacent to and beneath the drive chain housing and drive chain. This cavity houses the drive mechanism. Such a configuration is required in current conveyor systems because as the system operates, the drive chain wears and settles, thus creating excess chain or "slack" in the drive chain. By placing the drive mechanism below the drive chain housing (i.e., below the surface of the floor), excess chain may be collected in the cavity. Normally, the excess chain has a tendency to bind up and become tangled; however, allowing the chain to collect in the cavity allows gravity to act on the excess chain and provide the tension necessary to prevent the excess chain from binding up or tangling. That is, the excess chain exiting the drive mechanism simply hangs freely until pulled up into the drive chain housing.

One problem with mounting the drive mechanism below the drive chain housing in a large floor cavity is that creating the sub-surface cavity is difficult, fixed and expensive. The cavity may be several feet across in width and may extend several feet into the floor beneath the drive chain housing. As most manufacturing facility floors are made of concrete or other similar material, creating such a large cavity in this type of material is both laborious and expensive. Further, the placement of the cavity may be dictated by the specific design of the manufacturing facility floor. For instance, sub-surface pipes, electrical wiring, or other objects may prevent the cavity from being located in certain otherwise desirable locations. As a result, a manufacturing line may need to be re-designed or otherwise modified to account for the placement of the drive mechanism and its cavity, adding yet additional costs and delaying installation of the conveyor system.

An additional issue with existing drive systems is that they may "lose center." A system loses center when the tow pin for a cart on the chain drive system drifts one or more links from its original starting chain link when moving through the drive portion of a conveyor system. Methods including using "pushers" or other mechanical means to keep a cart "on center" do not completely correct for the problem.

Keeping center is critical for timing sensitive operations such as automotive assembly. In such operations, the exact distance between carts on the conveyor system must be kept at all times to ensure that carts spend the correct amount of time at any given assembly station or point on the conveyor system. If center is not kept, the carts may drift apart or together, and may not arrive at assembly stations at the correct time, or may spend too little or too much time at any given point on the conveyor system.

What is needed is a solution to address the various problems associated with current conveyor systems, including the sub-surface drive mechanism of current conveyor systems and further including the tendency of current drive systems to "lose center" when in operation.

SUMMARY OF THE INVENTION

The present invention provides systems, methods, and apparatuses relating to improved conveying systems, and in particular to providing locomotion preferably using a surface mounted drive mechanism for driving a drive chain. Generally, the conveying system of the present invention is designed to adapt to most manufacturing needs, for example, from furniture manufacturing and finishing to marine and automotive engines. The versatility of the conveying system of the present invention is achieved by the use of a special tow or "log" chain which allows the carts to be placed on practically any center distance required for a particular application and the application of a front and a rear tow pin keeps load carrying units on the system at an exact center. The exact center keeps the load carrying units aligned in the center of a link of the tow chain and an exact distance from one another. The exact distance is necessary to keep the load carrying units moving through the conveyor system at exact and predictable distances and times. The on-center nature of the system is also needed to keep the load carrying units at certain points in the system for exact periods of time.

In one embodiment this chain may be a Rhodes ⅜" calibrated drive chain or drive or log chain of a similar configuration and having similar features. This combined with adjustable speed ranging from a generous FPM range allow for the right amount of time for each operation to be completed properly, and not the hurry-up, here-comes-the-next-part method that can cause costly mistakes and poor overall quality. These features are incorporated with cart delays which can be placed in work stations, spray booths, drying ovens or practically anywhere on the system as required by particular needs.

The cart as shown in FIG. 2 includes wheels or casters on which is supported a frame, typically rotatable about an axis such as for accumulation or "close-pack" as described elsewhere. On the frame of the cart, a platform rests on which articles, such as fixtures and products (e.g., furniture to be treated or painted in a finishing process), are supported for transport via the conveying system to various stations or locations along a fabrication or manufacturing process. A towline conveyor propels the cart along the conveyor line or circuit from station to station. The log chain is made from a calibrated, close tolerance design to mate with a pin or "tow pin" that extends, typically downwardly, from the cart. The cart includes a tow pin assembly that supports and guides the pin during operation.

Various configurations of tow pins may be used with the tow pin assembly connected to the cart and the log chain of the conveyor system. The log chain links or loops are designed to match the dimensions of the tow pin engagement head so as to promote disengagement and to prevent the tow pin from becoming "stuck" in the log chain link, which causes undesired effects along the conveyor system. The tow pin may be mounted in several configurations on the cart assembly including side mounted and center mounted configurations. In a side mounted configuration the tow pin may be used in conjunction with a cam pin to decrease the chance of binding or derailment and to provide additional stability to the cart assembly.

Additional embodiments of the present invention may include a pusher station, an anti-backup component that provides a means to prevent roll-back of a cart during conveyor operation, an accumulator or close-pack configuration, a pin turner station to more effectively make the cart platform swivel or rotate about an axis (e.g., 90 degrees) to achieve a desired placement or positioning of the product begin carried on the cart for finishing, and an above-ground drive assembly for providing locomotion to the conveying system, among other components as described herein.

In a first embodiment, the present invention provides a conveyor drive system comprising: a drive motor and drive gear, the drive motor and drive gear mounted to a free-floating frame; a conveyor tow chain; a conveyor track configured to house the conveyor tow chain; and an automatic tensioning assembly, the automatic tensioning assembly coupled to the free-floating frame and adapted to automatically increase the tension on the conveyor tow chain.

In a second embodiment, the present invention provides a conveying system, comprising: at least one load carrying unit having a tow pin assembly, the tow pin assembly further comprising a tow pin configured to link to and de-link from a conveyor tow chain, and a means for engaging and disengaging the tow pin; a conveyor track configured to house the conveyor tow chain; and a drive assembly configured to receive the tow chain and to provide locomotion to the conveyor tow chain, and further comprising at least one tensioning means for automatically tensioning the conveyor tow chain.

In addition, the first embodiment of the present invention may further include the following features. The tensioning means comprises at least one spring. An accumulation assembly for accumulating a plurality of load carrying units, the accumulation assembly having a first stopping arm adapted to engage the tow pin assembly for causing a load carrying unit to stop at a defined location. A second stopping arm adapted to engage the tow pin assembly for causing a second load carrying unit to stop at a second defined location. The tow pin further comprises a series of indentation rings about the circumferential surface, the indentation rings being configured to facilitate the application of a lubricant. A turning assembly for rotating an upper portion of the at least one load carrying unit, the turning assembly further comprising: a pin turning assembly configured to receive a turning pin on the portion of the at least one load carrying unit and further comprising a pin turning track for guiding the turning pin; a plurality of wheels configured to stabilize a lower portion of the at least one load carrying unit; and at least one tensioning wheel configured to provide a tensioning force against the lower portion of the at least one load carrying unit, wherein the at least one tensioning wheel is positioned on an opposite side of the lower portion of the at least one load carrying unit as the plurality of wheels. A transfer station.

In a third embodiment, the present invention provides a drive assembly for providing locomotion to a conveyor tow chain, comprising: a drive motor configured to turn a drive gear, the drive gear being configured to receive a conveyor tow chain; and a spring having a first end and a second end, the first end being connected to the drive motor and the second end being connected to a mount surface, wherein the spring applies a force between the drive motor and the mount surface to provide tension to the conveyor tow chain. In addition, the second embodiment of the present invention may further include the following features. A second spring having a first end and a second end, the first end being connected to the drive motor and the second end being connected to the mount surface.

In a fourth embodiment, the present invention provides a conveyor system comprising: a conveyor track comprising a tow chain guide configured to support a conveyor tow chain; a load carrying unit having a tow pin assembly including a tow pin configured to engage and disengage with the tow chain; a surface-mounted drive assembly configured to engage and propel to the tow chain without the use of a separate drive chain, the surface-mounted drive assembly comprising: a floating-chassis take-up system; and an automatic tensioner; wherein the floating-chassis take-up system and automatic tensioner operate to automatically maintain a desired tension in the tow chain. The embodiment may further comprise the conveyor wherein the floating-chassis take-up system further comprises a set of cam guides and at least one tensioning spring; wherein the floating-chassis take-up system further comprises a set of guide rods; wherein the floating-chassis take-up system comprises a means for tensioning selected from the group consisting of: a set of springs; a set of hydraulic tensioners; a set of pneumatic tensioners; and a set of air-over-oil tensioners; wherein the drive assembly further comprises a variable speed motor; an accumulation assembly for accumulating a plurality of load carrying units; a turning assembly for rotating an upper portion of the at least one load carrying unit; a drive transition configured to direct the tow chain into the drive assembly; wherein the drive transition is mounted below the surface; and wherein the drive transition comprises a first set of pulleys configured to direct the tow chain below the surface on which the drive assembly is mounted and a second set of pulleys configured to direct the tow chain into the drive assembly whereby a load carrying unit having a center mounted tow pin may pass over the drive transition.

In a fifth embodiment, the present invention provides a drive assembly comprising: a drive motor drivingly coupled with a drive gear unit, the drive gear unit being configured to engage and propel a tow chain in a conveyor system; a floating-chassis comprising a motor mount, and a set of guide cams configured to guide the floating-chassis along a take-up system, the take-up system comprising an automatic tensioner and a set of guide rods; and wherein the drive assembly is configured to be mounted on a surface and whereby the tow chain is propelled along a common plane with the drive assembly. The embodiment may further comprise wherein the automatic tensioner is selected from the group consisting of: a set of springs; a set of hydraulic tensioners; a set of pneumatic tensioners; and a set of air-over-oil tensioners; wherein the drive assembly further comprises a variable speed motor; wherein the drive motor is configured to provide locomotion to the tow chain without using a separate drive chain; wherein the take-up system does not utilize or generate a slack portion of the tow chain; and wherein the set of guide rods are threaded and configured to adjust the tension of the automatic tensioner.

In a sixth embodiment, the present invention provides A conveyor system comprising: an elevated conveyor track comprising a tow chain guide configured to support a conveyor tow chain; a hanging load carrying unit having a tow pin assembly including a tow pin configured to engage and disengage with the tow chain; and a drive assembly configured to engage and propel to the tow chain without the use of a separate drive chain, the surface-mounted drive assembly comprising: a floating-chassis take-up system; and an automatic tensioner; wherein the floating-chassis take-up system and automatic tensioner operate to automatically maintain a desired tension in the tow chain. The embodiment may further comprise wherein the elevated conveyor track includes an at least partially enclosed housing configured to retain oils and lubricants to prevent dripping during conveyor system operation; wherein the floating-chassis take-up system further comprises: a set of cam pin guides; a set of guide rods; and a set of tensioners; wherein the set of tensioners are of a type selected from the group consisting of: a set of springs; a set of hydraulic tensioners; a set of pneumatic tensioners; and a set of air-over-oil tensioners; an accumulation assembly for accumulating a plurality of hanging load carrying units; and a turning assembly for rotating a lower hanging portion of the at least one hanging load carrying unit.

In a seventh embodiment, the present invention provides a conveyor system comprising: a conveyor track comprising a tow chain guide configured to support a conveyor tow chain and further comprising an inclined wall portion adapted to raise and lower a tow pin; a load carrying unit having a front tow pin assembly including a front tow pin configured to engage and disengage with the tow chain and a rear tow pin assembly including a rear tow pin configured to engage and disengage with the tow chain; a drive assembly configured to engage and propel to the tow chain without the use of a separate drive chain, the surface-mounted drive assembly comprising: a floating-chassis take-up system; and an automatic tensioner; wherein the floating-chassis take-up system and automatic tensioner operate to automatically maintain a desired tension in the tow chain; and wherein the front tow pin is engaged and disengaged from the tow chain by an interior disengaging assembly, and the rear tow pin is engaged and disengaged from the tow chain by the inclined portion of the conveyor track.

The conveyor system may further comprise an in-ground drive crossover, a set of tensioner adjustment bolts, a rear tow pin comprising a cam pin having a bearing, front and rear tow pins comprising guide bearings, a rear tow pin comprising a guide pin, and a set chain pitch.

BRIEF DESCRIPTION OF DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 14A depicts a section of tow chain while

FIGS. 15A-15C depict various views of a pin assembly and a tow chain.

FIGS. 17A and 17B depict a cart with a tow pin assembly both linked (17A) and delinked (17B) from a tow chain.

FIGS. 31-43 illustrate exemplary embodiments and components of the synchronous set center endless chain drive conveyor system invention.

FIG. 31 depicts a perspective view of an embodiment of an on-surface (or above ground) drive assembly according to the present invention.

FIGS. 33A-33C depict embodiments of various cross sections of tow chain, track, and UHMW according to the present invention.

FIG. 34 depicts a plan view of an embodiment of a cart with a front tow pin and rear tow pin according to the present invention.

FIG. 35 depicts a lateral cross-section view of an embodiment of a cart with a rear tow pin according to the present invention.

FIG. 36 depicts a lateral cross-section view of an embodiment of a cart with a front tow pin according to the present invention.

FIGS. 37A and 37B depict a lateral cross-section view of an embodiment of a cart showing the front tow pin in an engaged and disengaged state according to the present invention.

FIG. 38 depicts a plan view of an embodiment of a drive transition assembly comprising a crossover and drive track portion according to the present invention.

FIG. 39 depicts an embodiment of the operation of engaging and disengaging the front and rear tow pins of a load carrying unit according to the present invention.

FIG. 40 depicts a plan view of an embodiment of the take-up system according to the present invention.

FIGS. 41-43 depict views of an embodiment of an in-ground drive transition assembly comprising an in ground crossover according to the present invention.

FIGS. 44-47 illustrates a high-line (or "hi-line") embodiment of the present invention conveyor system.

DETAILED DESCRIPTION OF PREFERRED EMBODIMENT

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
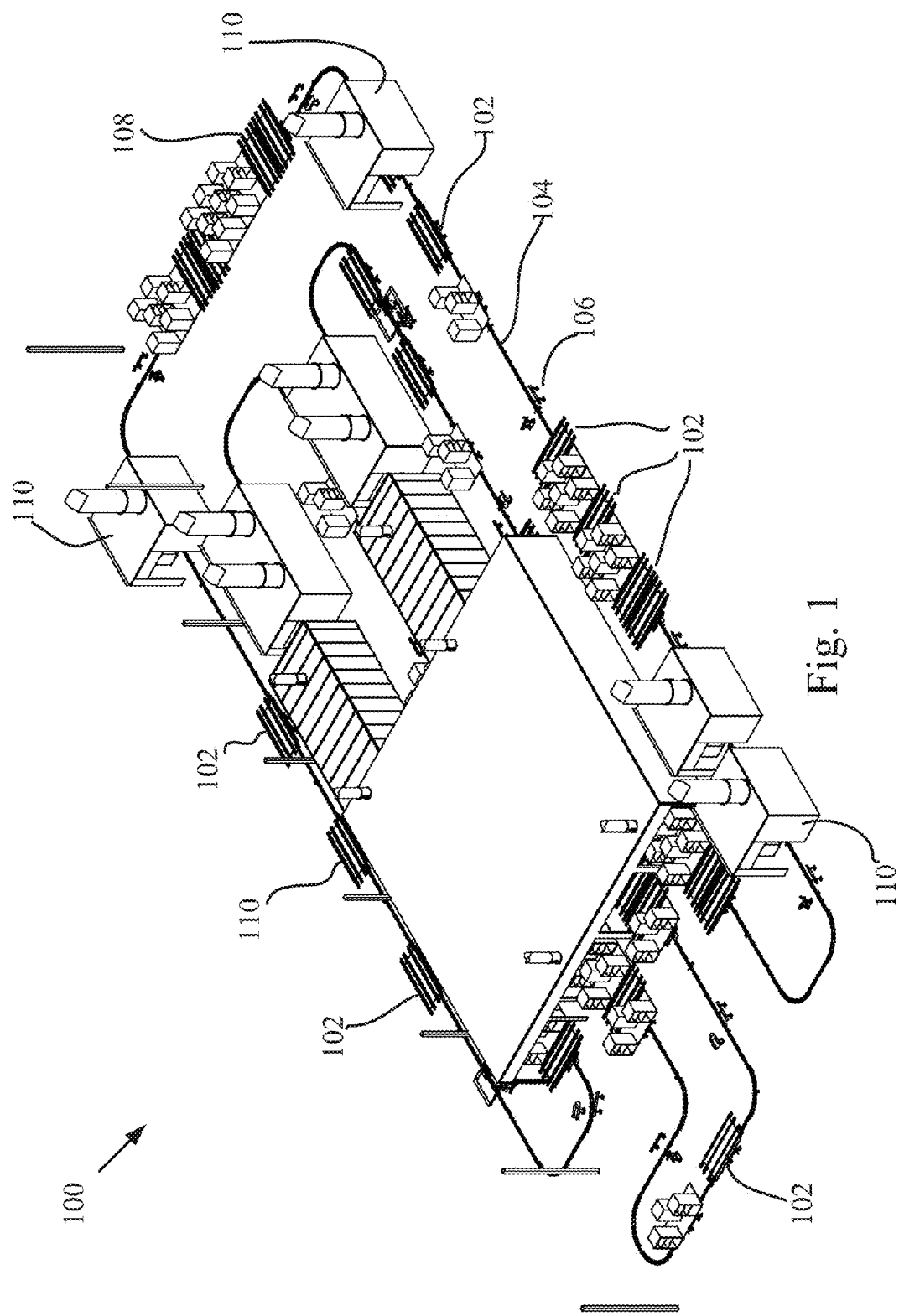
FIG. 1 is a diagram depicting the conveying system in a manufacturing facility.

FIG. 1 depicts an exemplary embodiment of the entire conveying system 100 including manufacturing components 110 as the system would be used in a manufacturing environment. As shown in FIG. 1, carts 102 are moved from one manufacturing station (e.g. a sanding station) to another manufacturing station (e.g. a finishing station) along one or more tracks 104, which includes a drive chain. The drive chain, discussed more thoroughly below, resides within track 104 and engages a pin on carts 102 to couple with and cause carts 102 to move about the conveying system. Various other components of the conveying system can be seen in FIG. 1 as well, which are described in more detail below. For instance, the exemplary configuration of the conveying system of the present invention includes pin-turner 106 and accumulator station 108.

Figure 2:
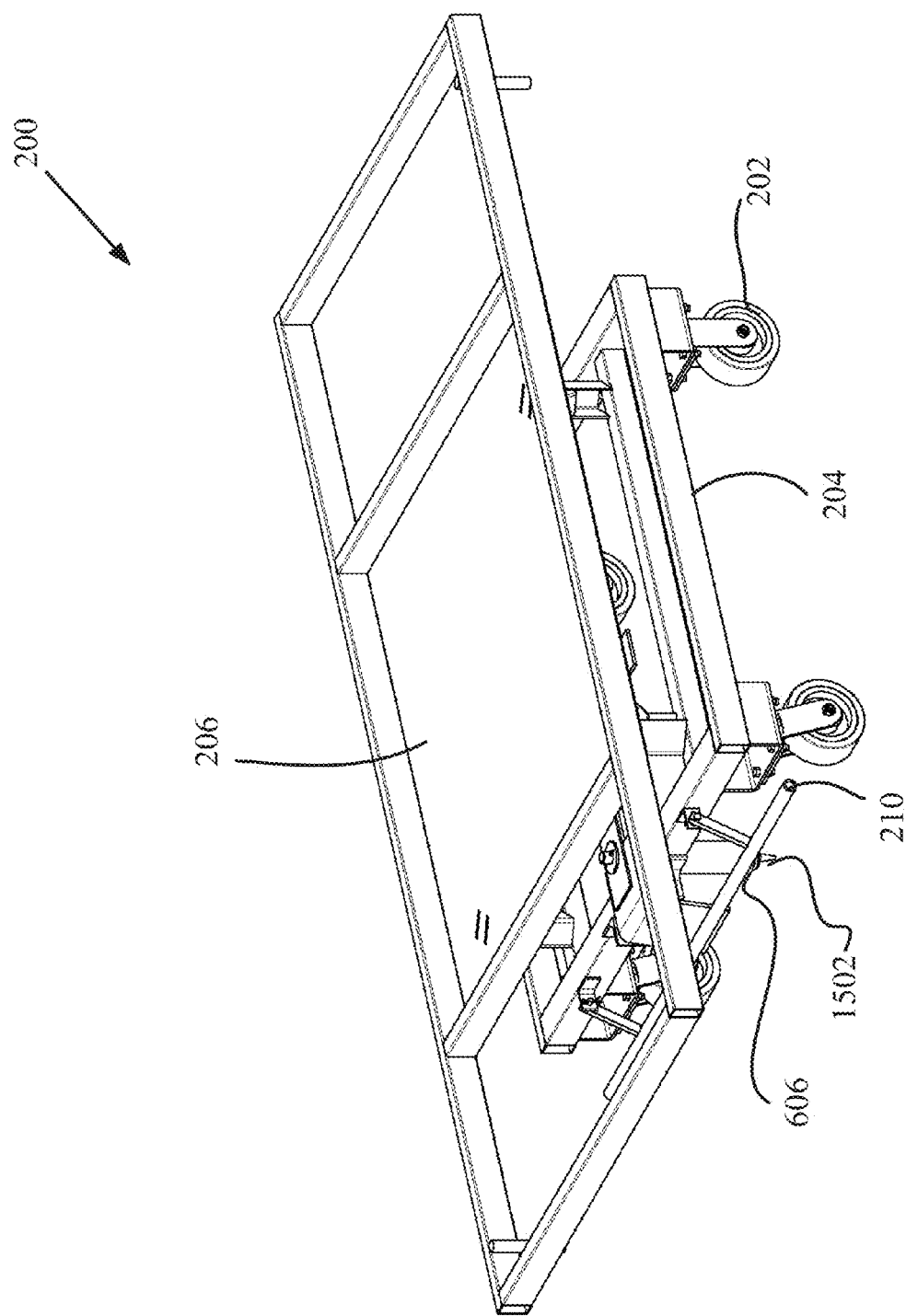
FIGS. 2-5 depict a cart used with the conveying system.
Figure 3:
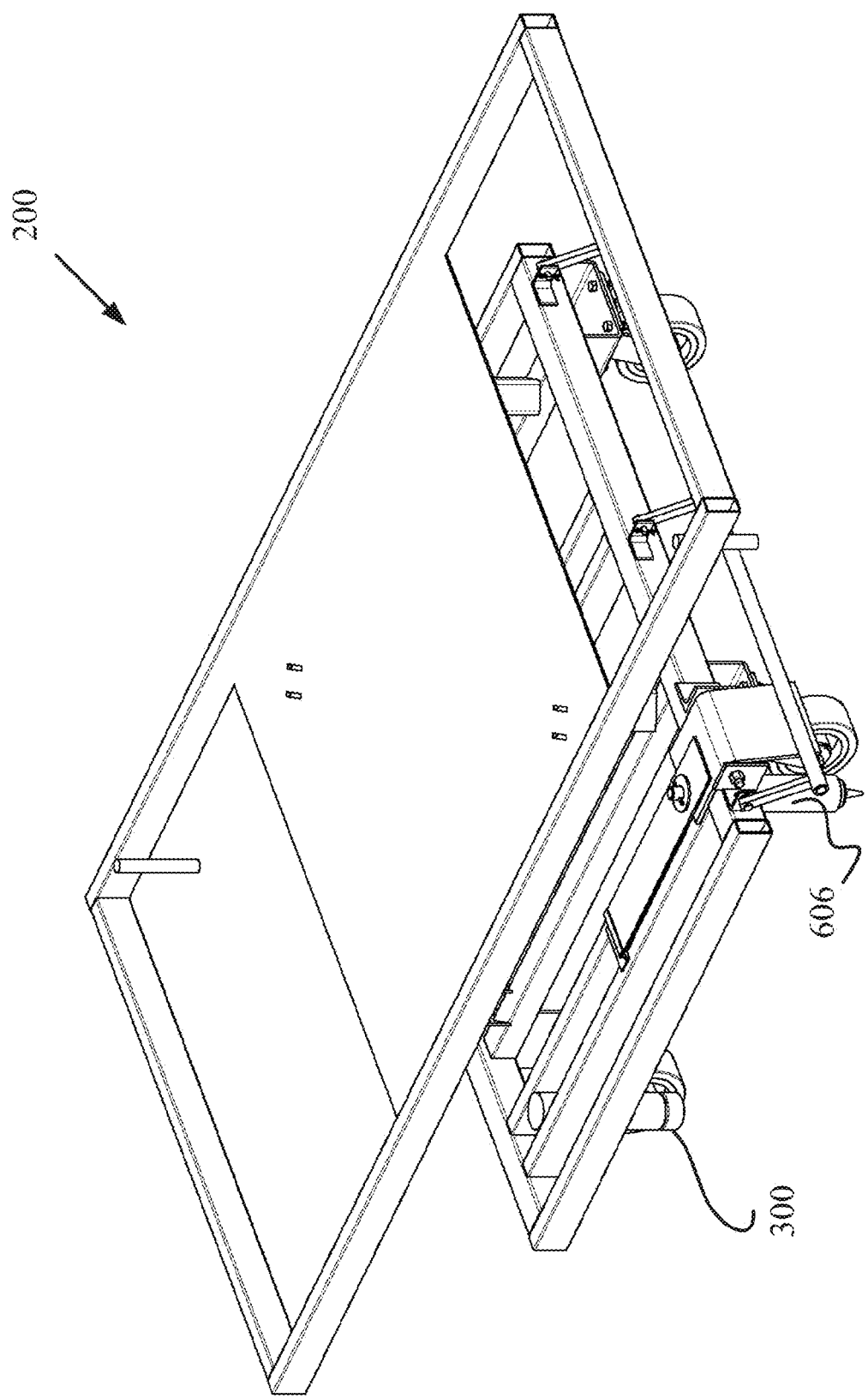
Figure 4:
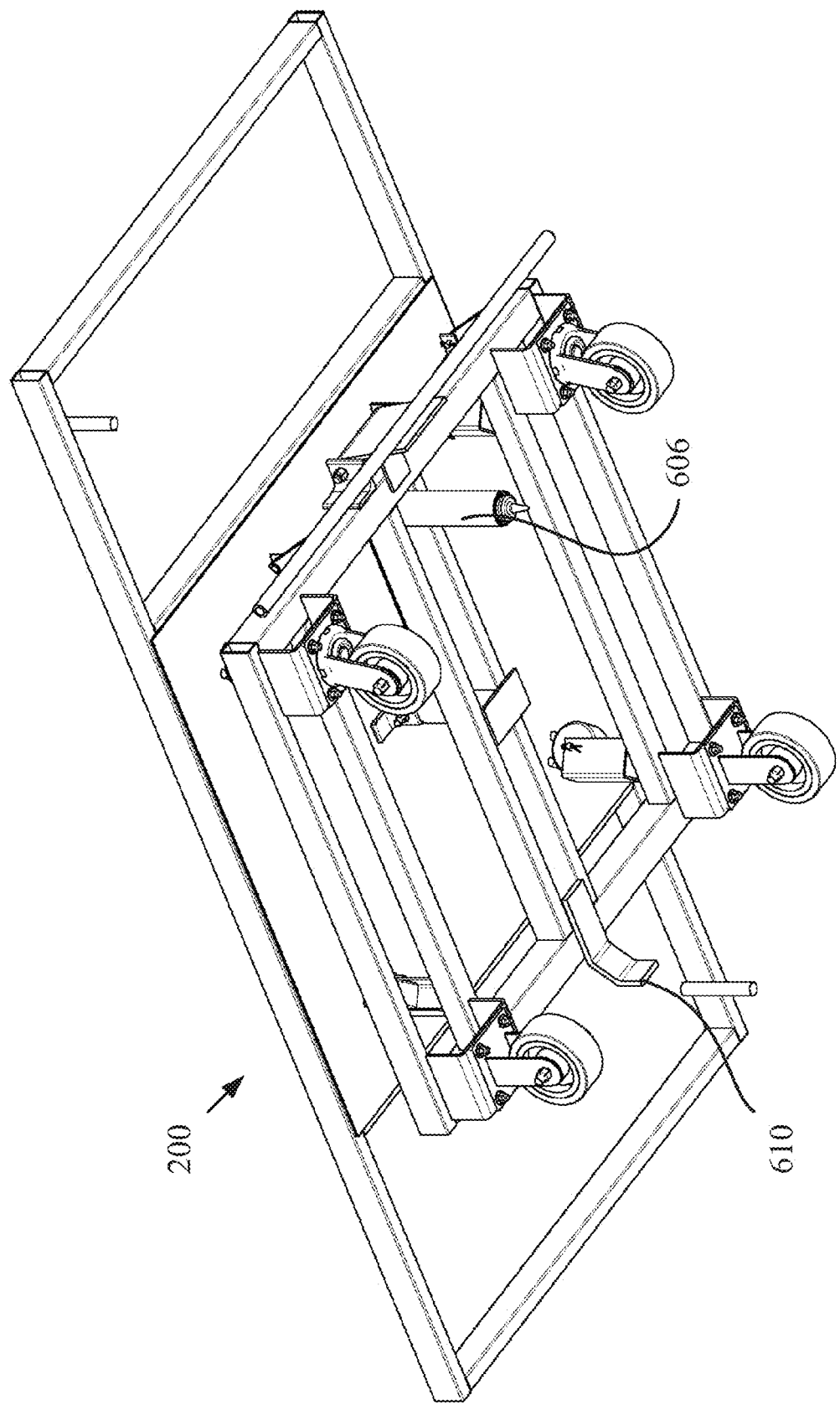
Figure 5:
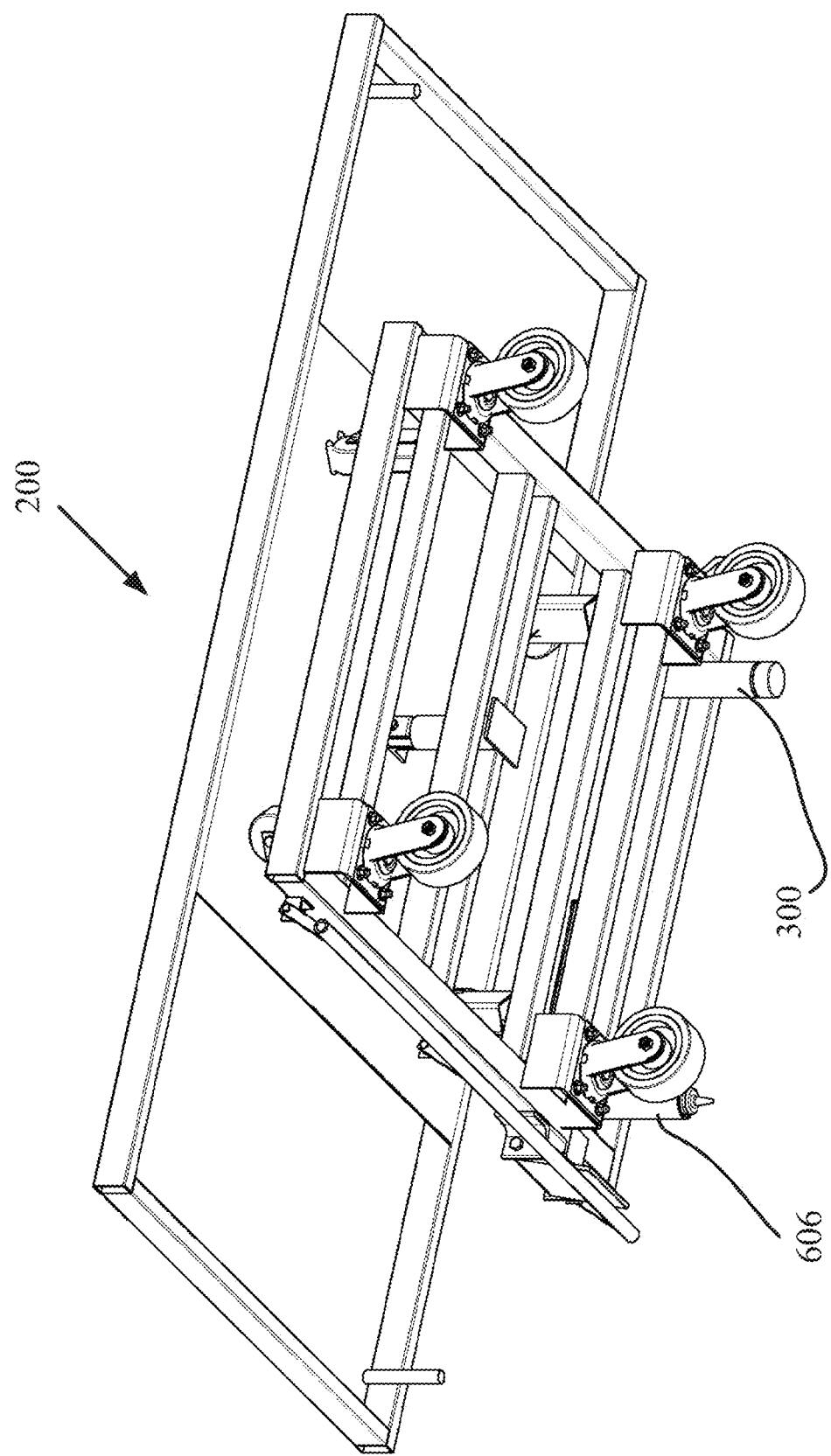

FIGS. 2-5 show an exemplary embodiment of a cart 200 used with the conveying system of the present invention. The cart as shown in FIGS. 2-5 includes wheels or casters 202 connected to the body or carriage 204 of cart 200. Connected to the body 204 of cart 200 is a platform 206, which is typically rotatable about an axis such as for accumulation or "close pack" as described below. Tow pin assembly 606 includes tow pin 1502 and is described in more detail below (FIGS. 15A-15C). FIGS. 2 and 4 show cart 200 having a center tow pin assembly and FIGS. 3 and 5 show cart 200 having a "side" tow pin assembly 600. In a side pin configuration the cart may also have a cam pin 300 to assist in guiding the cart along the tow chain track. The platform 206 rests on the body 204 of cart 200 upon which articles such as fixtures and products (e.g., furniture to be treated or painted in a finishing process) are supported for transport via the conveyor system 100 to various stations or locations along a fabrication or manufacturing process. The plate 610 operates to raise the tow pin 606 of a cart behind the cart 200 when it comes in contact with the cam bar lifting assembly 210.

In order to be moved from station to station, the conveying system 100 as shown in FIG. 1 propels the cart 200 along the conveyor line or circuit from station to station by using a drive or tow chain 1400 (described elsewhere herein). The drive or tow chain 1400 is configured to receive a tow pin 208 of tow-pin assembly 606.

Delay Station and Accumulator

Figure 6:
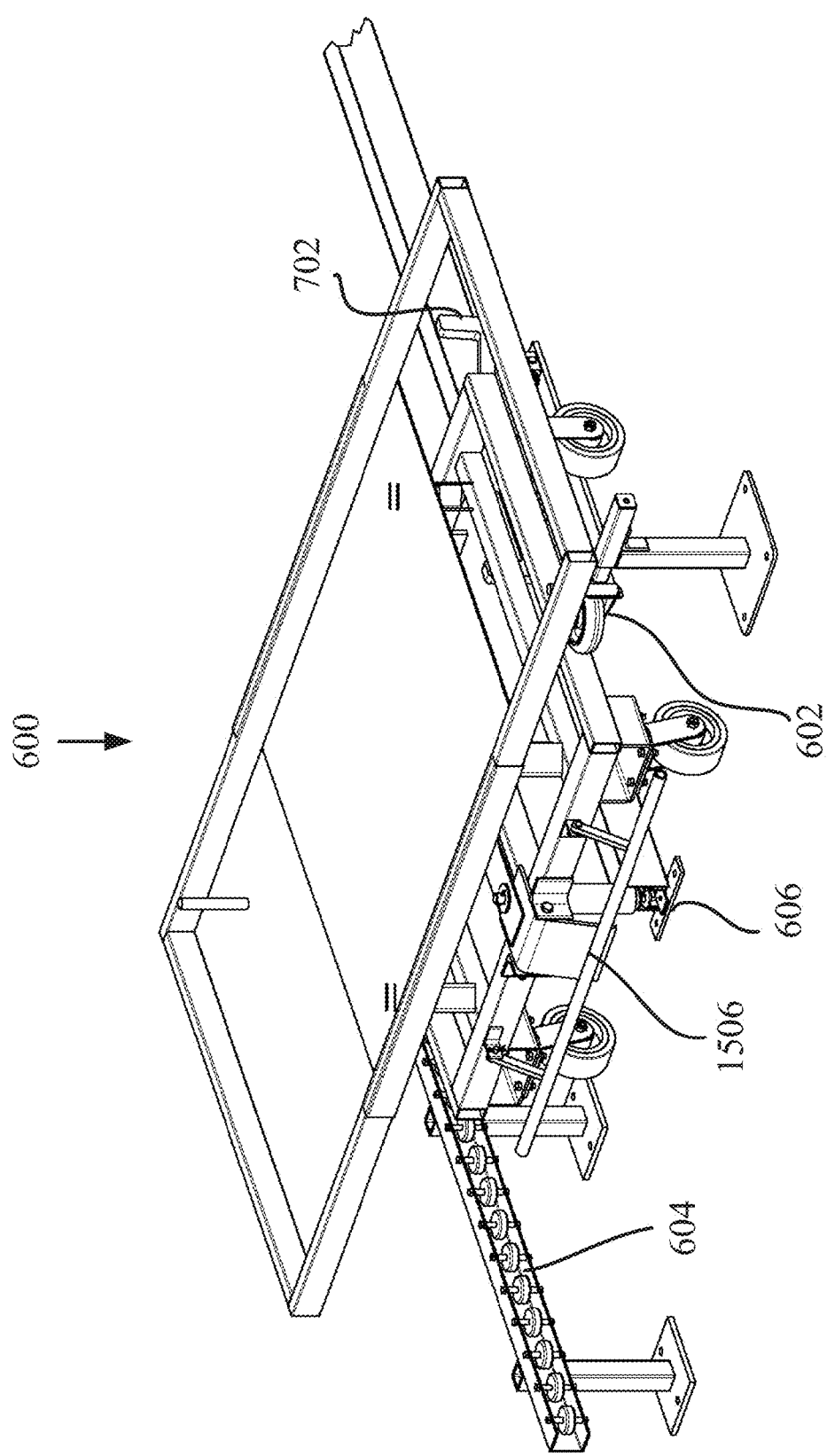
FIGS. 6-7 depict a cart in an accumulation/delay station.
Figure 10:
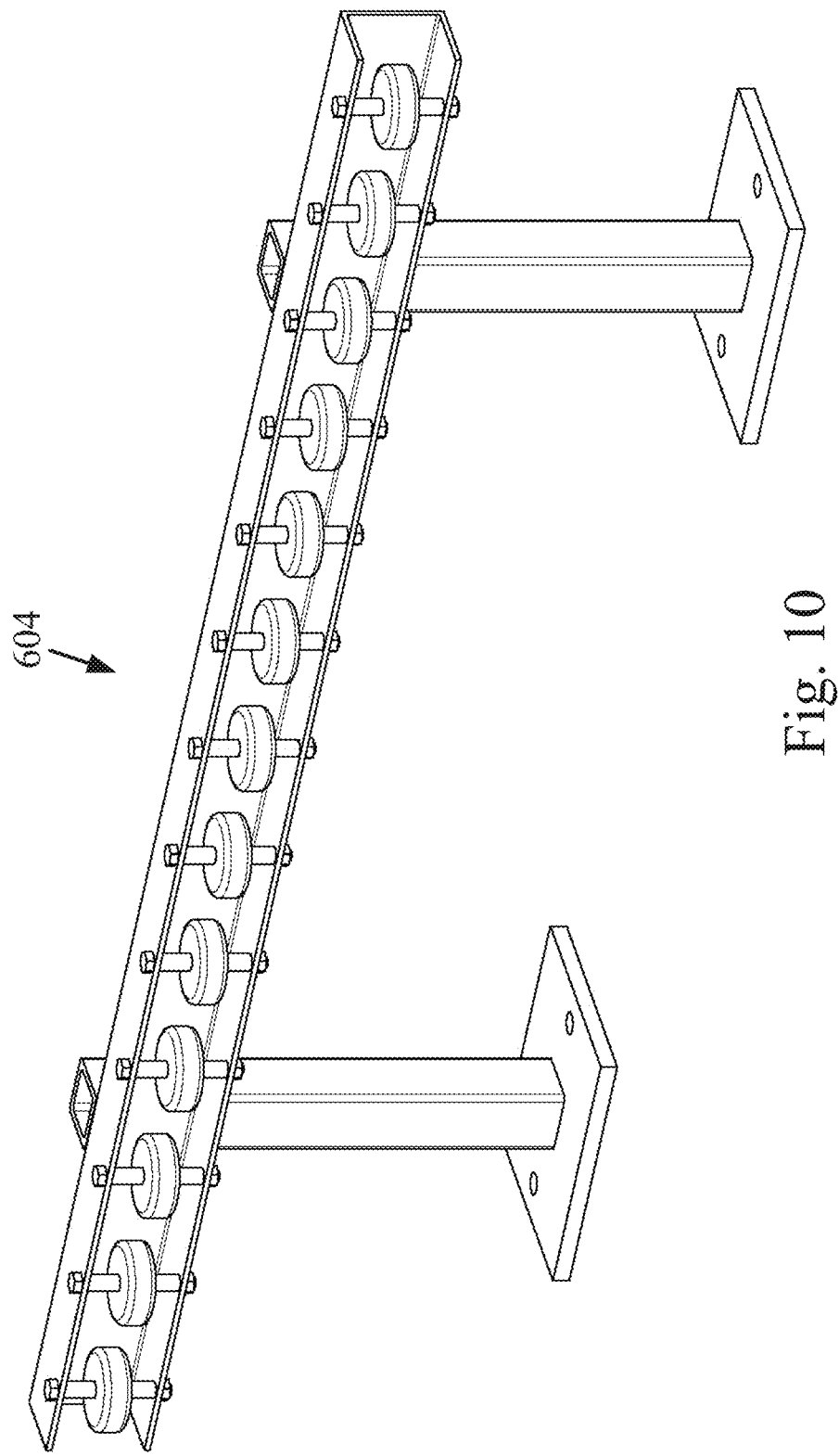
FIG. 10 depicts a guide wheel assembly.

The delay station 600 shown in FIG. 6 allows controlled and variable motion by disengaging the cart pin from the chain. In this way, a cart may be delayed at a certain point along the conveying system 100 within the manufacturing process. The composition of delay station 600 may vary depending on the specific need and specifications of the conveying system 100, but in a preferred embodiment, delay station 600 consists of a single-arm stop (not shown) or a double-arm stop 702 (used for accumulation or close-pack configurations, described below), a tensioning wheel 602, and a set of static wheels 604 (as shown in FIG. 10). The single-arm stop (or double-arm stop) is hydraulically or electrically actuated to engage the tow-pin assembly 606, whereby causing the tow-pin to disengage from the tow chain. When the tow-pin disengages from the tow chain, the cart stops moving about the conveying system. The tensioning wheel 602 (also shown in FIG. 26) is spring loaded or otherwise moveably tensionable to apply tension against the cart, forcing the cart against static wheels 604, thereby preventing the cart from reversing or backing up after it disengages from the tow chain. The delay station 600 may additionally include a combination of the following components (not pictured): four-way air valve; air limit valves; vibration plates; and pitch plates.

Figure 7:
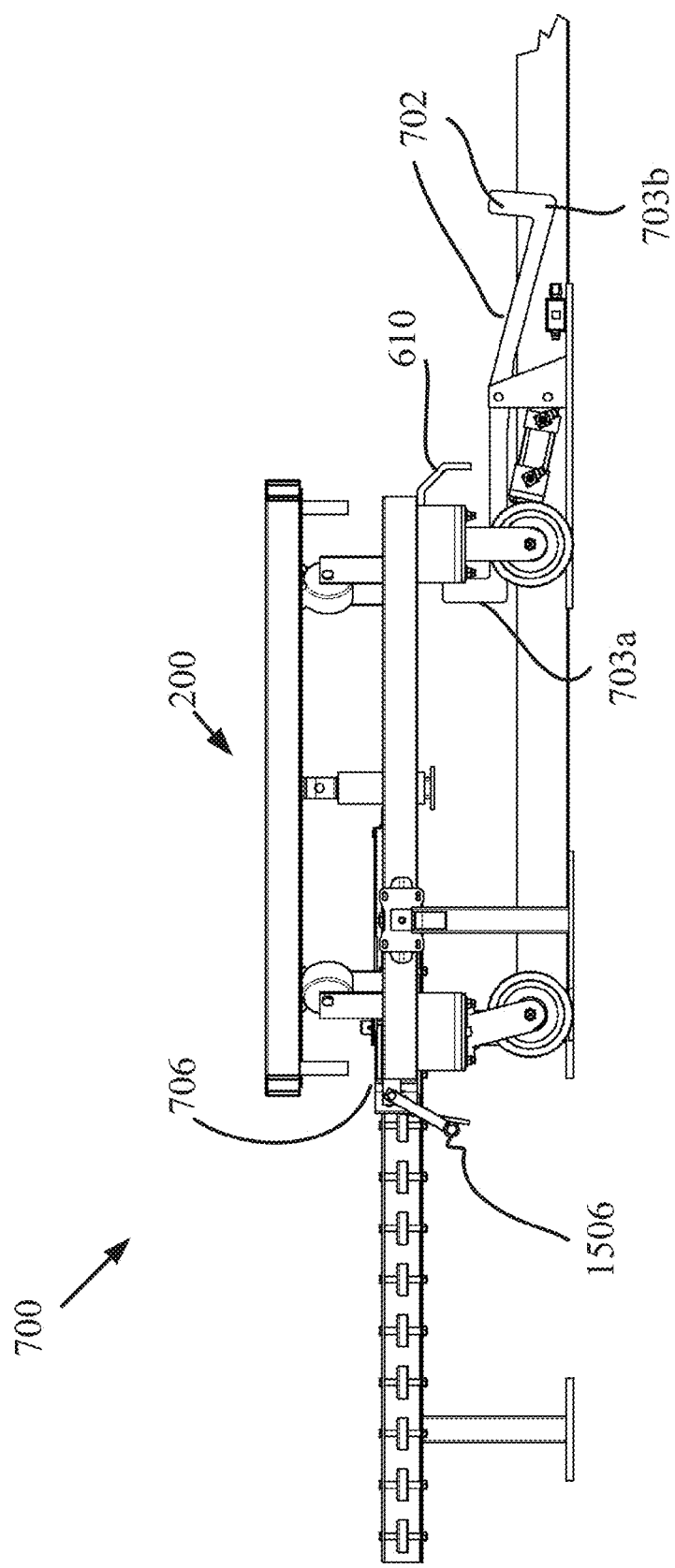
Figure 8:
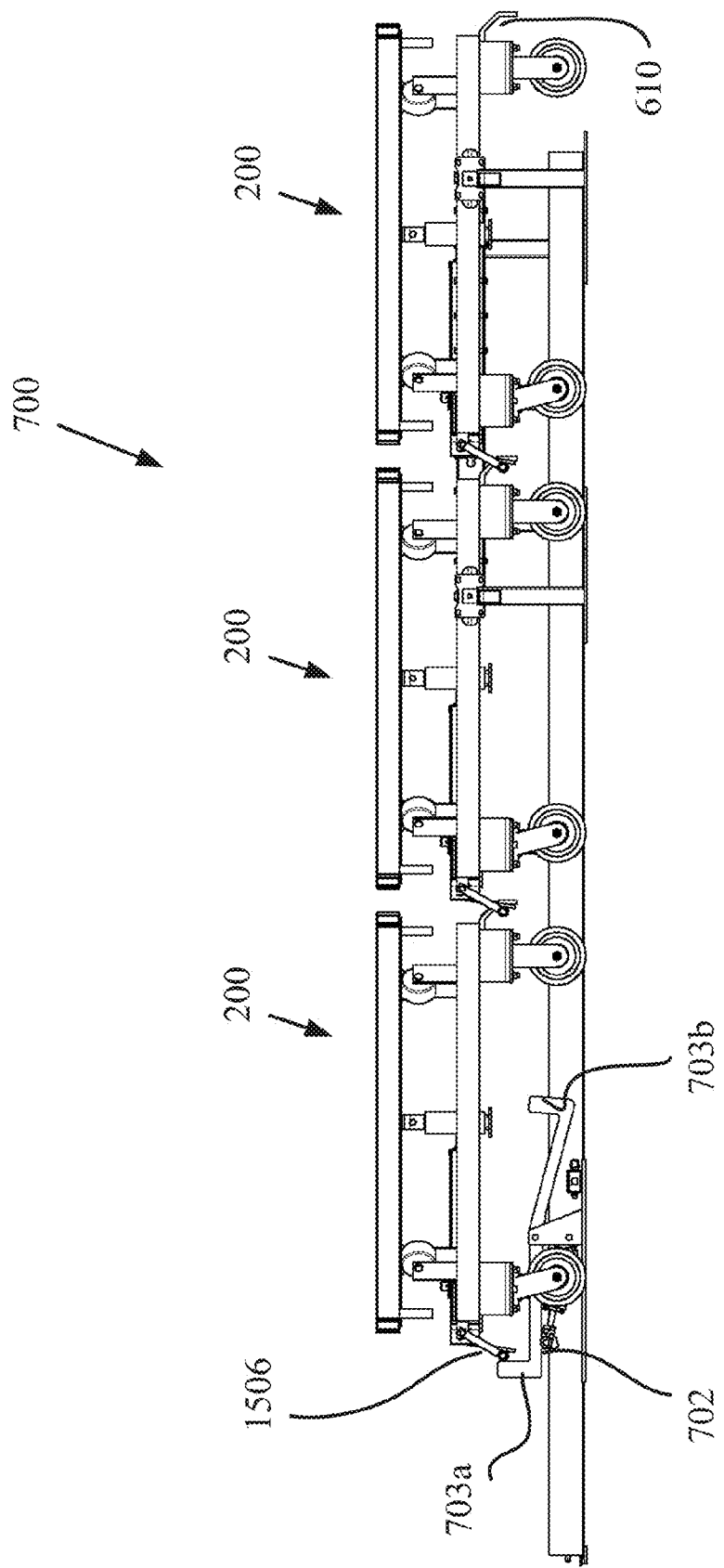
FIG. 8 depicts multiple carts collected at an accumulation station.
Figure 12:
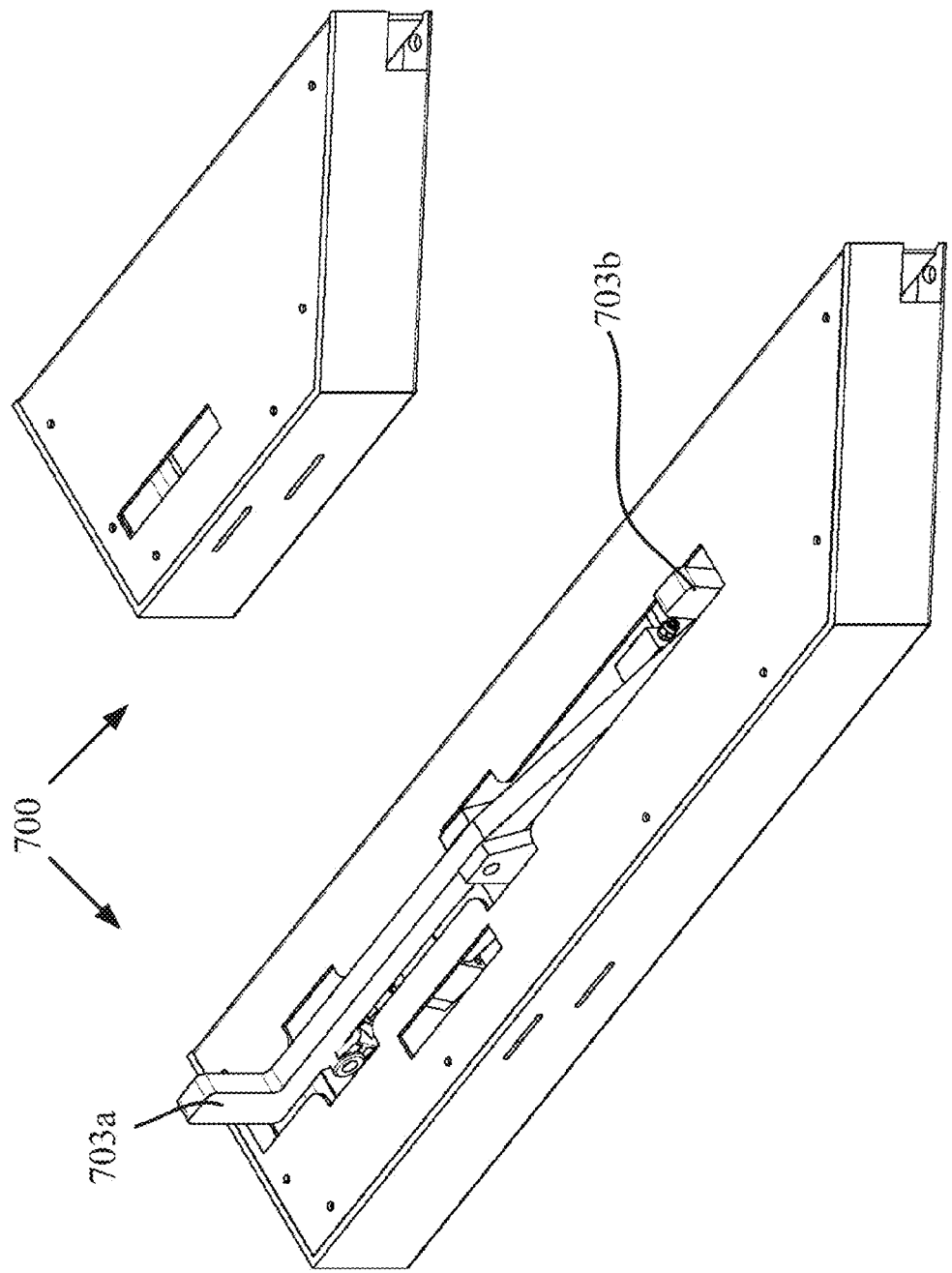
FIG. 12 depicts a double stack (or accumulation) assembly.

In the double-arm stop configuration 700 shown in FIGS. 7 and 8, a double-arm 702 (as shown in FIG. 8) engages bumper arm 1506 to cause tow pin 1502 to lift and disengage from tow chain and to stop one or multiple carts at one location, for example, in what is known as an accumulation or "close-pack" configuration. Known as an "accumulator" this double-arm stop configuration 700 is useful to allow a plurality of carts to come together in a smaller amount of space. This has the desired effect of allowing the finishing room or area within the manufacturing space to take up a smaller footprint. The double-arm 702 consists of a rocker arm with two stopping arms 703a and 703b. As in the single-arm stop configuration, the double-arm stop configuration 700 is hydraulically or electrically actuated to engage the tow-pin assembly 606, thereby causing the tow-pin 1502 to disengage from the tow chain. When the tow-pin 1502 disengages from the tow chain, the cart stops moving about the conveying system. FIG. 12 shows another view of double-arm stop 700 configured to be mounted to a manufacturing facility floor adjacent to the tow chain.

As shown in FIG. 8, stop arm 703a engages and deflects bumper bar 1906 to cause the tow pin to lift and disengage the tow chain and stop first cart 200. The back or rear bumper guard 610 engages the bumper bar of the second-in-line cart 200 to cause that cart's tow pin to disengage from the tow chain and stop the second-in-line cart. The bumper guard 610 of the second cart engages the bumper bar 1506 of the third cart, and so on.

Track, Drive Chain and Tow Pin

Figure 9:
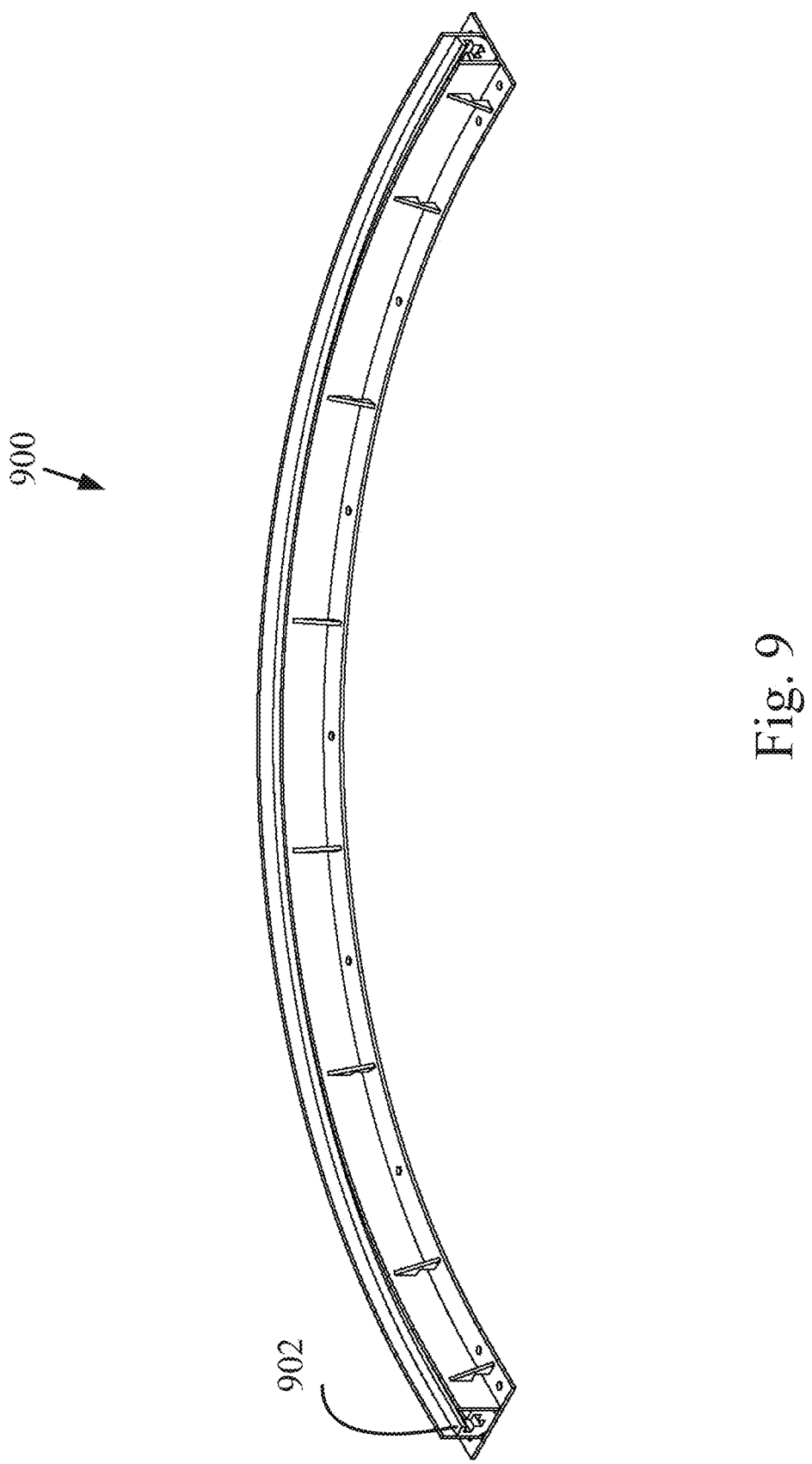
FIG. 9 depicts an arcuate section of track configured to receive a drive chain and for use with UHMW guide section.
Figure 11:
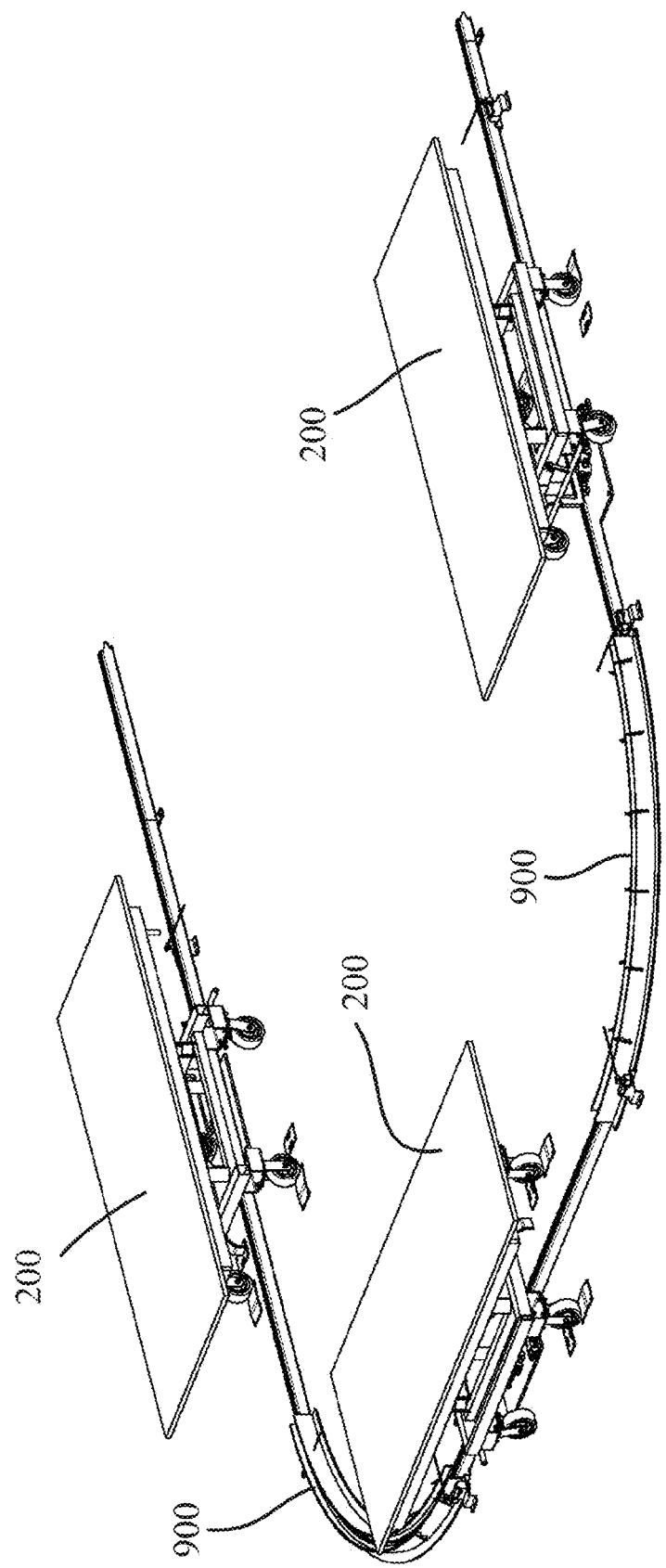
FIG. 11 depicts multiple carts at stations along a track of the conveying system.

FIG. 9 depicts an exemplary embodiment of an arcuate section of drive track 900. Drive track 900 houses the tow chain (not pictured) in channel 902. Channel 902 is composed from an ultra-high-molecular-weight polyethylene (UHMW) material which facilitates ease of passage of the tow chain through channel 902 and further facilitates "lubrication" of the tow chain. FIG. 10 shows a section of guide wheels 604 used to guide a cart 200 along tow chain path. FIG. 11 shows two sections of arcuate chain guides 900 disposed in a u-shaped section of a conveying system.

Figure 13C:
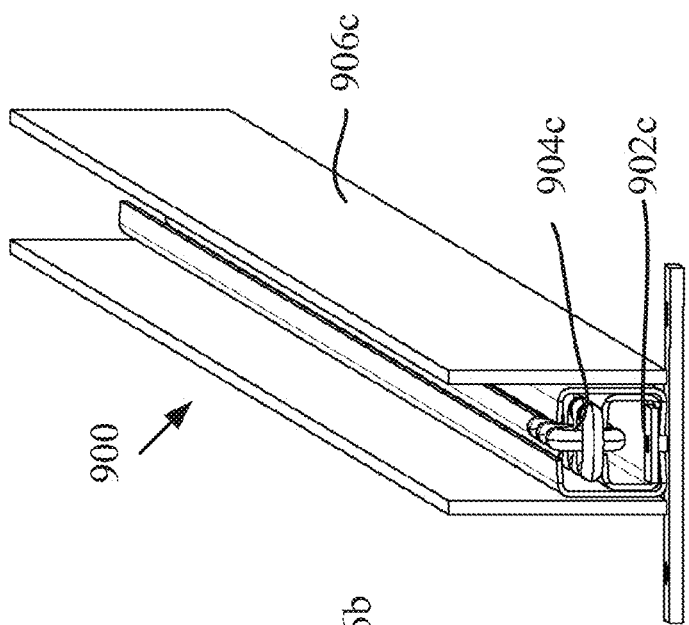
FIGS. 13A-13C depict various cross sections of tow chain, track, and UHMW.
Figure 13B:
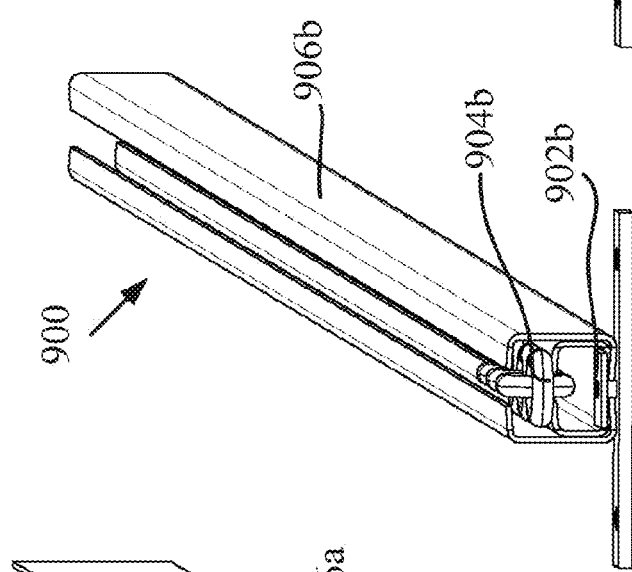
Figure 13A:
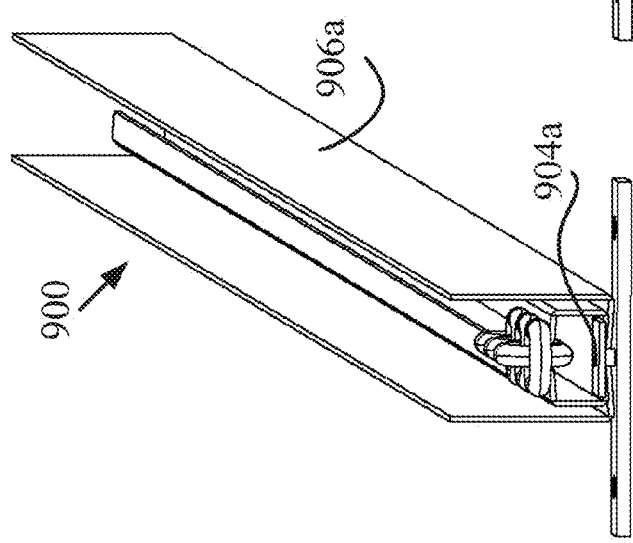

FIGS. 13A-13C show various cross sections of drive track 900. In FIG. 13A, drive track 900 contains channel 902a composed from UHMW material and drive chain 904a which passes through the opening in channel 902a. FIGS. 13B and 13C have similar arrangements but differ in the outside walls 906 which encompass the channel 902 and drive chain 904.

Figure 14B:
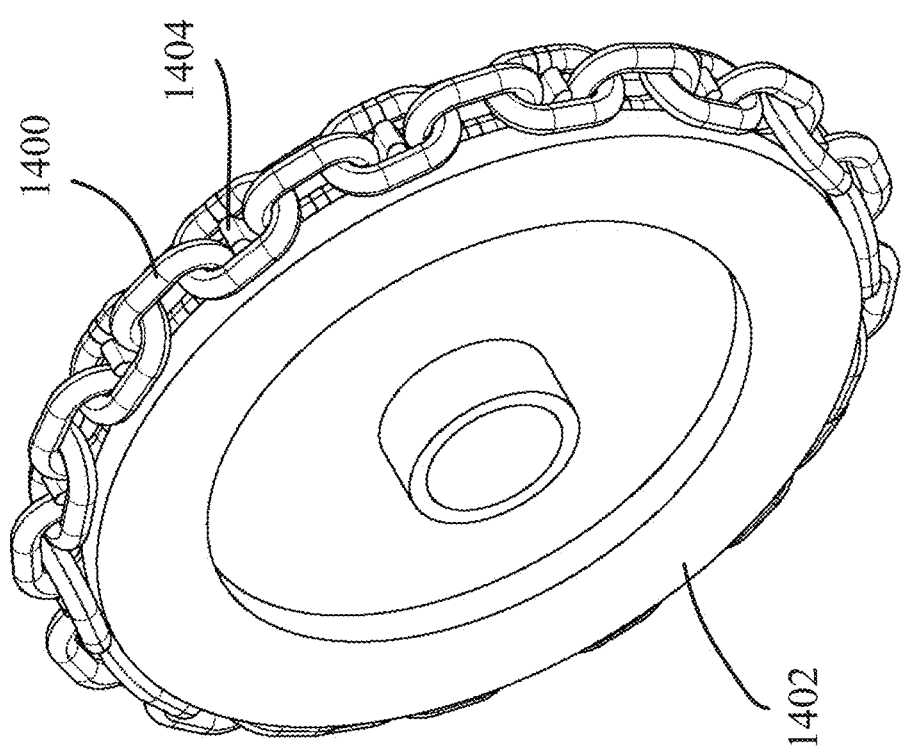
FIG. 14B depicts a section of tow chain in conjunction with a drive wheel.
Figure 14A:
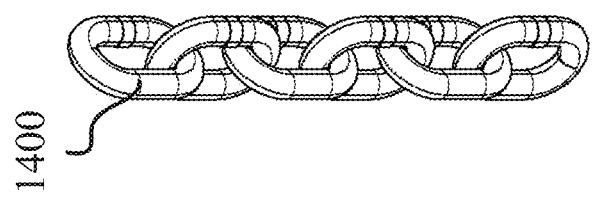
Figure 16:
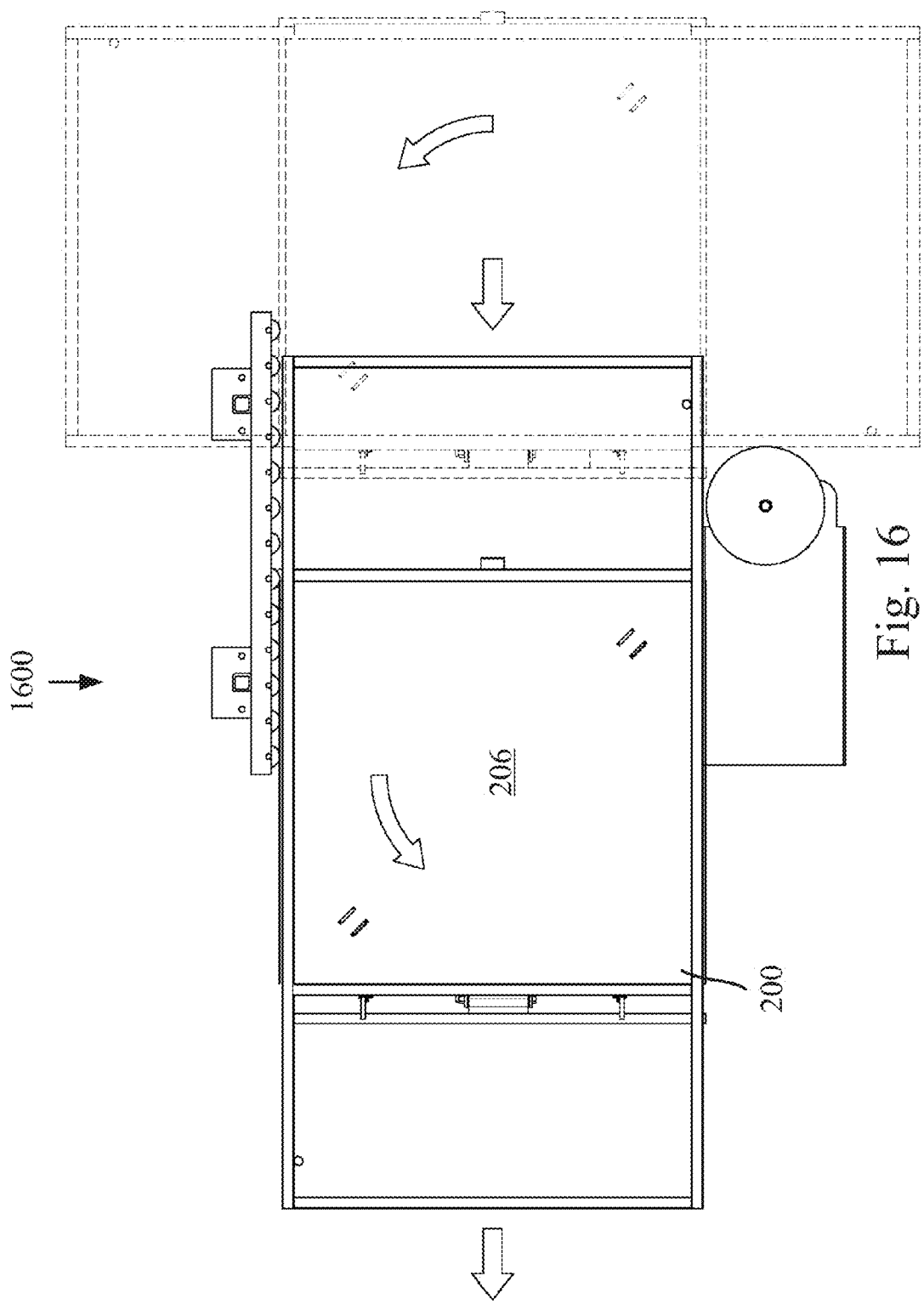
FIG. 16 depicts a cart and pin turning station.

FIG. 14A shows the drive chain 1400 consisting of metal links configured to pass through drive track such as drive track 900 shown in FIGS. 9 and 13A-13C. FIG. 14B shows drive chain 1400 positioned about a gear 1402 configured to receive drive chain 1404. The teeth 1404 of gear 1402 are configured to be positioned between links of drive chain 1400 such that when gear 1402 rotates it causes the drive chain 1400 to move.

FIG. 15A shows the tow-pin assembly 606 of cart 200 as it interacts with tow chain 1400. Tow-pin assembly 606 comprises tow pin 1502 which is effectively raised and lowered into position by operation of a bumper bar 1506, which when deflected or engaged depresses lift bar 1504 whereby causing tow-pin 1502 to lift. Tow-pin 1502 is rotatably connected to lift bar 1504 at pivot point 1508 in such a manner that when lift bar 1504 causes tow-pin 1502 to lift, tow-pin 1502 moves perpendicularly with relation to tow chain 1400, not with respect to lift bar 1504 (i.e., the angle between lift bar 1504 and tow pin 1502 changes as tow pin 1502 raises and lowers). Tow pin point 1503 is configured such that it fits between the links of tow chain 1400 without moving laterally, but also is configured in such a way that it cannot become stuck between the chain links.

FIG. 15B is a top/bottom diagram of the tow chain 1400 receiving tow pin 1502 at tow pin point 1503. Specifically, tow pin point 1503 is shown being received by tow chain 1400. Likewise, FIG. 15C shows a side illustration of tow chain 1400 receiving tow pin point 1503 with part of the chain link removed for illustrative purposes. Tow pin point 1503 fits snugly between the edges of the chain link of tow chain 1400. FIG. 17A shows cart 200 having tow pin assembly 606 with tow pin 1502 as it engages tow chain 1400. Oppositely, FIG. 17B shows cart 200 having tow pin assembly 606 with tow pin 1502 which is disengaged from tow chain 1400. In this latter configuration of FIG. 17B, the cart would be stationary, while in FIG. 17A with tow pin 1402 engaged, the cart would be in motion in conveying system 101.

Figure 18B:
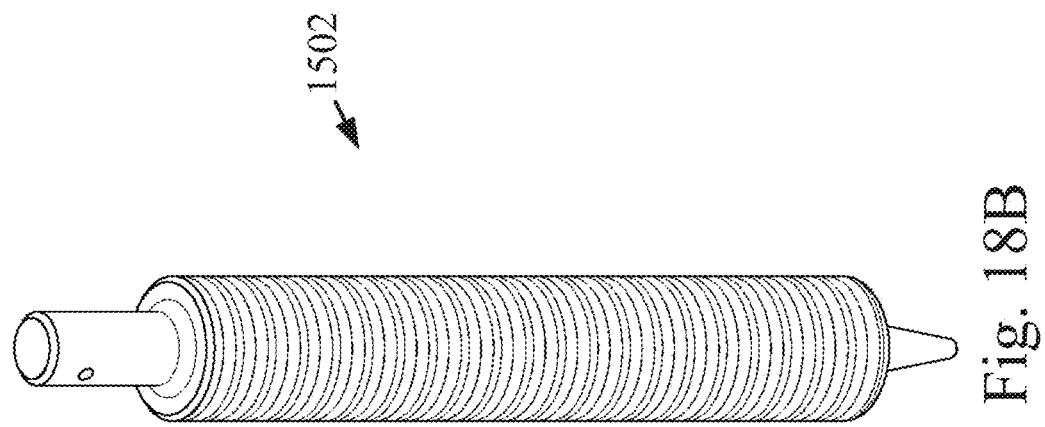
FIGS. 18A and 18B depict various views of an exemplary tow pin.
Figure 18A:
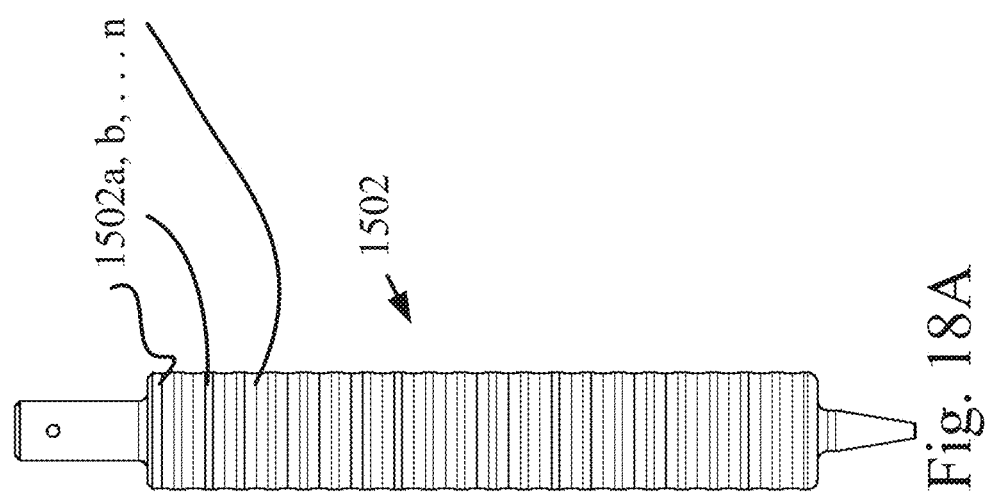

FIG. 18A and FIG. 18B both illustrate an exemplary embodiment of tow pin 1502. As shown in these figures, tow pin 1502 may have ridges 1502a, 1502b, ... 1502n which facilitates lubrication. That is, when lubricants are applied to tow pin 1502, ridges 1502a, 1502b, ... 1502n help maintain and apply the lubricant while tow pin 1502 moves vertically within tow pin assembly 606.

Pin Pusher

In an exemplary embodiment of the conveyor system 100 of the present invention, there are stations, such as at drive assembly 2400, where pick-up of the tow chain results in a de-linking and re-linking operation over a limited span of space. This re-linking occurs by operation of a "pin pusher" which is designed to uniquely, effectively and efficiently provide de-linking (or unlinking) and re-linking of the tow pin, and thereby the cart associated with the tow pin, from and to the conveyor system 100. Upon de-linking, the cart is freed from following engagement of the tow chain. The pin pusher provides an element that in one embodiment is cylinder or piston driven so as to drivingly contact an element, such as an arm or angle iron or bracket of the cart to "push" it along over the span of log chain disengagement to the point of re-engagement or re-linking. The pusher may be pneumatically, hydraulically or electro-mechanically powered. Pusher should be adjusted so that a cart transfers over the dead space in the drive at the same speed as the tow chain is running. The operation of a pin pusher such as would be used by the system 100 is described in detail in U.S. patent application Ser. No. 13/223,234 which has been incorporated herein in its entirety.

Pin Turner

Figure 19:
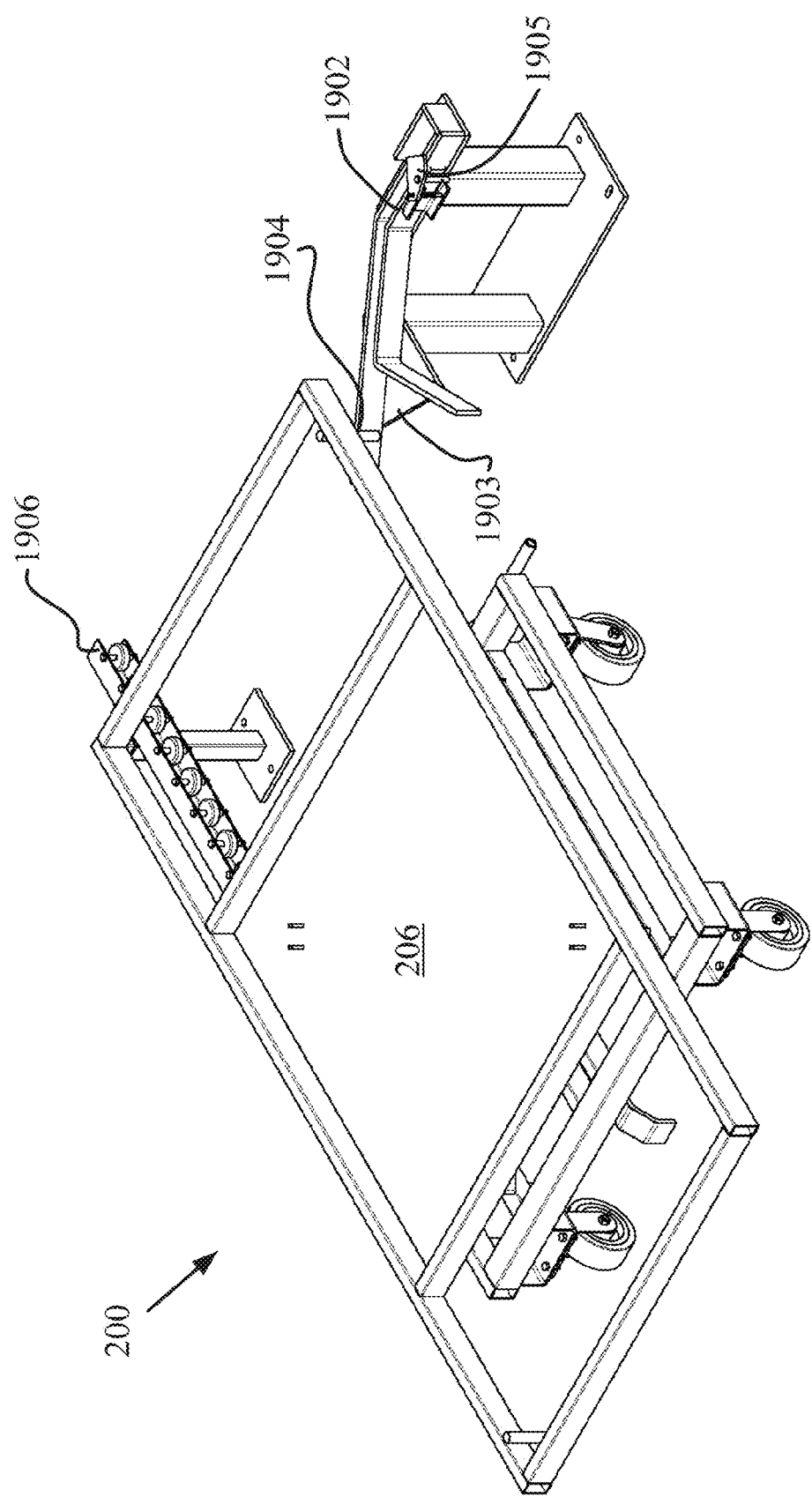
FIGS. 19-21 depict a cart and pin turning assembly.
Figure 20:
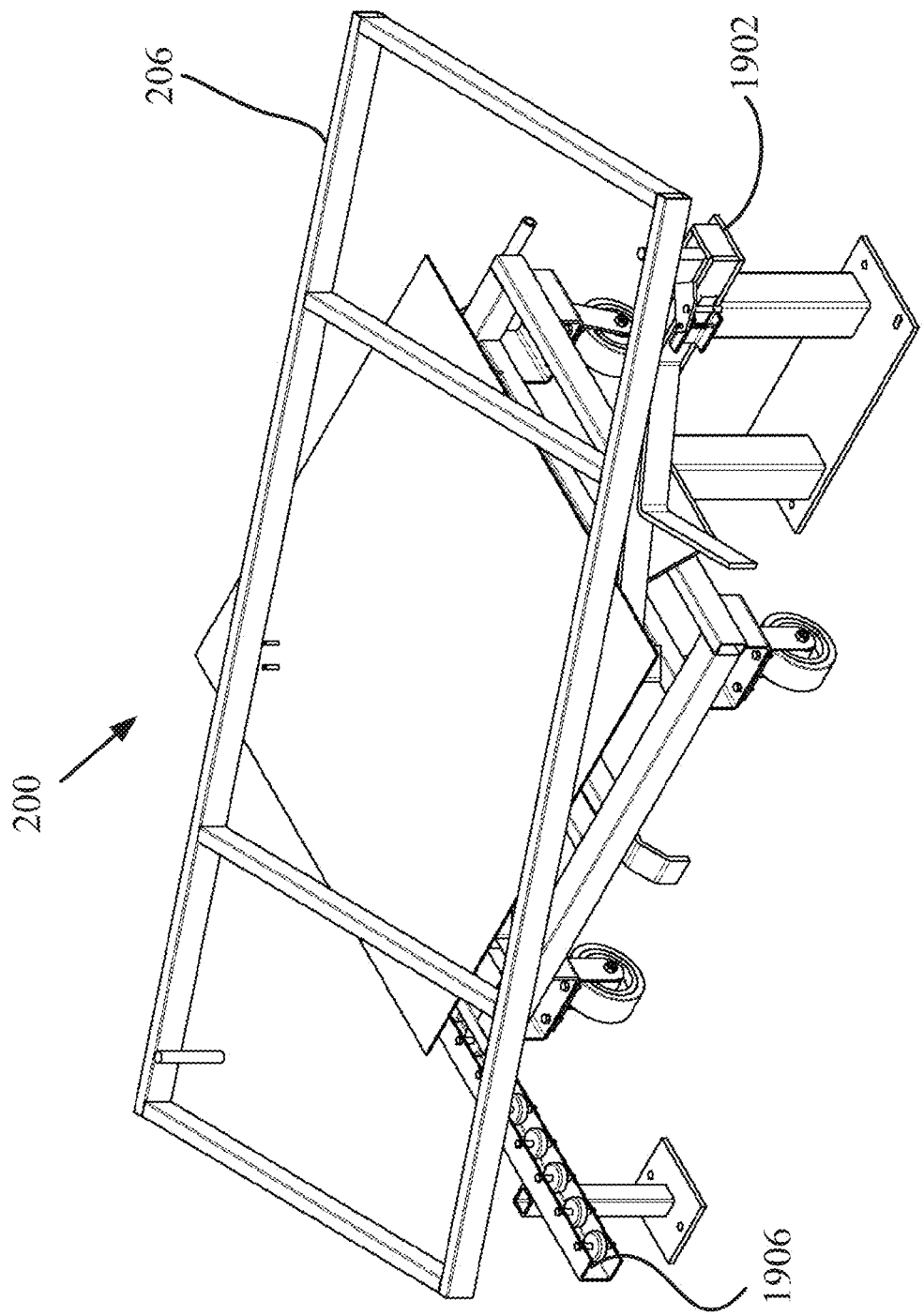
Figure 21:
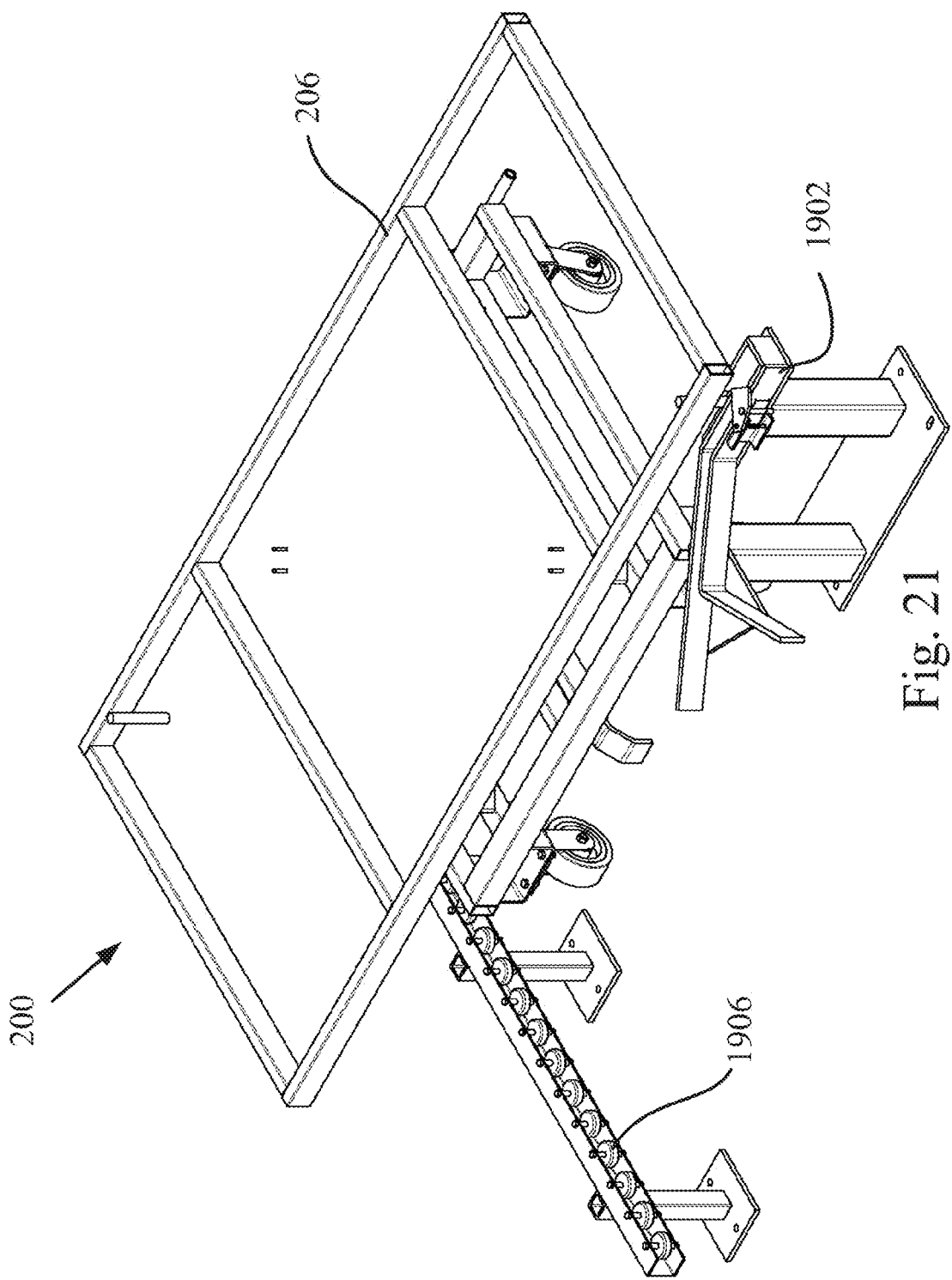
Figure 22:
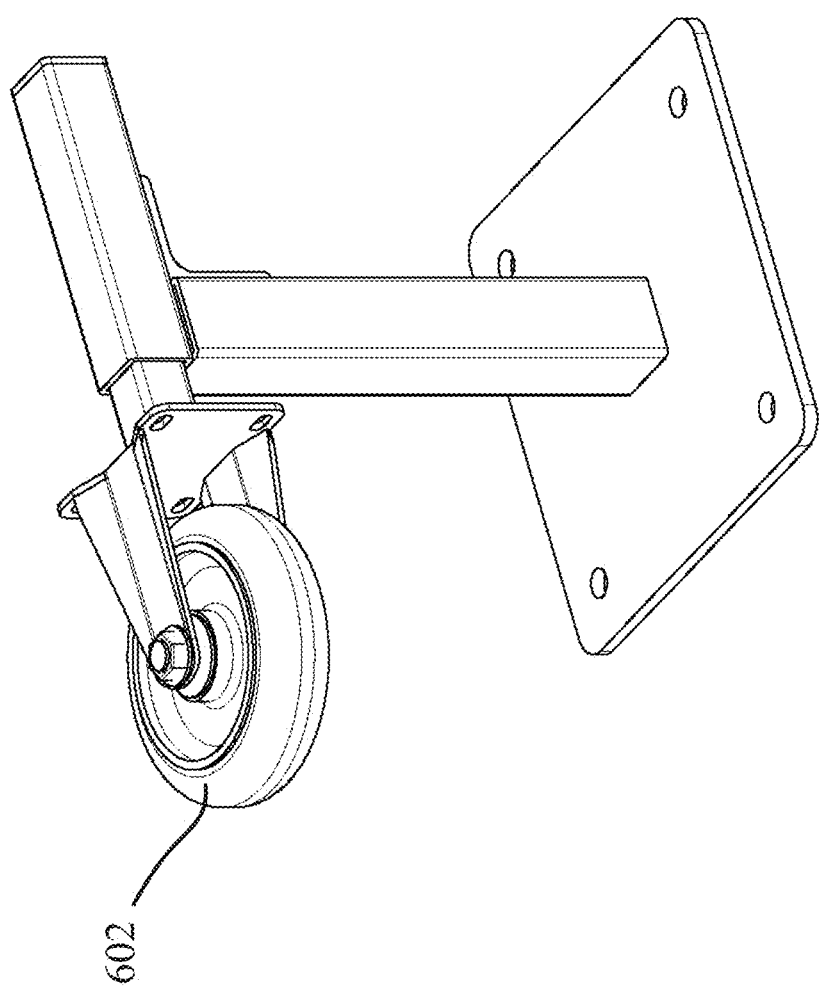
FIG. 22 depicts a spring-loaded tensioning wheel.

FIGS. 16, 17A-17B and 19-21 show pin turner assembly 1600 which is used to rotate the platform 206 of cart 200. The pin turner assembly 1600 allows the platform of a cart (such as cart 200) to rotate 90 degrees (or other desirable position) with respect to the base of the cart. Such rotation is useful to allow the manufacturing piece which sits on cart 200 to be turned for manufacturing purposes. The rotation is also useful to allow carts to be manipulated for stacking purposes such as for accumulation (as described elsewhere herein). By turning the platform 206 of cart 200, multiple carts may be more closely pushed together at stopping points along conveying system 100. As shown by the dashed lines in FIG. 16, platform 206 is in a first orientation prior to passing through pin turner assembly 1600. After passing through pin turner assembly 1600, platform 206 of cart 200 is rotated 90 degrees counter-clockwise. FIG. 19 shows the turning mechanism 1902 which facilitates turning of platform 206. When cart 200 passes along conveying system 100 through pen turner assembly 1600 and encounters turning mechanism 1902, turning mechanism 1902 receives turning pin 1904 attached to platform 206 of cart 200. As cart 200 continues to move, turning pin 1902 enters turning mechanism 1902 at entry 1903, which engages and redirects turning pin 1904 (and platform 206). As cart 200 progresses along the track, turning pin 1904 passes through turning mechanism 1902 in such a manner that it causes platform 206 to rotate 90 degrees. After rotation is completed, turning pin 1904 exits turning mechanism 1902 at exit 1905. As those skilled in the art recognize, other angular displacements are possible and may be desirable. A series of stabilizing wheels 1906 apply force against the base of cart 200 to prevent cart 200 from rotating while platform 206 rotates. In addition, the stabilizing wheels 1906 prevent cart 200 from over tipping or otherwise moving in undesirable ways.

Transfer Assembly

Figure 23:
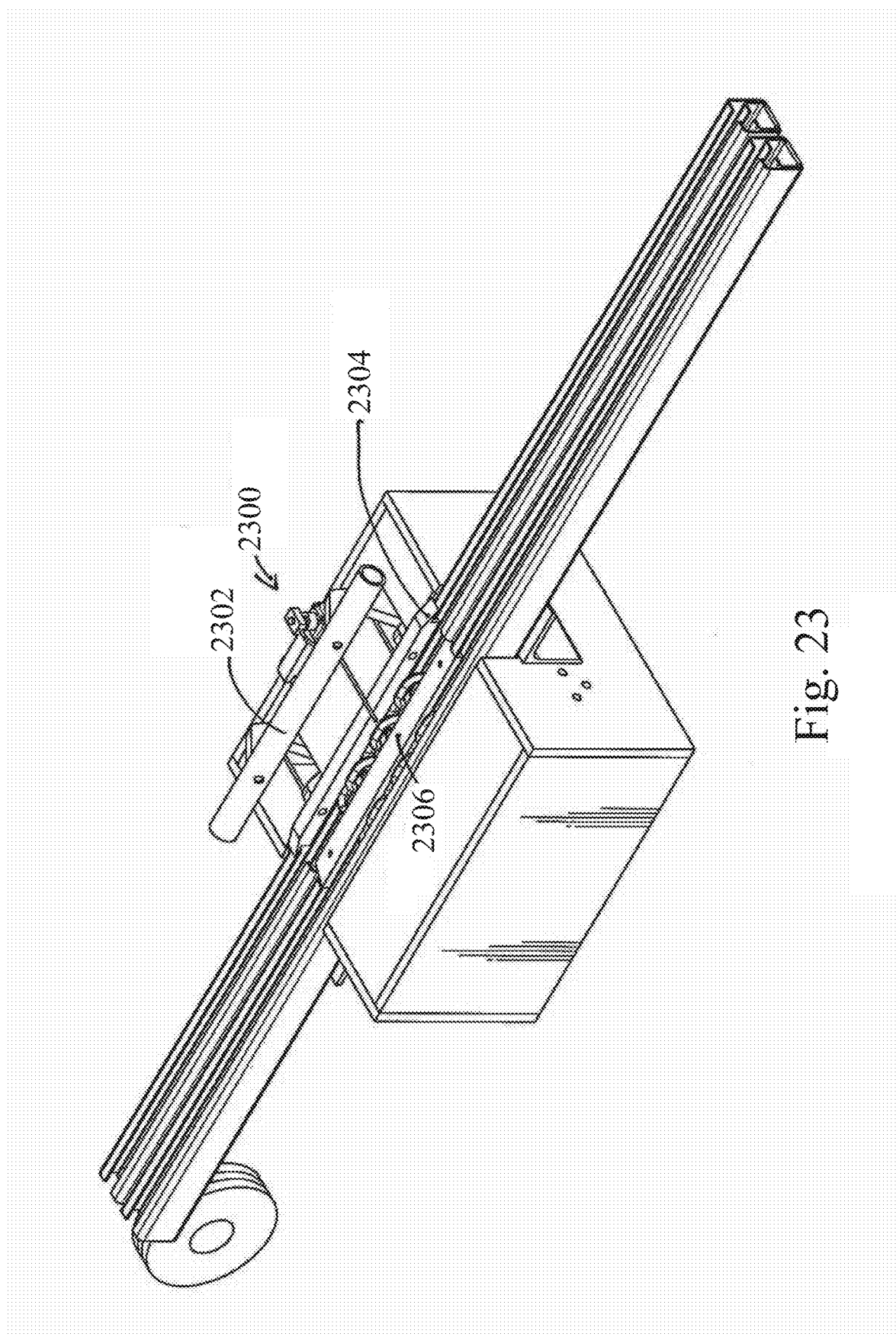
FIG. 23 depicts a cart transfer station.

FIG. 23 shows a transfer assembly used to move a cart, such as cart 200, from a first conveying system, such as conveying system 100, to a second conveying system (not pictured) positioned adjacent to the first conveying system. As those skilled in the art recognize, it is often desirable in manufacturing facilities to have multiple manufacturing conveying systems, which each conveying system responsible for a discrete series of tasks. For example, a first conveying system may be configured with stations for assembling a piece of furniture, while a second conveying system may be configured with stations for painting and/or finishing that piece of furniture. In this example, a cart, such as cart 200, carrying that piece of furniture needs to transfer from the assembly conveying system to the painting/finishing conveying system. Without such a transfer, the furniture piece would need to physically be picked up off the cart in the assembly conveying system and moved to another cart in the painting/finishing system. To remedy this problem, transfer assembly 2300 is positioned along two parallel portions of track, one portion from the first conveying system and the second portion from the second conveying system.

When a cart approaches the transfer assembly 2300 on the first conveying system (the inside track in FIG. 23), the tow pin de-links from the tow chain when the release on the tow pin assembly is engaged by de-link ramp 2304. Once the tow pin is de-linked from the tow chain of the first conveying system, the transfer assembly engages and physically pushes the tow pin of the cart from the inside track (i.e., the track from the first conveying system) to the outside track (i.e., the track from the second conveying system). After passing through the transfer assembly 2300, the de-link ramp 2304 allows the release on the tow pin assembly to re-link the tow pin with the tow chain of the outside track of the second conveying system. In other embodiments, the transfer arm 2302 may physically push another portion of the cart, such as a wheel or the carts frame to facilitate the transfer.

As shown in FIG. 23, the transfer assembly 2300 utilizes an inclined surface 2306 between the first tow chain and the second tow chain of the first and second tracks respectively to facilitate transfer. The inclined surface 2306 prevents the tow pin from improperly veering off course from the first track to the second track until the transfer assembly engages and performs the transfer by pushing the cart with the transfer arm 2302 from the first track to the second track.

On-Surface Drive Assembly

In one exemplary embodiment, conveying system 100 utilizes an on-surface (or above ground) drive assembly 2400. The on-surface drive assembly 2400 allows conveying system 100 to be installed in manufacturing facility without the need to mount a traditional drive assembly below the surface of the manufacturing facility floor, upon which the track for conveying system 100 rests and carts (such as cart 200) travel. Mounting the on-surface drive assembly 2400 on the surface of the floor, as opposed to beneath the floor's surface reduces cost and instillation time while facilitating easier access for maintenance. FIGS. 24-30 show one exemplary embodiment of on-surface drive assembly 2400.

Figure 24:
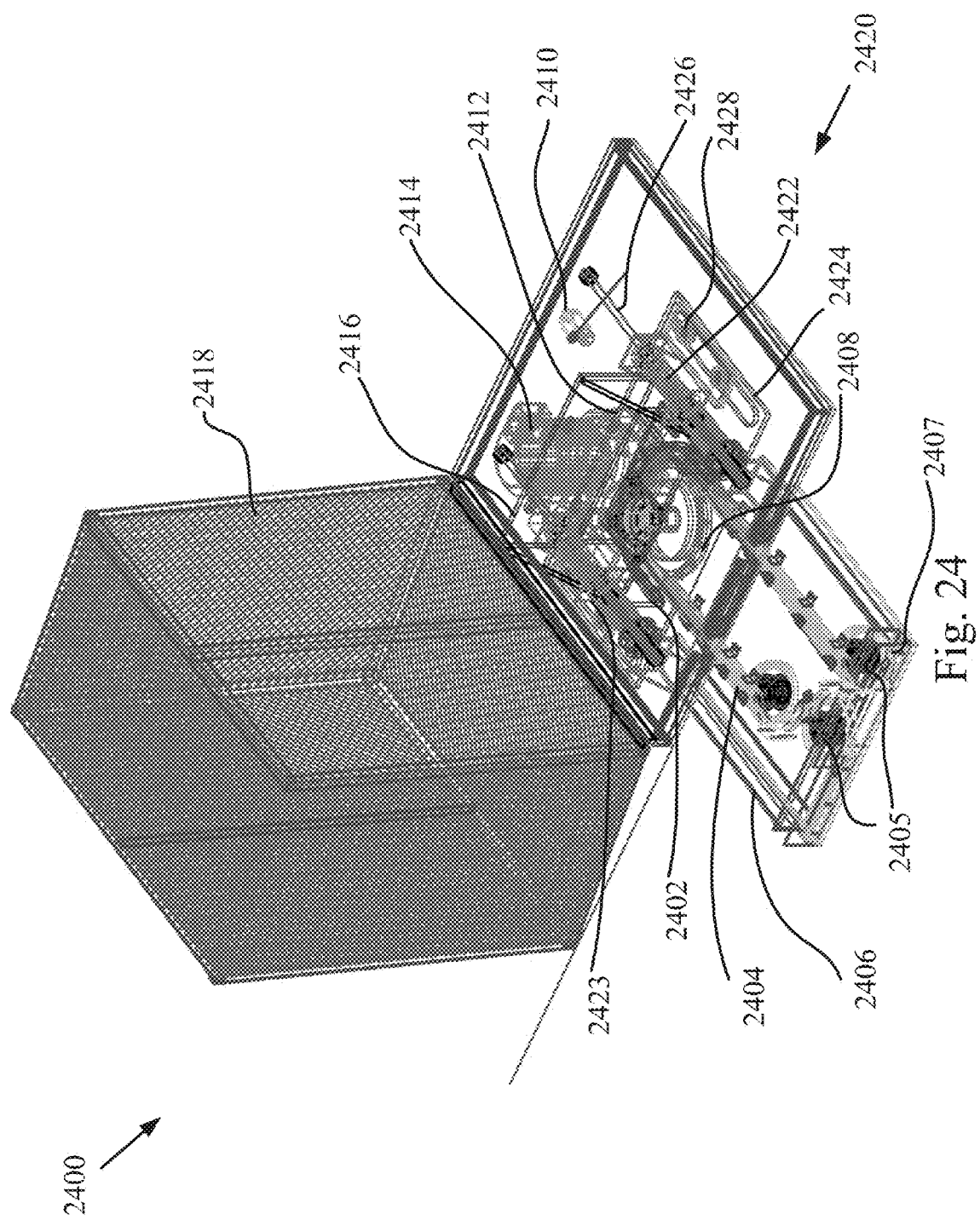
FIGS. 24-30 depict various views of an on-surface (or above ground) drive assembly.

FIG. 24 shows one embodiment of an on-surface drive assembly 2400 which may be mounted directly to the surface of a manufacturing facility floor. In this embodiment, a floating chassis take-up system 2420 provides automatic take-up of slack in a tow chain connected to the drive assembly 2400. The direct drive system employed by the on-surface drive assembly 2400 is coupled with an automatic take-up system 2420. The use of an automatic take-up system 2420 in addition to the on surface mounting configuration of the drive assembly 2400 allows the system to use a single tow chain configuration that does not need to accumulate excess chain. Using one chain instead of a tow chain and separate drive chain simplifies the system and decreases the possibility of binding or other mechanical issues. The single chain configuration also provides for smoother operation and easier maintenance and increases the modularity and adaptability of the system. The separate drive chain may be referred to as a "caterpillar chain" that separately drives the conveyor chain that is pulling a cart, carrier or other load carrying unit. The caterpillar chain must also be separately adjusted and maintained, increasing both costs and maintenance time. A caterpillar chain is commonly used in a monorail overhead conveyor or drop-forge chain system.

In a preferred embodiment the tow chain is in the form of a calibrated, welded, coil, or link, or log chain having a specific, known tensile strength. Other types of chains include drop forged chain, which may be sourced from manufacturers including Rapid Industries, Inc., TKF, Inc., and Jervis Webb, Inc. With the preferred embodiment the system load capability of the calibrated, welded, coil chain may be calculated based on the working load or capability of the chain and further based on the number of load-carrying units and anticipated load weight. Turns, elevation changes, and curves increase the load which would therefore result in less system capability and would require more system drive units. Other factors such as heat, friction, and other environmental conditions may also affect the friction factor and load on the chain which may reduce conveyor system capabilities. The working load for a chain is a value of what a chain can handle without excessive wear, tear, or maintenance. For example, if the tensile or breaking strength of the chain were 60,000 lbs. of chain pull, the load capacity of the tow chain would be a value of ⅙th of the breaking strength of the chain. In this example, the preferred load capacity value would be 10,000 lbs. of chain pull. This preferred load capacity value is the aggregate or total pull value over the entire length of the tow chain.

A consideration separate from the load capacity of the tow chain is desired tension of the tow chain. In the context of an "endless" or closed-loop chain system, the goal is to keep a consistent amount of tension on the chain to prevent slack and to also prevent over-tensioning. The combination of a floating chassis and adjustable tensioner, e.g., spring(s), achieves the desired tension maintained on the tow chain and conveyor system. The tensioner is preferably in the form of springs configured based on design considerations including length of chain, load parameters, etc. to arrive at a range of anticipated operational load conditions. In a preferred embodiment the tensioner is adjustable by way of a mechanism to adjust the amount of force effectively delivered to the floating chassis, such as by a threaded bolt to lengthen or shorten one or more springs of the tensioner. Further examples are hydraulic or pneumatic tensioners that may be adjusted by increasing or decreasing hydraulic or pneumatic pressure.

Avoiding slack is important for several reasons, for example, to ensure proper and efficient mechanical contact and engagement between chain links and the drive gear and to prevent sagging which results in undesired premature wear on the chain as it comes in contact with the chain guide throughout the conveyor system. Over-tensioning of the chain may cause binding or surging, e.g., may cause excessive force and torque of the bull gear and drive shaft causing undesired wear and fatigue on the bull gear and teeth. Methods for calculating chain load, chain tension, and methods for determining the amount of tension on an endless or closed loop chain as used in a conveyor system can be found in "The Complete Guide to Chain", U.S. Tsubaki, Inc., Sachio Shimura, 1997, ISBN 0-9658932-0-0, in at least Chapter 2, "Chain Dynamics", and more specifically in Chapter 2.2, "Chain Drive in Action", which is incorporated by reference herein in its entirety.

In one embodiment, the take-up system 2420 is a spring-loaded, cam-guided take-up system. In this embodiment the take-up system comprises a pair of springs 2422, which are configured to provide constant tension, to automatically remove slack from a tow chain connected to the drive system 2400. The take-up system 2422 further comprises a sliding chassis 2424 on which a gear reduction unit 2412 and variable speed motor 2414 are mounted. In addition to the gear reduction unit 2412 and variable speed motor 2414, an oiler or automatic chain oiler may be mounted on the sliding chassis 2424. The oiler may be configured with a sprayer, brush, or other oil applicator and may be further configured to automatically dispense or disperse oil or other lubricants on the tow chain. The oiler may be configured to continually dispense oil or other lubricants, or may be configured to dispense oil or other lubricants at regular intervals.

The take-up system further comprises a pair of guide rods 2426 and system cam guides 2428 which are configured to allow the springs 2422 to move the chassis 2424 along the guide rods 2426 and cam guides 2428. The cam guides 2428 may be either solid pins or rolling cams. In one embodiment, additional cam guides or bearings may be placed on both exterior sides of the sliding chassis 2424 parallel to the cam guides 2428 to further stabilize the sliding chassis 2424 and to further prevent torquing or twisting of the sliding chassis 2424. In one embodiment, the guide rods 2426 may be threaded to allow for fine adjustment of spring tension. A bolt may be welded on one end of the guide rod 2426 and another bolt on the distal end of the rod may be tightened to shorten the springs 2422 thereby increasing spring tension. In an exemplary embodiment, ACME threading is used on the guide rods 2426 to prevent the binding, stripping, or marring of the threading on the guide rods 2426. In more traditional below surface drive assemblies, a recess for excess chain is necessary. In other words, excess chain may collect in a special recess. This excess chain is a result of chain wear and tear as chains lengthen over the course of time and the conveying system 100 must accommodate for such variances in tow chain length.

In the exemplary on-surface drive assembly 2400 of the present invention, no such recess is necessary because springs 2422 allow on-surface drive assembly 2400 to move in relation to the fixed position of the track. As the tow chain loosens, the springs retract or expand, depending on their orientation, to keep the tow chain taught within an acceptable range or tolerance, which refers to a range to prevent undesirable slippage and tow pin disengagement. That is, on-surface drive assembly 2400 moves to accommodate the excess tow chain, thereby removing the need to collect excess chain. In another embodiment, not shown, on-surface drive assembly 2400 may utilize a single spring, or other configurations of multiple springs. In one embodiment, more clearly shown in FIG. 25, a guide rod 2426 passes through the center of spring 2422. Guide rod 2426 prevents spring 2422 from buckling or becoming misaligned by allowing the spring to move only along a singular linear axis. As springs 2422 compress and decompress, they move along the axis created by guide rod 2426. Cam guides 2428 further facilitate movement of the drive assembly 2400 along the guide rods 2426. The springs 2422 may also be two separate springs oriented on either side of the chassis 2424 in a four spring configuration wherein two springs on the each of the guide rods 2426 are separated by a plate 2423. The plate 2423 and set of springs 2422 in this embodiment work to keep the chassis 2424 centered and also allow for the automatic correction of both over- and under-tensioning. This multiple-spring-per-guide rod configuration has the benefit of centering the drive, balancing the drive, and for correcting both over and under tensioning.

Similarly, other embodiments may differ in the type of tensioning mechanism used. Instead of springs, hydraulic, air, or air over oil tensioning mechanisms may be used to provide tensioning to the on-surface drive assembly 2400. Should excess tow chain exceed the amount of take-up permitted, or put another way, exceeds an acceptable range or tolerance, by springs 2422 of on-surface drive assembly 2200, maintenance may be performed to shorten the tow chain. When this occurs, on-surface drive assembly 2200 would be re-tensioned to allow for the shortened tow chain. To adjust the tow chain, the drive assembly 2200 is first stopped. A hydraulic, pneumatic, or other mechanical jack is then placed behind the chassis 2424 and the chassis 2424 is then moved forward to relieve tension along the tow chain. The chain is then shortened by removing links from the chain, and after the shortening of the chain, the hydraulic jack is removed and system operation is resumed. The assembly 2400 automatically stops functioning when system stop assembly 2410 is triggered. An arm on system stop assembly 2410 is configured to activate a switch in the assembly 2410 when the chassis 2424 is moved by springs 2422 beyond a predetermined threshold. This threshold indicates that excess slack has been produced in the tow chain and that the system must undergo maintenance to have the tow chain shortened. In this way, on-surface drive assembly 2400 allows for significant variances of tow-chain length and may be configured to take-up two feet or more in chain length before maintenance must be performed to shorten the tow chain.

Also shown in the on-surface drive assembly 2400 of FIG. 24 is variable speed motor 2414 which provides locomotion to the tow chain by turning a drive wheel or bull gear or sprocket 2408, such as that shown in FIG. 14B. The drive motor 2414 may be electrically powered and may be variable in frequency (e.g., frequency may vary from 1 foot of chain per minute to 30 feet of chain per minute). As an exemplary example, Euro Drive motor SEW MM15D-503-00 may be used. Other types of drive motors known in the art may be used.

A drive system housing 2418 is connected to drive system 2400 and provides protection for the drive system 2400 and prevents foreign objects and other matter from interfering with the operation of the drive system. A tow chain is directed to the drive wheel 2408 through a calibrated drive chain guide 2404 which is connected to a rail such as that depicted in FIGS. 13A-13C. The tow chain is further guided by guide roller wheels 2405 which operate to direct the chain along the drive chain guide 2404. The roller wheels 2405 form the transmission or transmission box for the on-surface drive assembly 2400. A chain guide 2402 is configured around drive wheel 2408 to ensure the tow chain remains positioned on the drive wheel and to facilitate lubrication of the tow chain and drive wheel 2408. The drive chain guide 2404 and guide roller wheels 2405 are mounted within the side tow drive transition box 2406. An alternate configuration of the drive transition box to provide for transition of carts in a center pin configuration is described in U.S. patent application Ser. No. 13/223,234 (U.S. Pat. Pub. 2013/0048472) which has been incorporated herein by reference. Additionally, the roller wheels 2405 may be supplemented by additional roller wheels to direct the tow chain below the level of the on-surface drive assembly to provide for the use of center pin carts or load carriers. In this manner the on-surface drive system accommodates center pin cart systems while requiring minimal recess into the floor, such as concrete, of the manufacturing area limited to the transition area. In so doing the system does not become a "monument" or fixed artifact or at least a very minor one.

The tow chain (not pictured) passes through track 2404 and follows along a series of guide roller wheels 2405 into and out of on-surface drive assembly 2400. Additional pieces of track may be used between guide roller wheels 2405 to facilitate passage of tow chain. As those skilled in the art appreciate, various configurations of guide roller wheels 2405 and track 2404 are possible and may be dependent upon the specific requirements of individual conveying system configurations and installations.

Figure 25:
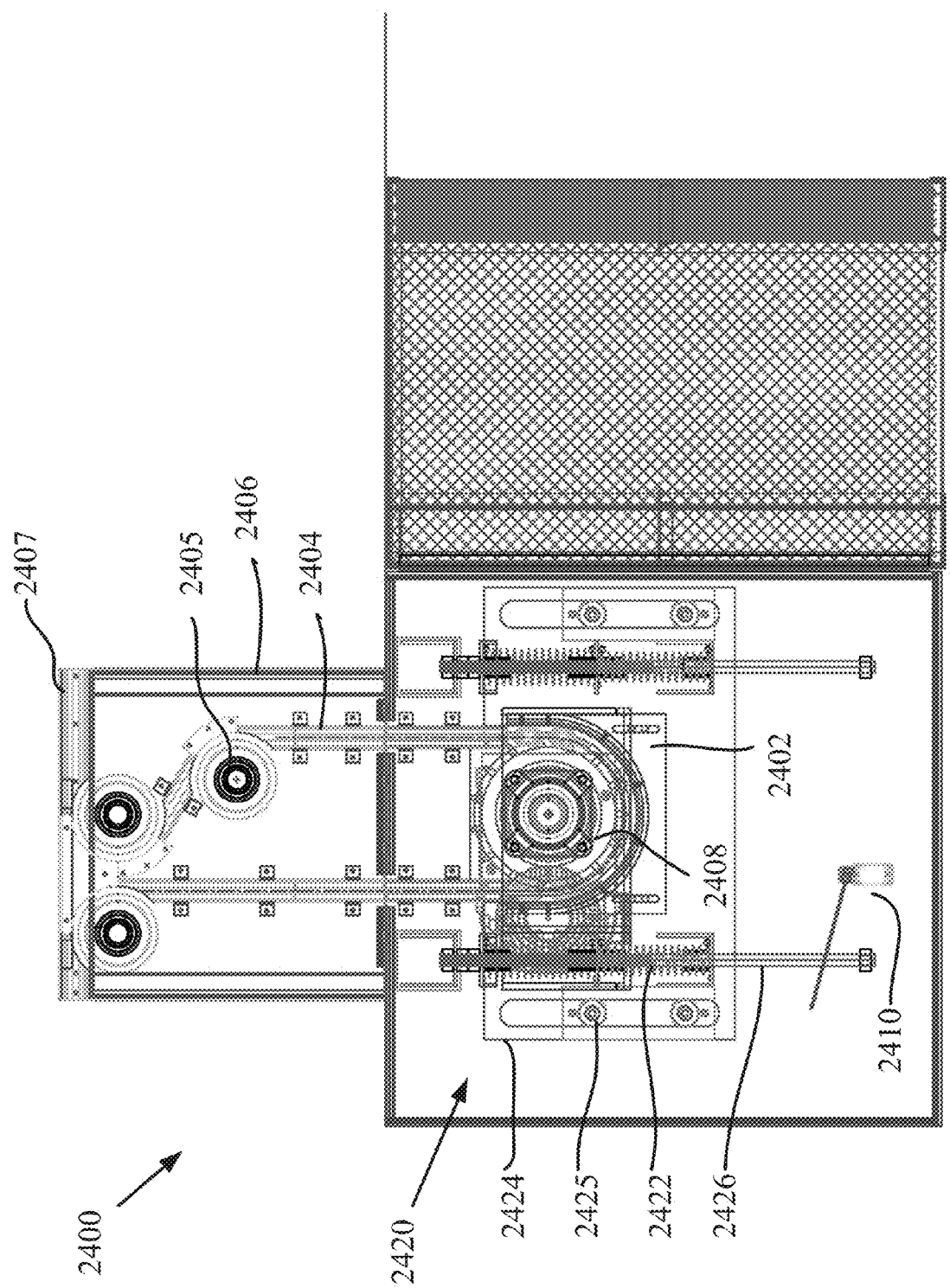

With respect to FIG. 25, a plan view of an exemplary embodiment of the drive system 2400 is provided. The plan view shows more clearly the drive transition box 2406 which comprises tow pin cross over rail guide 2407, guide roller wheels 2405, and calibrated drive chain guide 2404. In one embodiment, the drive transition box 2406 may further comprise a set of ramps on either side of the drive transition box to enable a cart, such as cart 200 in FIG. 2, to more easily traverse the drive transition box 2406. The plan view also more clearly shows the components of the floating take-up system 2420. The sliding chassis 2424 on which the motor and gear box assembly are mounted is connected to a pair of springs 2422 which are guided by a pair of guide rods 2426. A set of guide roller wheels 2405 provide additional stability to the take-up system 2420 and reduce the chance of the system 2400 binding or moving off track. The take-up system 2420 allows the drive assembly to automatically and freely adjust to take up any slack in the tow chain connected to the system by moving the entire take-up system 2420 along the guide rods 2426 and cam guides 2425. When the system 2400 has moved a predetermined amount the system stop assembly 2410 stops the system for maintenance to enable the tow chain to be shortened and the system 2400 returned to normal operation.

Figure 26:
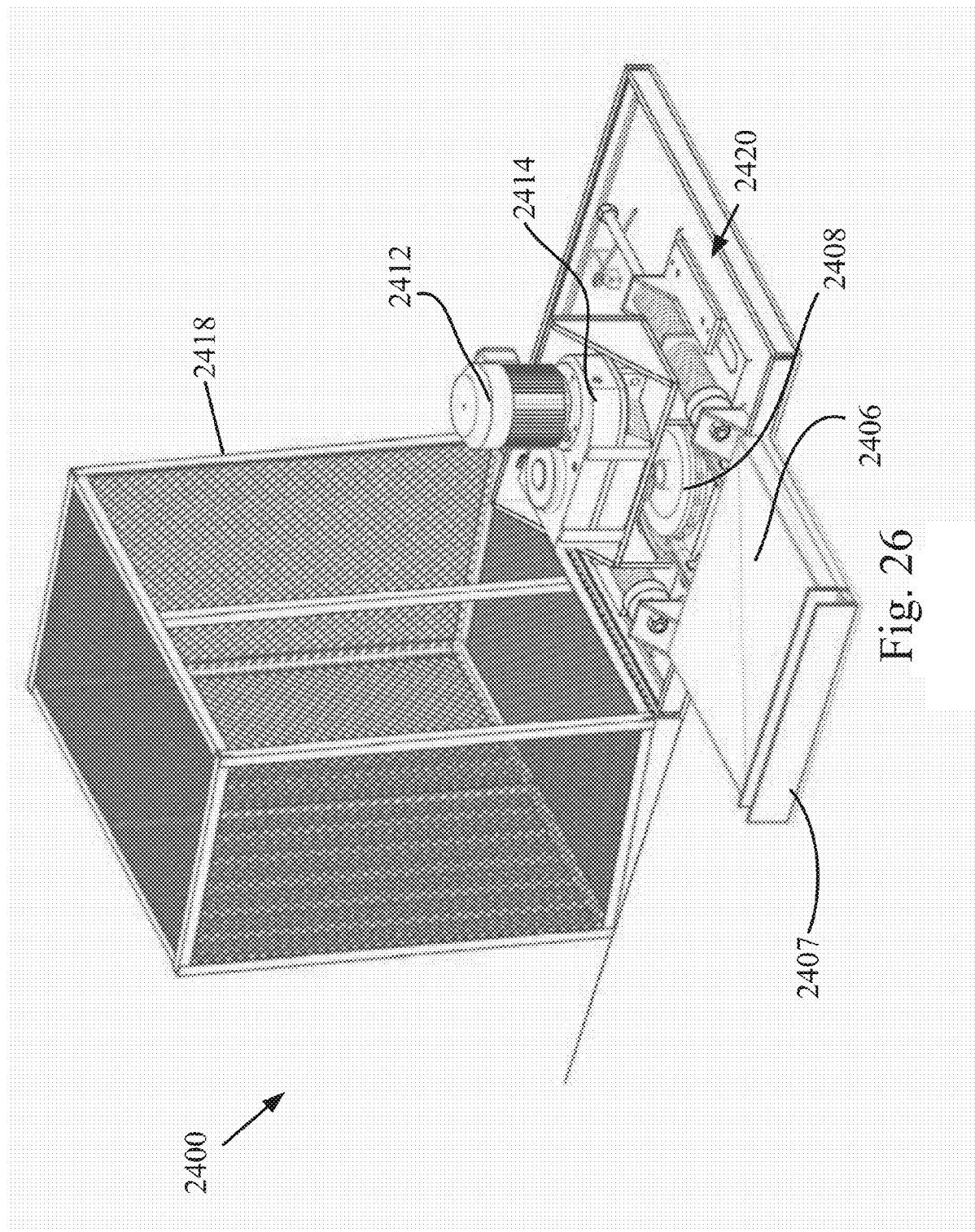
Figure 27:
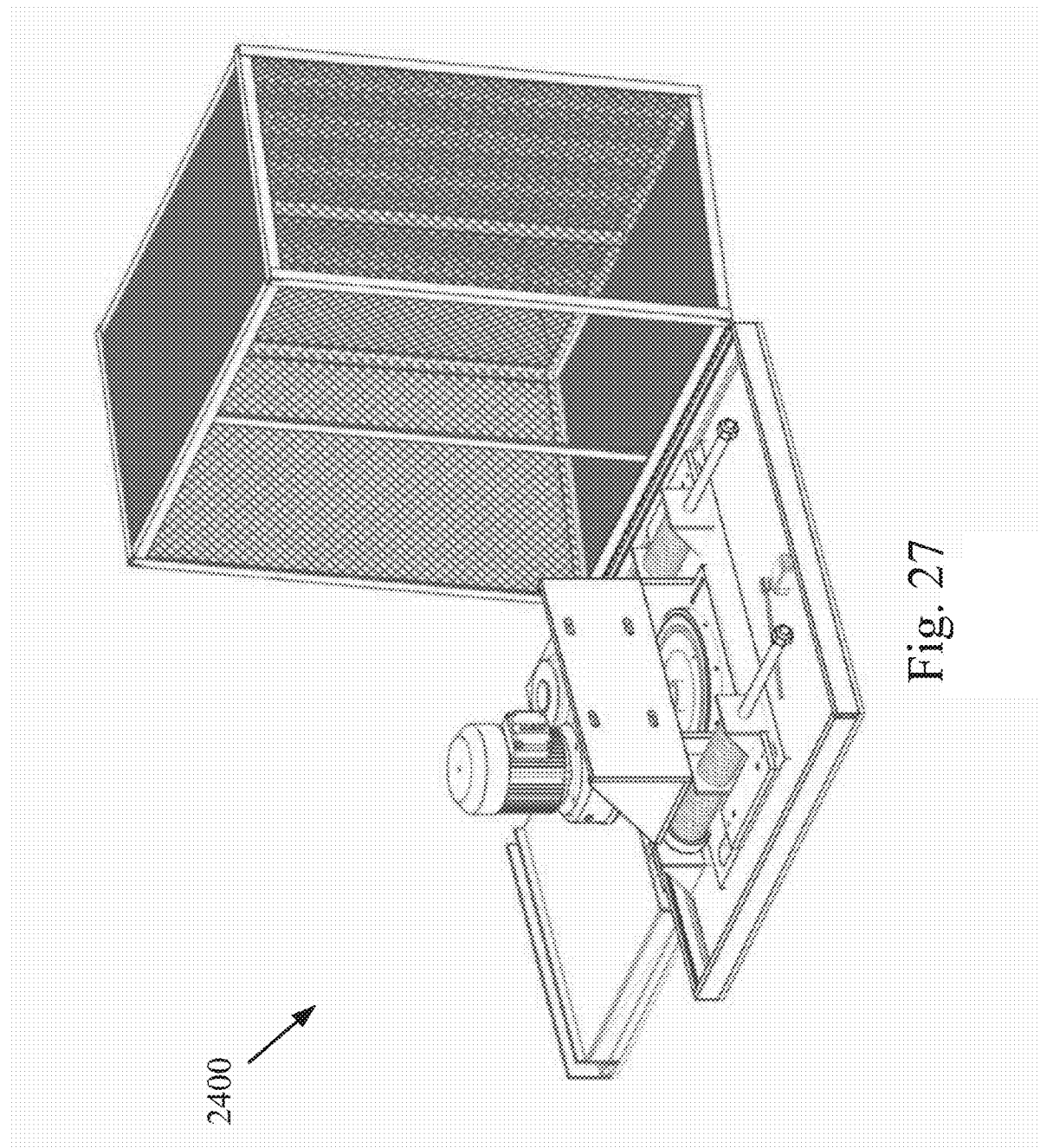
Figure 28:
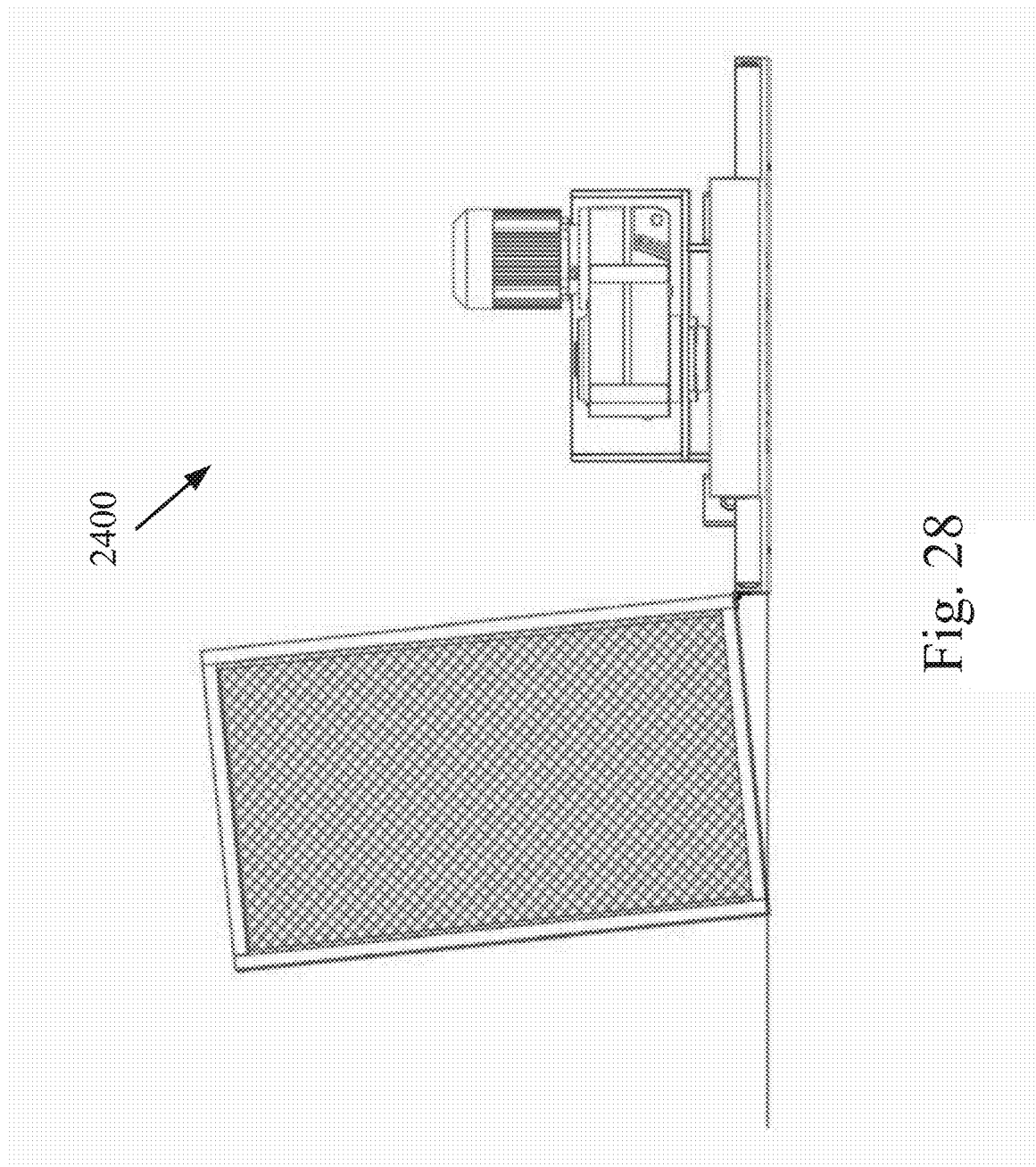
Figure 29:
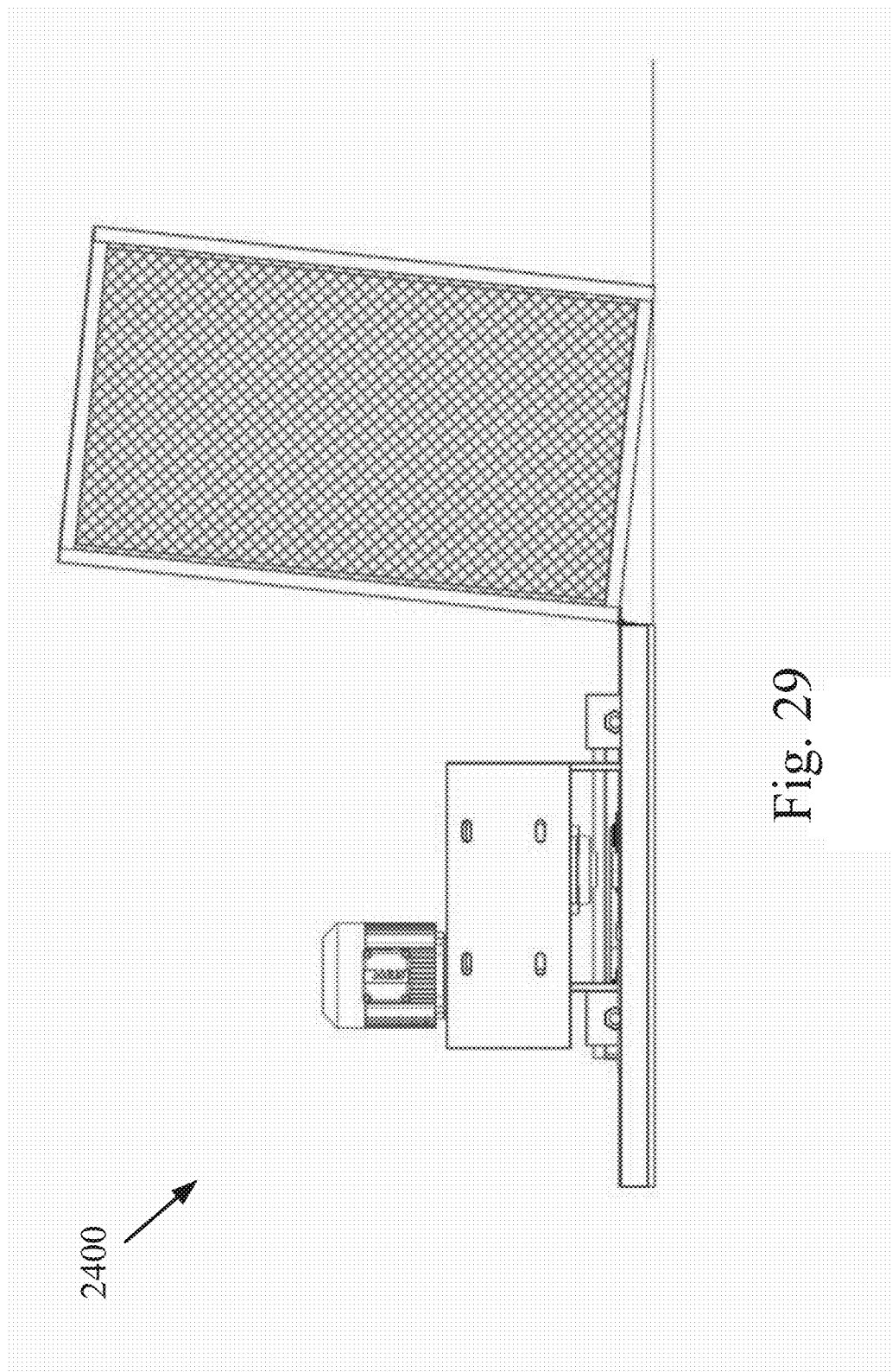
Figure 30:
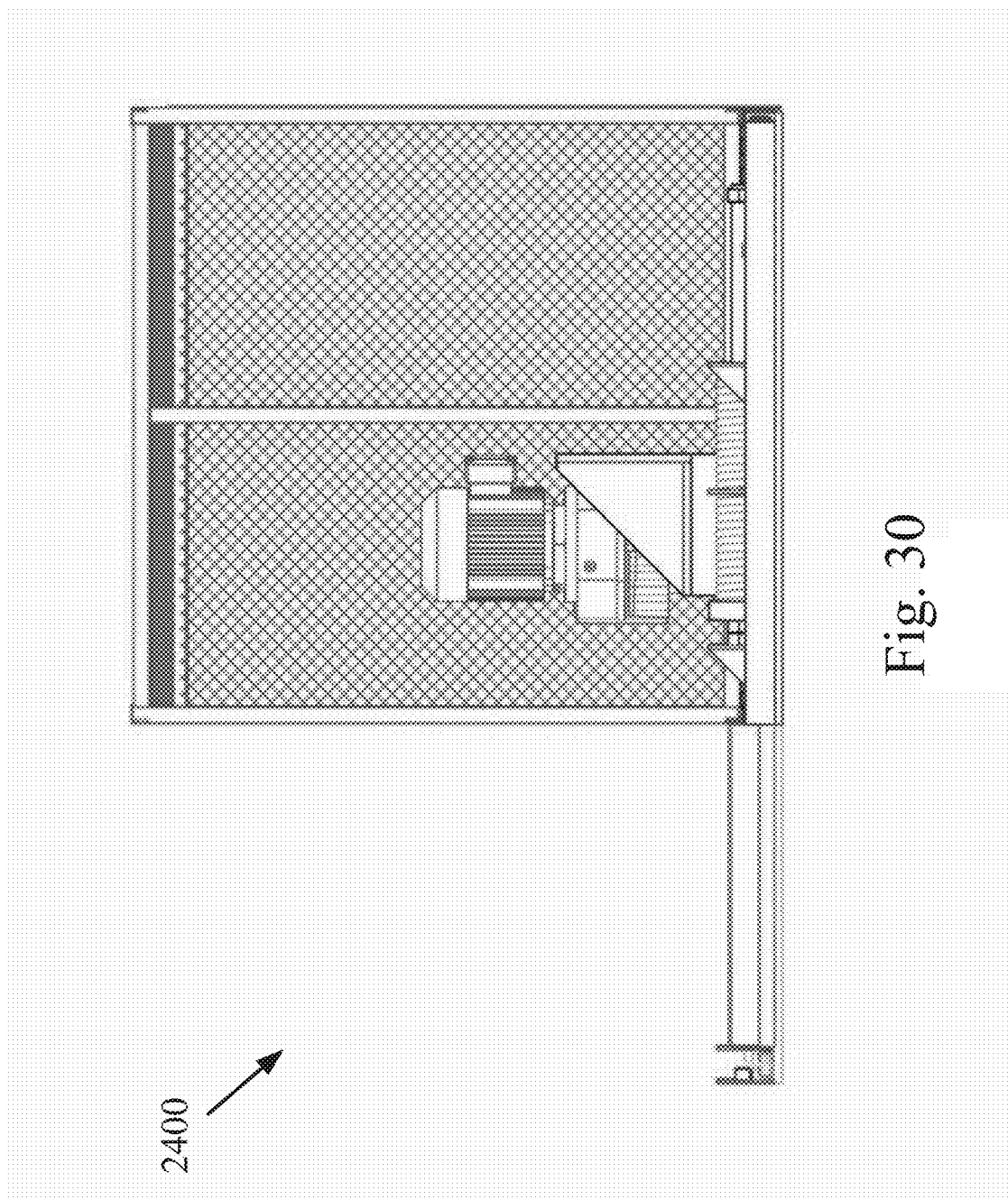

With respect to FIG. 26, a front perspective view of an exemplary embodiment of the drive system 2400 is provided. The perspective view shows how the motor 2412 and gear reduction unit 2414 are mounted to the take up system 2420. The gear reduction system 2414 and motor 2412 are directly connected to the drive wheel 2408 to which a tow chain would be engaged. The side tow drive transition box 2406 is shown covered. The tow pin cross over rail guide 2407 is shown in a configuration provided in FIGS. 13A-13C. The housing 2418 is shown open, but would normally remain closed while the system 2400 was in operation.

As shown in FIGS. 27 through 30, rear perspective, front, rear and side views, respectively, of an embodiment of the drive system 2400 are provided. The tow chain (not pictured) passes through track 2914 and follows along a series of guide roller wheels 2904 into and out of on-surface drive assembly 2900. Additional pieces of track 2906 may be used between guide roller wheels 2904 to facilitate passage of tow chain. As those skilled in the art appreciate, various configurations of guide roller wheels 2904 and track 2906 are possible and may be dependent upon the specific requirements of individual conveying system configurations and installations.

FIGS. 31-43 illustrate exemplary embodiments and components of the synchronous set center endless chain drive conveyor system invention.

With reference to FIG. 31, an embodiment of an on-surface (or above ground) drive assembly 3100 according to the present invention is provided. The on-surface drive assembly 3100 allows a conveying system to be installed in manufacturing facility without the need to mount a traditional drive assembly below the surface of the manufacturing facility floor, upon which the track for the conveying system rests and carts travel. Mounting the on-surface drive assembly 3100 on the surface of the floor, as opposed to beneath the floor's surface reduces cost and instillation time while facilitating easier access for maintenance. FIG. 31 shows one exemplary embodiment of on-surface drive assembly 3100.

FIG. 31 shows one embodiment of an on-surface drive assembly 3100 which may be mounted directly to the surface of a manufacturing facility floor. In this embodiment, a floating chassis take-up system 4000 provides automatic take-up of slack in a tow chain connected to the drive assembly 3100. The direct drive system employed by the on-surface drive assembly 3100 is coupled with an automatic take-up system 4000. The use of an automatic take-up system 4000 in addition to the on surface mounting configuration of the drive assembly 3100 allows the system to use a single tow chain configuration that does not need to accumulate excess chain. Using one chain instead of a tow chain and separate drive chain simplifies the system and decreases the possibility of binding or other mechanical issues. The single chain configuration also provides for smoother operation and easier maintenance and increases the modularity and adaptability of the system. The separate drive chain may be referred to as a "caterpillar chain" that separately drives the conveyor chain that is pulling a cart, carrier or other load carrying unit. The caterpillar chain must also be separately adjusted and maintained, increasing both costs and maintenance time. A caterpillar chain is commonly used in a monorail overhead conveyor or drop-forge chain system.

In a preferred embodiment the tow chain is in the form of a calibrated, welded, coil, or link, or log chain having a specific, known tensile strength. Other types of chains include drop forged chain, which may be sourced from manufacturers including Rapid Industries, Inc., TKF, Inc., and Jervis Webb, Inc. With the preferred embodiment the system load capability of the calibrated, welded, coil chain may be calculated based on the working load or capability of the chain and further based on the number of load-carrying units and anticipated load weight. Turns, elevation changes, and curves increase the load which would therefore result in less system capability and would require more system drive units. Other factors such as heat, friction, and other environmental conditions may also affect the friction factor and load on the chain which may reduce conveyor system capabilities. The working load for a chain is a value of what a chain can handle without excessive wear, tear, or maintenance. For example, if the tensile or breaking strength of the chain were 60,000 lbs. of chain pull, the load capacity of the tow chain would be a value of ⅙th of the breaking strength of the chain. In this example, the preferred load capacity value would be 10,000 lbs. of chain pull. This preferred load capacity value is the aggregate or total pull value over the entire length of the tow chain.

A consideration separate from the load capacity of the tow chain is desired tension of the tow chain. In the context of an "endless" or closed-loop chain system, the goal is to keep a consistent amount of tension on the chain to prevent slack and to also prevent over-tensioning. The combination of a floating chassis and adjustable tensioner, e.g., spring(s), achieves the desired tension maintained on the tow chain and conveyor system. The tensioner is preferably in the form of springs configured based on design considerations including length of chain, load parameters, etc. to arrive at a range of anticipated operational load conditions. In a preferred embodiment the tensioner is adjustable by way of a mechanism to adjust the amount of force effectively delivered to the floating chassis, such as by a threaded bolt to lengthen or shorten one or more springs of the tensioner. Further examples are hydraulic or pneumatic tensioners that may be adjusted by increasing or decreasing hydraulic or pneumatic pressure.

Avoiding slack is important for several reasons, for example, to ensure proper and efficient mechanical contact and engagement between chain links and the drive gear and to prevent sagging which results in undesired premature wear on the chain as it comes in contact with the chain guide throughout the conveyor system. Over-tensioning of the chain may cause binding or surging, e.g., may cause excessive force and torque of the bull gear and drive shaft causing undesired wear and fatigue on the bull gear and teeth. Methods for calculating chain load, chain tension, and methods for determining the amount of tension on an endless or closed loop chain as used in a conveyor system can be found in "The Complete Guide to Chain", U.S. Tsubaki, Inc., Sachio Shimura, 1997, ISBN 0-9658932-0-0, in at least Chapter 2, "Chain Dynamics", and more specifically in Chapter 2.2, "Chain Drive in Action", which is incorporated by reference herein in its entirety.

In one embodiment, the take-up system 4000 is a spring-loaded, cam-guided take-up system. In this embodiment the take-up system 4000 (shown in greater detail in FIG. 40) comprises a pair of springs, which are configured to provide constant tension, to automatically remove slack from a tow chain connected to the drive system 3100. The take-up system 4000 further comprises a sliding chassis 3124 on which a gear reduction unit 3112 and variable speed motor 3114 are mounted. In addition to the gear reduction unit 3112 and variable speed motor 3114, an oiler or automatic chain oiler may be mounted on the sliding chassis 3124. The oiler may be configured with a sprayer, brush, or other oil applicator and may be further configured to automatically dispense or disperse oil or other lubricants on the tow chain. The oiler may be configured to continually dispense oil or other lubricants, or may be configured to dispense oil or other lubricants at regular intervals.

Figure 40:
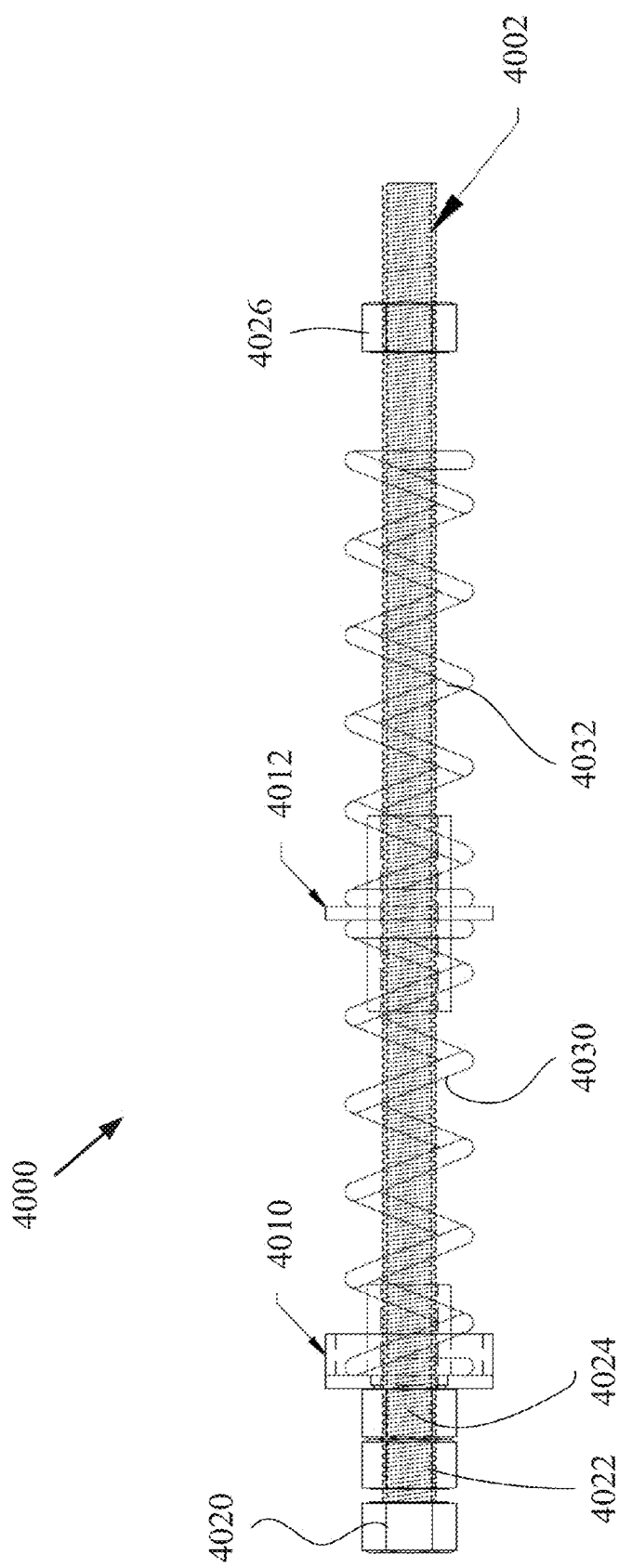

With reference now also to FIG. 40, the take-up system 4000 further comprises a pair of guide rods 4002 and system cam guides 3128 (shown in FIG. 31) which are configured to allow the springs 4030 and 4032 to move the chassis 3124 along the guide rods 4002 and cam guides 3128. The cam guides 3128 may be either solid pins or rolling cams. In one embodiment, additional cam guides or bearings may be placed on both exterior sides of the sliding chassis 3124 parallel to the cam guides 3128 to further stabilize the sliding chassis 3124 and to further prevent torquing or twisting of the sliding chassis 3124. In one embodiment, the guide rods 4002 may be threaded to allow for fine adjustment of spring tension. An additional tensioning system and method is shown in greater detail in FIG. 40. In an exemplary embodiment, ACME threading is used on the guide rods 4002 to prevent the binding, stripping, or marring of the threading on the guide rods 4002. In more traditional below surface drive assemblies, a recess for excess chain is necessary. In other words, excess chain may collect in a special recess. This excess chain is a result of chain wear and tear as chains lengthen over the course of time and the conveying system 3100 must accommodate for such variances in tow chain length.

With reference back to FIG. 31, in the exemplary on-surface drive assembly 3100 of the present invention, no such recess is necessary because springs 4030 and 4032 allow on-surface drive assembly 3100 to move in relation to the fixed position of the track. As the tow chain loosens, the springs retract or expand, depending on their orientation, to keep the tow chain taught within an acceptable range or tolerance, which refers to a range to prevent undesirable slippage and tow pin disengagement. That is, on-surface drive assembly 3100 moves to accommodate the excess tow chain, thereby removing the need to collect excess chain. In another embodiment, not shown, on-surface drive assembly 3100 may utilize a single spring, or other configurations of multiple springs. In one embodiment, more clearly shown in FIG. 40, a guide rod 4002 passes through the center of springs 4030 and 4032. Guide rod 4002 prevents springs 4030 and 4032 from buckling or becoming misaligned by allowing the spring to move only along a singular linear axis. As springs 4030 and 4032 compress and decompress, they move along the axis created by guide rod 4002. Cam guides 3128 further facilitate movement of the drive assembly 3100 along the guide rods 4002. The springs 4030 and 4032 are two separate springs oriented on either side of the chassis 3124 in a four spring configuration wherein two springs on the each of the guide rods 4002 are separated by a plate 4012. The plate 4012 and set of springs 4030 and 4032 in this embodiment work to keep the chassis 3124 centered and also allow for the automatic correction of both over- and under-tensioning. This multiple-spring-per-guide rod configuration has the benefit of centering the drive, balancing the drive, and for correcting both over and under tensioning.

Similarly, other embodiments may differ in the type of tensioning mechanism used. Instead of springs, hydraulic, air, or air over oil tensioning mechanisms may be used to provide tensioning to the on-surface drive assembly 3100. Should excess tow chain exceed the amount of take-up permitted, or put another way, exceeds an acceptable range or tolerance, by springs 4030 and 4032 of on-surface drive assembly 3100, maintenance may be performed to shorten the tow chain. When this occurs, on-surface drive assembly 3100 would be re-tensioned to allow for the shortened tow chain. To adjust the tow chain, the drive assembly 3100 is first stopped. A hydraulic, pneumatic, or other mechanical jack is then placed behind the chassis 3124 and the chassis 3124 is then moved forward to relieve tension along the tow chain. The chain is then shortened by removing links from the chain, and after the shortening of the chain, the hydraulic jack is removed and system operation is resumed. The assembly 3100 automatically stops functioning when a system stop is triggered. An arm on a system stop assembly is configured to activate a switch in the assembly when the chassis 3124 is moved by springs 4030 and 4032 beyond a predetermined threshold. This threshold indicates that excess slack has been produced in the tow chain and that the system must undergo maintenance to have the tow chain shortened. In this way, on-surface drive assembly 3100 allows for significant variances of tow-chain length and may be configured to take-up two feet or more in chain length before maintenance must be performed to shorten the tow chain.

Also shown in the on-surface drive assembly 3100 of FIG. 31 is variable speed motor 3114 which provides locomotion to the tow chain by turning a drive wheel or bull gear or sprocket 3108. The drive motor 3114 may be electrically powered and may be variable in frequency (e.g., frequency may vary from 1 foot of chain per minute to 30 feet of chain per minute). As an exemplary example, Euro Drive motor SEW MM15D-503-00 may be used. Other types of drive motors known in the art may be used.

Figure 38:
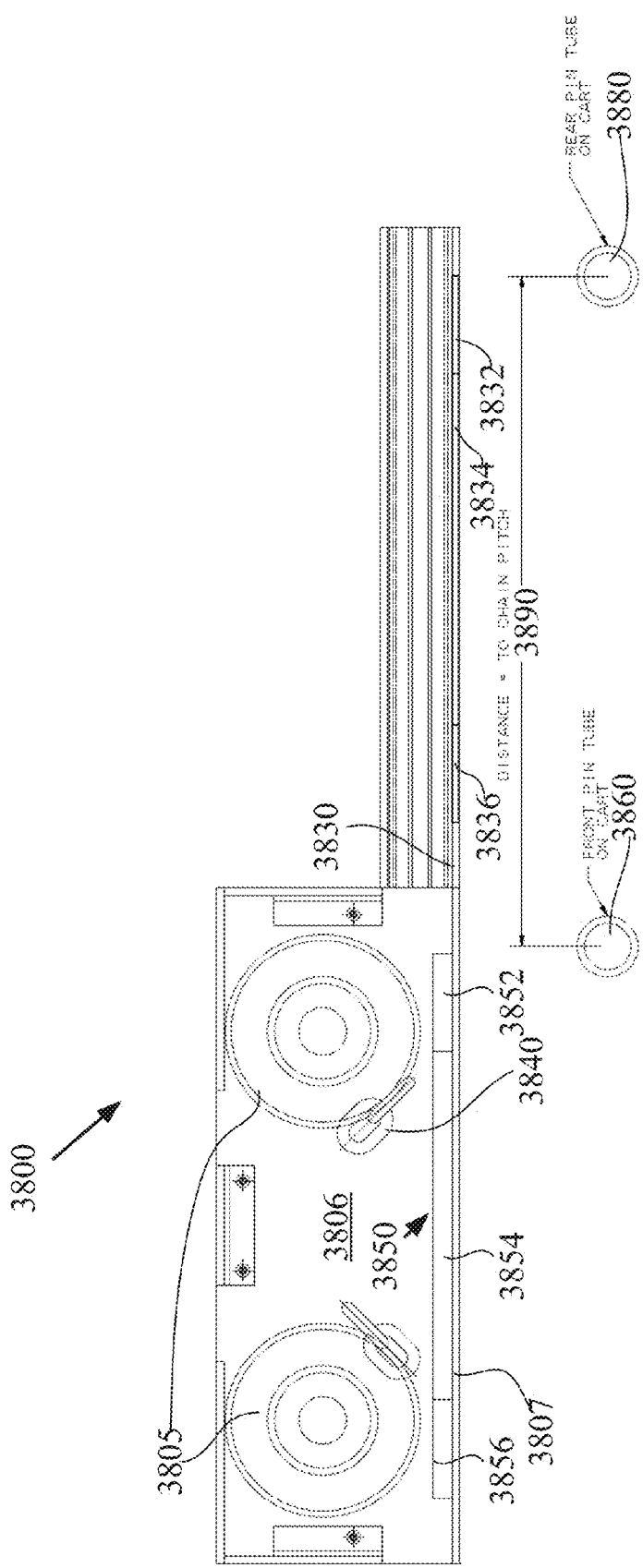
Figure 41:
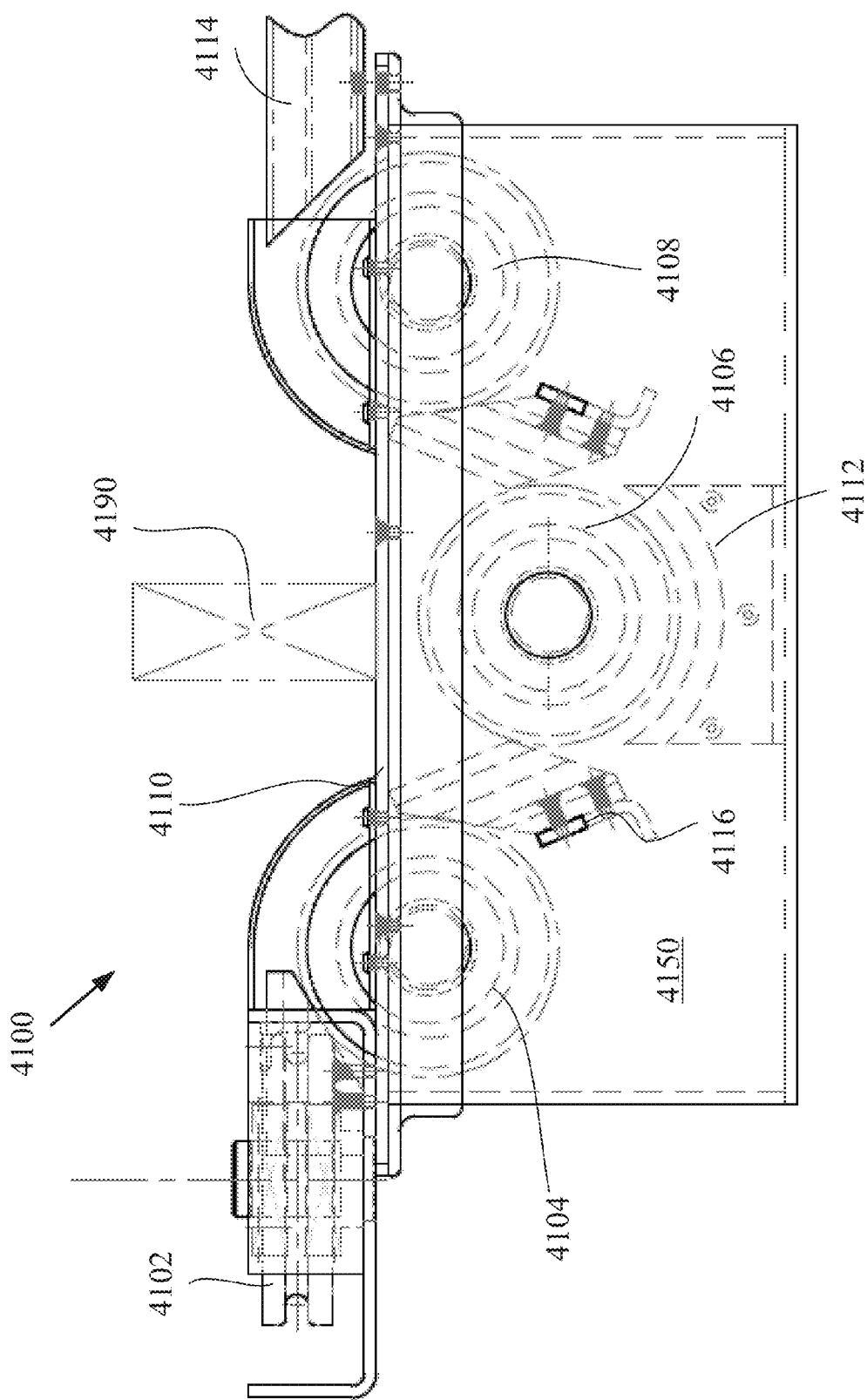
Figure 42:
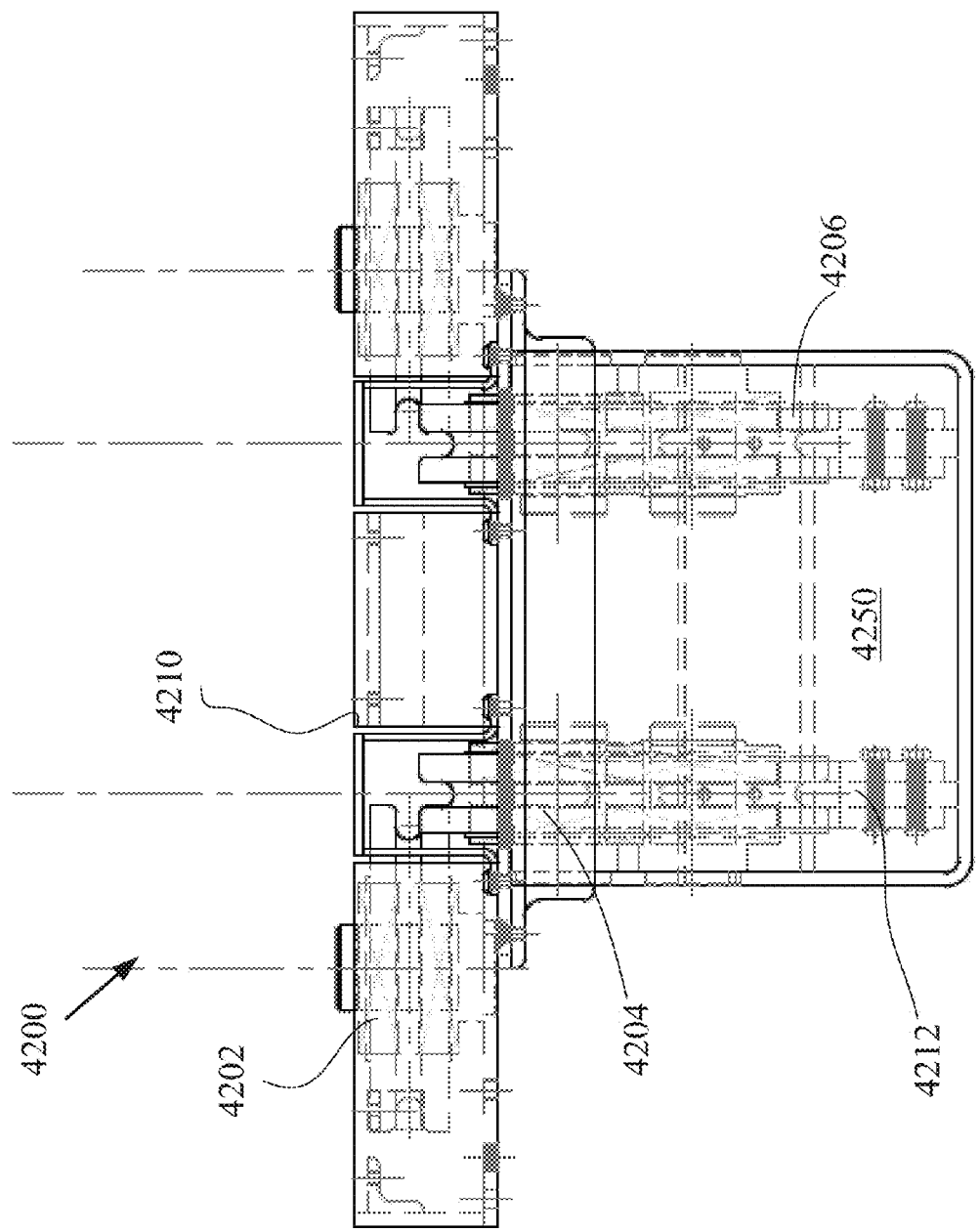
Figure 43:
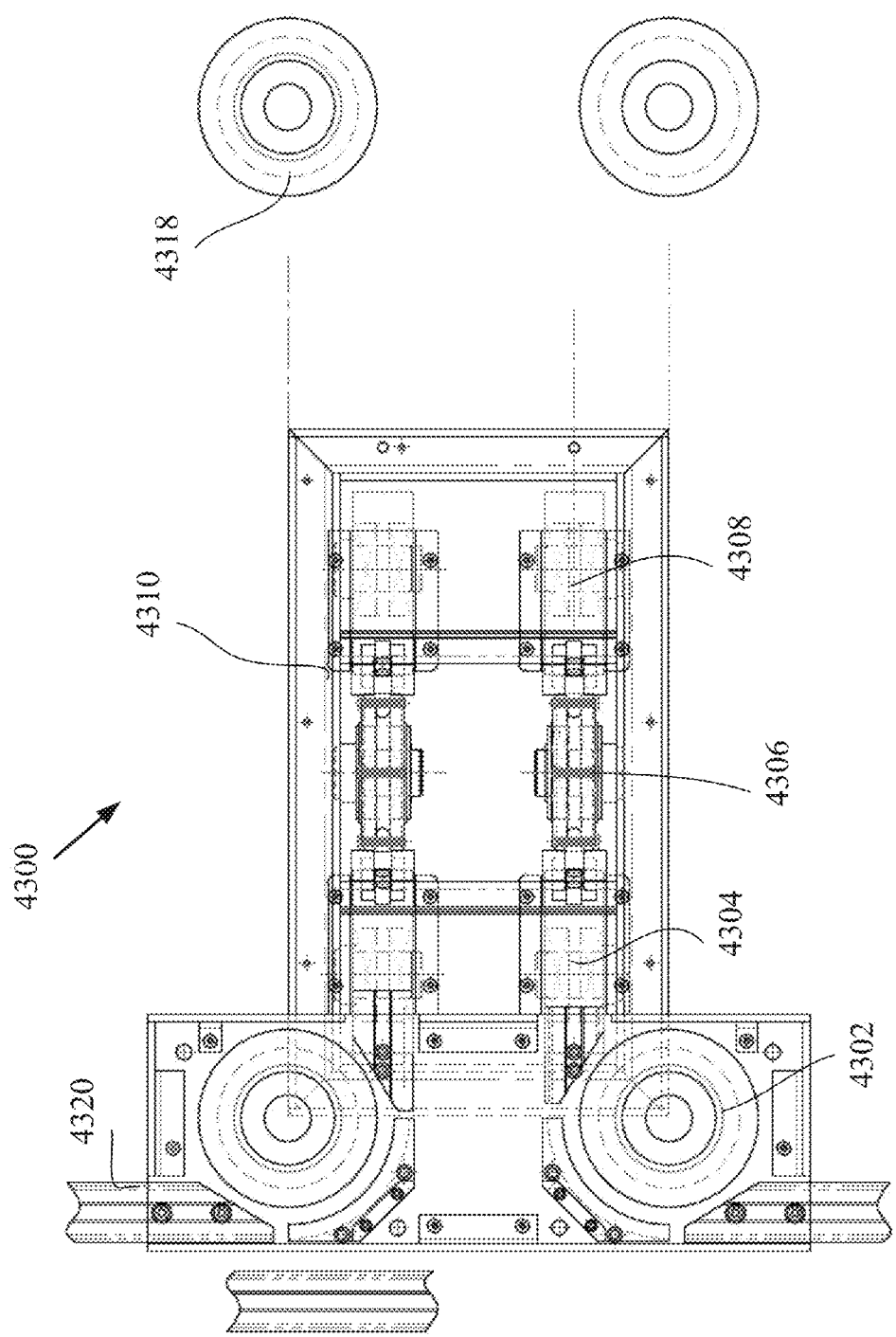
Figure 44:
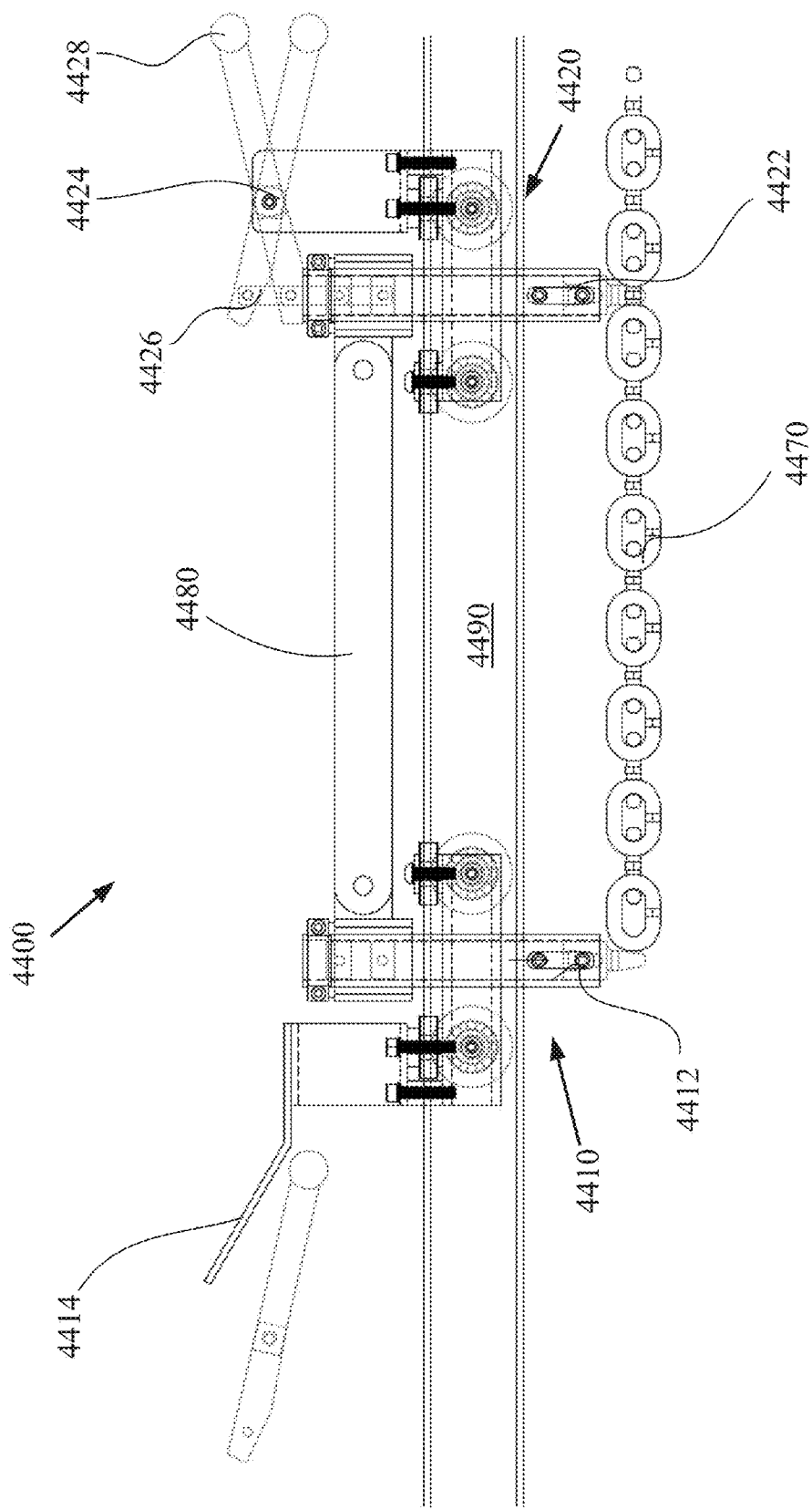
Figure 45:
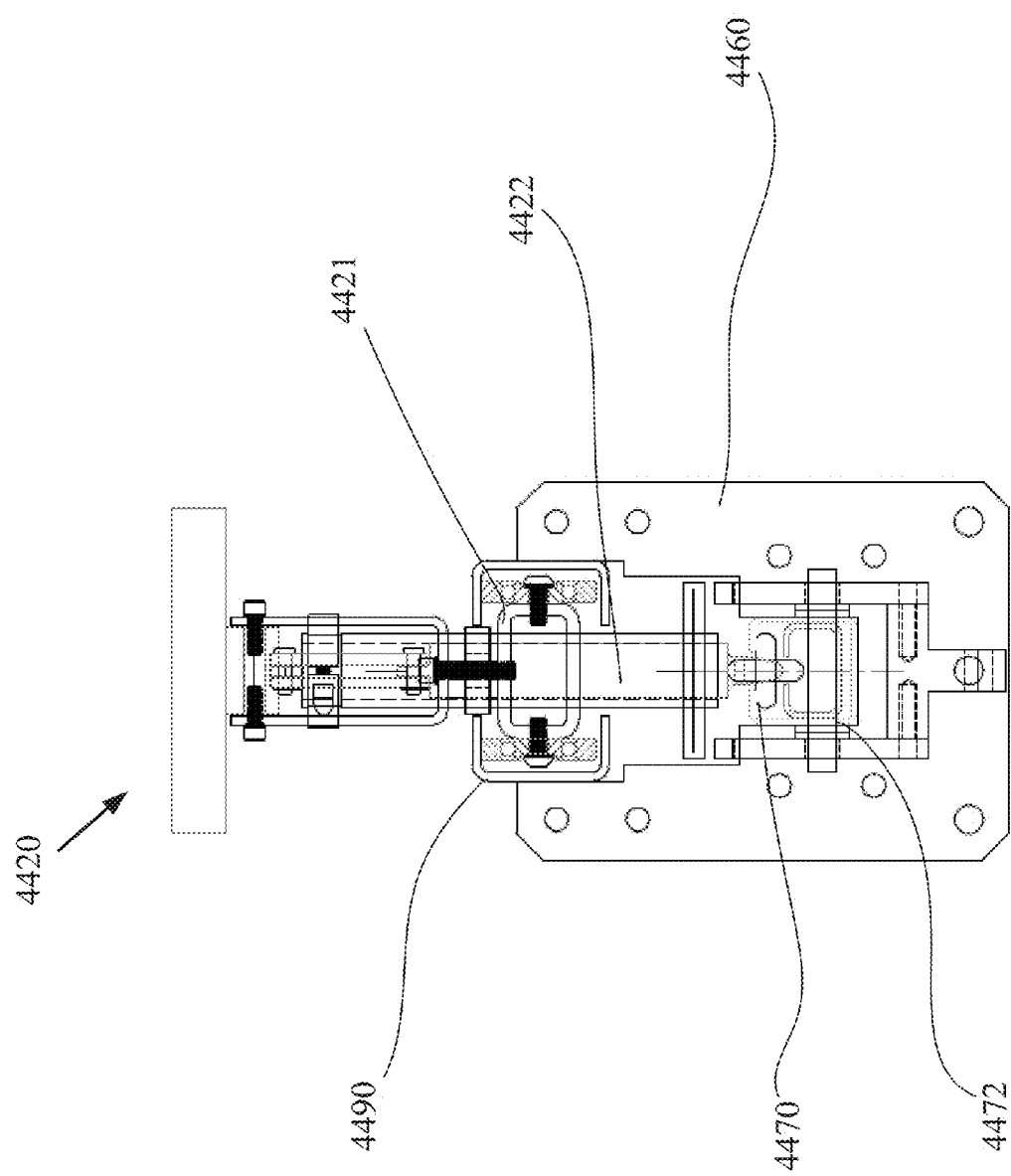

A drive system housing 3118 is connected to drive system 3100 and provides protection for the drive system 3100 and prevents foreign objects and other matter from interfering with the operation of the drive system. A tow chain is directed to the drive wheel 3108 through a calibrated drive chain guide which is connected to a rail such as that depicted in FIGS. 33A-33C. The tow chain is further guided by guide roller wheels 3805, as seen in FIG. 38, which operate to direct the chain along the drive chain guide springs 4030 and 4032. The roller wheels 3805 form the transmission or transmission box for the on-surface drive assembly 3100. A chain guide is configured around drive wheel 3108 to ensure the tow chain remains positioned on the drive wheel and to facilitate lubrication of the tow chain and drive wheel 3108. The drive chain guide and guide roller wheels 3805 are mounted within the side tow drive crossover 3106. An alternate configuration of the drive crossover to provide for transition of carts in a center pin configuration is shown in FIGS. 41-43. Additionally, the roller wheels 3805 may be supplemented by additional roller wheels to direct the tow chain below the level of the on-surface drive assembly to provide for the use of center pin carts or load carriers. In this manner the on-surface drive system accommodates center pin cart systems while requiring minimal recess into the floor, such as concrete, of the manufacturing area limited to the transition area. In so doing the system does not become a "monument" or fixed artifact or at least a very minor one.

The tow chain (not pictured) follows along a series of guide roller wheels 3805 into and out of on-surface drive assembly 3100. Additional pieces of track may be used between guide roller wheels 3805 to facilitate passage of tow chain. As those skilled in the art appreciate, various configurations of guide roller wheels 3805 are possible and may be dependent upon the specific requirements of individual conveying system configurations and installations.

In another embodiment of the present invention, the conveyor system described herein may be implemented as an elevated conveyor system. The elevated conveyor system may comprise many of the elements of the on surface conveyor system including accumulators, turning devices, load carrying units, pushers, and one or more drive assemblies. The drive assemblies used in the elevated conveyor system may be either an elevated in-ground drive assembly such as those shown in U.S. Pat. Pub. 2013/0048472 in at least FIG. 13, or an elevated surface-mounted drive system as described in the present application. The elevated conveyor system uses components common with the surface-mounted counterpart, but may also include a partial enclosure for any conveyor track to prevent dripping of lubricants or oils from the conveyor track or tow chain. In one embodiment, the elevated conveyor system comprises a set of conveyor track suspended or elevated by pylons, pillars, or other structures, a drive assembly, an accumulator, a load carrier turning mechanism, and a set of hanging load carriers.

Figure 32B:
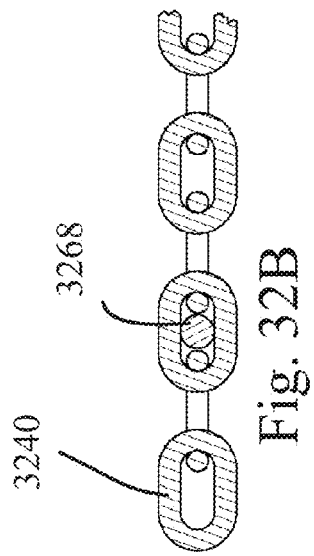
FIGS. 32A-32C depict various views of an embodiment of a pin assembly and a tow chain according to the present invention.
Figure 32C:
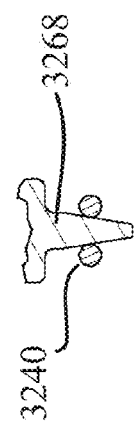
Figure 32A:
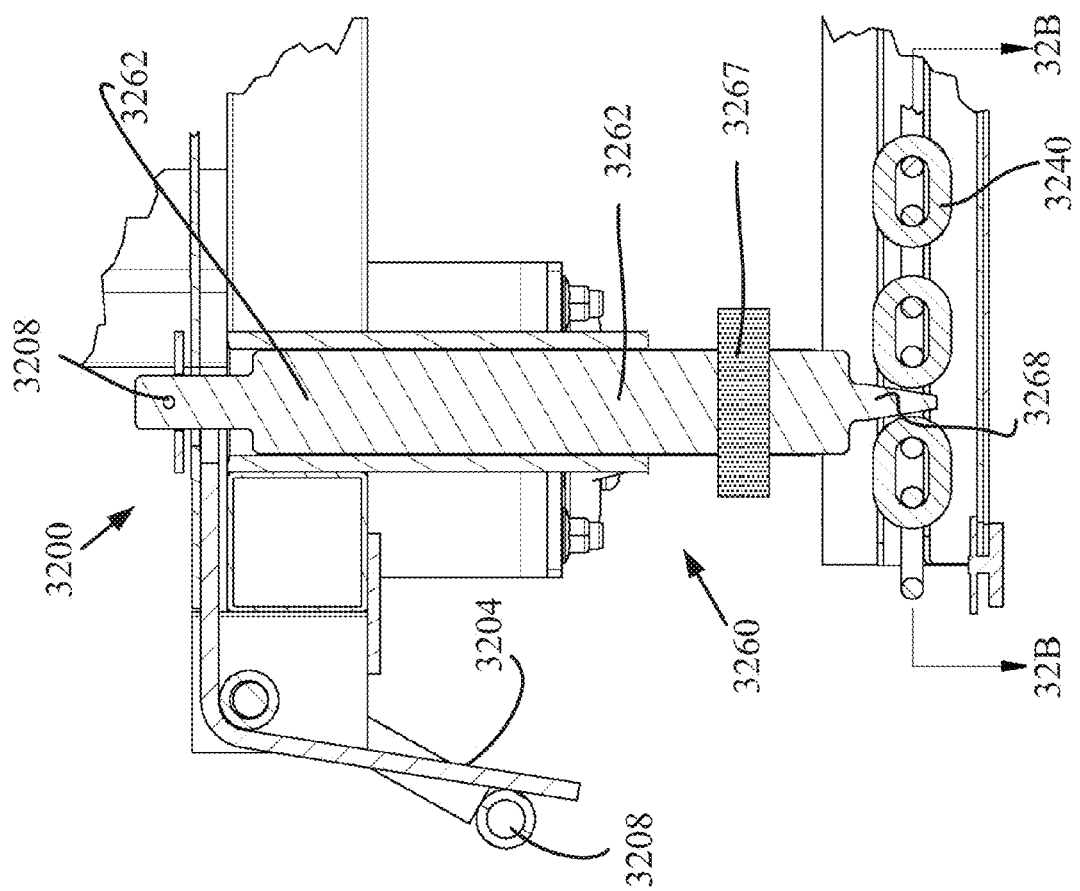

FIG. 32A shows the tow-pin assembly 3260 of cart 3200 as it interacts with tow chain 3240. Tow-pin assembly 3260 comprises tow pin 3262 which is effectively raised and lowered into position by operation of a bumper bar 3208, which when deflected or engaged depresses lift bar 3204 whereby causing tow-pin 3262 to lift, or by an interior ramp portion 3750 as seen in FIG. 37A. Tow-pin 3262 is rotatably connected to lift bar 3204 at pivot point 3208 in such a manner that when lift bar 3204 causes tow-pin 3262 to lift, tow-pin 3262 moves perpendicularly with relation to tow chain 3240, not with respect to lift bar 3204 (i.e., the angle between lift bar 3204 and tow pin 3262 changes as tow pin 3262 raises and lowers). Tow pin point 3268 is configured such that it fits between the links of tow chain 3240 without moving laterally, but also is configured in such a way that it cannot become stuck between the chain links.

FIG. 32B is a top/bottom diagram of the tow chain 3240 receiving tow pin 3262 at tow pin point 3268. Specifically, tow pin point 3268 is shown being received by tow chain 3240. Likewise, FIG. 32C shows a side illustration of tow chain 3240 receiving tow pin point 3268 with part of the chain link removed for illustrative purposes. Tow pin point 3268 fits snugly between the edges of the chain link of tow chain 3240.

With reference now to FIGS. 33A-33C, embodiments of various cross sections of drive track 3300A, 3300B, and 3300C according to the present invention are provided. In FIG. 3A, drive track 3300A contains channel 3306A composed from UHMW material and drive chain 3304A which passes through the opening in channel 3302A. FIGS. 33B and 33C have similar arrangements but differ in the outside walls 3306B and 3306C which encompass the channels 3304B and 3306C and drive chains 3304B and 3304C respectively.

With reference now to FIG. 34, a plan view of an embodiment of a cart 3400 with a front tow pin 3460 and rear tow pin 3480 according to the present invention is provided. The cart 3400 may have a plurality of casters 3410 on which it moves. The casters may be any heavy duty casters suitable for supporting heavy weight and able to withstand prolonged use under heavy loads. The cart 3400 is moved along a drive track, such as drive track 3300A shown in FIG. 33A, by a tow chain, such as chain 3240 shown in FIG. 32A. The cart 3400 is primarily towed along the drive track by the front tow pin 3460 which engages with the drive track. The lift bar 3204 may be used to engage and disengage the front tow pin 3460 from the tow chain at accumulator stations, when the cart 3400 comes into contact with the rear of another cart, or at other work stations, etc. The rear tow pin 3480 is primarily engaged when the cart 3400 is transitioning through a drive crossover such as crossover 3106 shown in FIG. 31. The rear tow pin 3480 is engaged and disengaged from the tow chain by the cam pin/roller 3486. The cam pin/roller 3486 may be a pressed bearing cam roller. The cam pin/roller 3486 is fixedly attached to the rear tow pin 3480 and operatively engages with the outside wall of the drive track to raise and lower the rear tow pin 3480.

This engaging and disengaging may be performed by the inclined ramp portions 3832 and 3834 of the wall 3830 of the drive track as shown in FIG. 38.

The use of two tow pins, a front tow pin 3460 and a rear tow pin 3480, provides several advantages over a single tow pin configuration. In a single tow pin configuration, a cart such as cart 3400 would likely "lose center" when transitioning through a drive crossover. The loss of center is caused by the front tow pin missing a link when it transitions through the drive crossover because the tow pin is temporarily disengaged from the tow chain in the drive track. A device such as a pusher may be utilized to push the cart 3400 through the drive crossover, however, this may still cause the cart to "lose center." Even 1-2 inches lost per transition can cause significant problems in applications where carts such as cart 3400 must arrive at points in the conveyor system at specific intervals and for specific amounts of time. The use of a front tow pin 3460 and rear tow pin 3480 keeps the cart 3400 on center throughout the conveyor system and through the drive crossover. This type of drive system is a synchronous set-center endless chain drive conveyor system. The synchronous set-center endless chain drive conveyor system can keep a cart 3400 moving along the conveyor system at an exact pace. The time spent in any location along the conveyor system can have an exact time and value that will not vary during conveyor system operation.

The front tow pin 3460 and back tow pin 3480 are separated by an exact distance that is the distance from a first link in the tow chain where the front to pin 3460 engages the tow chain to a second link in the tow chain where the rear tow pin 3480 engages the tow chain. The tow pins 3460 and 3480 line up "link to link". A metal shim or other spacing apparatus may be added to the cart to move the rear tow pin 3480 to precisely line it up above the center of a link in the tow chain.

With reference now to FIG. 35, a lateral cross-section view of an embodiment of a cart 3500 with a rear tow pin 3580 according to the present invention is provided. The rear tow pin 3580 is affixed to the rear of the cart 3500. The rear tow pin 3580 provides locomotion to the cart 3500 when a front tow pin is disengaged from the tow chain 3540 and the cart 3500 is transitioning through a drive crossover. The use of the rear tow pin 3580 keeps the cart 3500 in constant engagement with the tow chain 3540. The cam pin/roller 3486 engages with the side wall 3530 of the drive track to lift the pin body 3582 and disengage the tow pin point 3588 from the tow chain 3540. The pressed bearing of the cam pin/roller 3486/3586 rolls along the wall 3530 of the drive track to provide for a low friction engagement with the wall 3530. The guide pin 3584 prevents the cam pin/roller 3486/3586 from rotating the pin body 3582 when the cart 3500 is in motion. The guide pin 3584 travels vertically along a vertically extended channel or elongated opening in the housing 3583. A bearing 3587 mounted on the pin body 3582 keeps the pin body 3582 vertically oriented and minimizes wear on the pin body 3582 by rotating whenever the bearing 3587 comes into contact with the wall 3530.

With reference now to FIG. 36, a lateral cross-section view of an embodiment of a cart 3600 with a front tow pin 3660 according to the present invention is provided. The front tow pin 3660 is mounted on the front of the cart 3600 and typically is engaged and disengaged from the tow chain 3640 by a lifting bar such as the bar 3404 shown in FIG. 34. The front tow pin 3660 comprises a tow pin body 3662, bearing 3667, pin point 3668, and pin housing 3663. The pin body 3662 moves vertically within the pin housing 3663 and the pin point 3667 engages with the tow chain 3640. The bearing 3667 mounted on the pin body 3662 keeps the pin body 3662 vertically oriented and minimizes wear on the pin body 3662 by rotating whenever the bearing 3667 comes into contact with the wall 3630. Additionally, the bearing 3667 may operatively engage with an interior disengaging assembly such as disengaging assembly 3850 as shown in FIG. 38. An inclined portion of the assembly 3850 raises the bearing 3667 and attached pin body 3662 which disengages the pin point 3668 from the tow chain 3640. The tow pin 3660 remains disengaged until the bearing 3667 slides down a declined ramp portion of the assembly 3850.

With reference now to FIGS. 37A and 37B, a lateral cross-section view of an embodiment of a cart 3700 showing the front tow pin 3760 in an engaged and disengaged state is provided. The front tow pin 3760 is shown disengaged from the tow chain 3740 in FIG. 37A. The bearing 3767 of the front tow pin 3760 is elevated by the disengaging assembly 3750. The pin point 3768 of the front tow pin 3760 is not engaged with the tow chain 3740. The disengaging assembly 3750 is mounted on the interior of the drive track wall 3730. Note however, that the drive track 3730 is shown oriented perpendicular to the typical orientation for the purpose of illustrating the interoperation of the bearing 3767 and disengaging assembly 3750. With reference now to FIG. 37B, the tow pin body 3762 of the tow pin 3760 is lowered and the pin point 3768 is engaged with the tow chain 3740. The bearing 3767 is no longer engaged with the disengaging assembly 3750. Now referring back to FIG. 7A, rear tow pin 3780 is shown disengaged from a tow chain 3740 and is in an elevated position. Typically, rear tow pin 3780 would be disengaged from the tow chain 3740 while the cart is in locomotion, however, when the front tow pin 3760 is disengaged the rear tow pin 3780 will simultaneously be engaged. To engage the rear tow pin 3780, cam pin/roller 3786 would be lowered and the pin point 3788 would engage the tow chain 3740. The guide pin 3784 would prevent the pin body 3782 from rotating while the bearing of the cam pin/roller 3786 rotates along the drive track wall 3730. The bearing 3787 prevents unnecessary and undue wear between the rear tow pin 3780 and the drive track wall 3730.

With reference now to FIG. 38, a plan view of an embodiment of a drive transition assembly 3800 comprising a crossover 3806 and drive track portion 3830 according to the present invention is provided. A two chain 3840 feeds through the drive track 3830 and around the guide wheels 3805 into and out of a conveyor system drive such as the drive assembly 3100 shown in FIG. 31. The drive track 3830 comprises a declining ramp portion 3832, recessed portion 3834, and inclining ramp portion 3836. A disengaging assembly 3850 comprises an inclined ramp portion 3852, elevated portion 3854, and declining portion 3856 and is mounted on the interior of the wall 3807 of the crossover 3806. In operation, a cart with a front tow pin 3860 and a rear tow pin 3880 is pulled along the drive track 3830 by a tow chain 3840. When the front tow pin 3860 reaches the inclined ramp portion 3852 of the disengaging assembly 3850, the rear tow pin simultaneously reaches the declining ramp portion 3832 of the drive track 3830. The distance between the pins 3890 is predetermined and set to the exact distance between the inclined ramp portion 3852 and declining ramp portion 3832. This distance 3890 is also the exact distance between two links in the tow chain 3840. The operation of engaging and disengaging the tow pins at the transition assembly 3800 can be seen in greater detail in FIG. 39.

Figure 39:
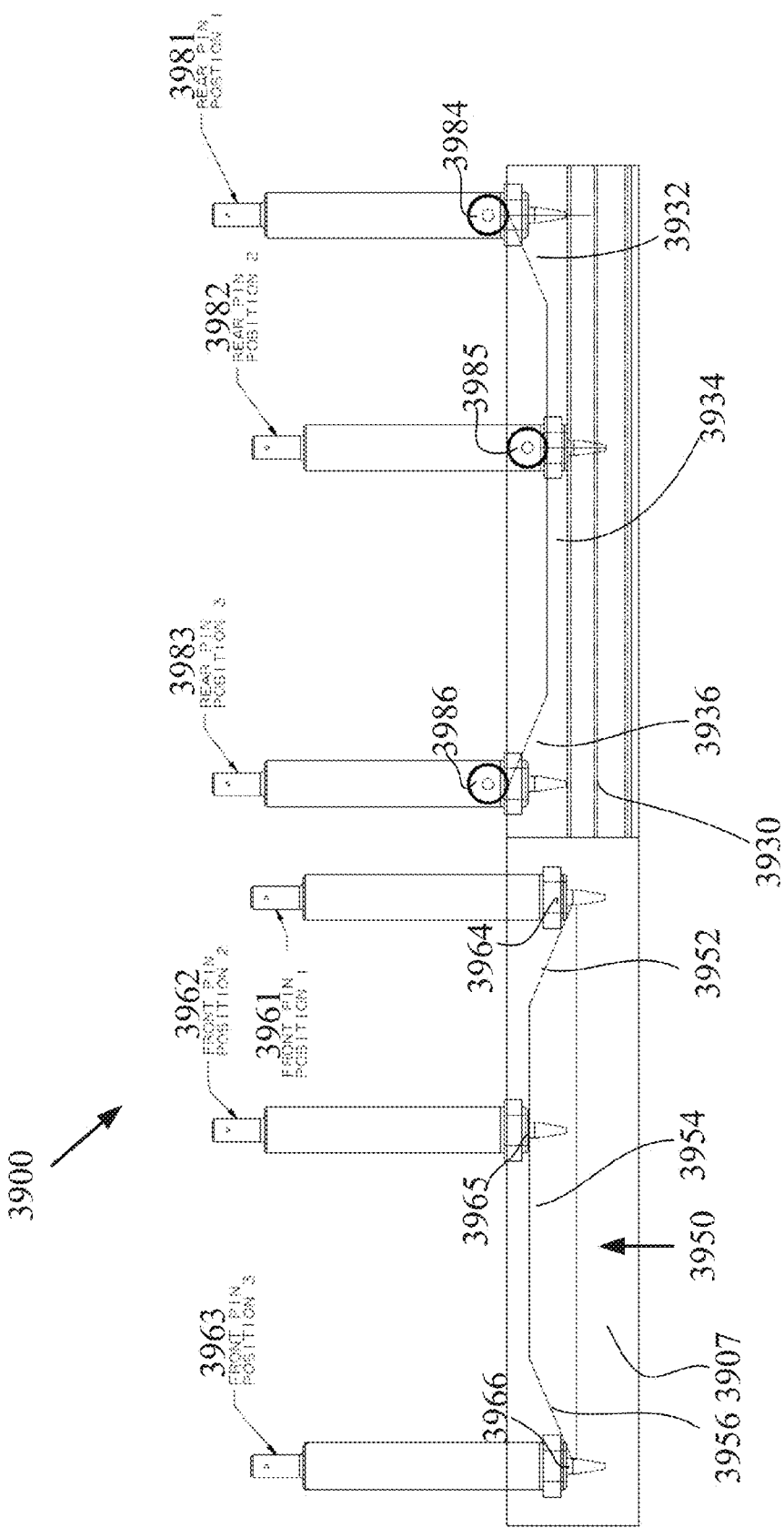

With reference now to FIG. 39, an embodiment of the operation 3900 of engaging and disengaging the front and rear tow pins of a load carrying unit according to the present invention is provided. The engaging and disengaging operation 3900 is shown in three steps. In the first step, rear pin position one 3981 with cam pin position one 3984 reaches the beginning of the declining ramp portion 3932 of the drive track 3930 at the same time front pin position one 3961 and front pin bearing 3964 reaches the inclined ramp portion 3952 of the disengaging assembly 3950 which is mounted on the interior of the wall 3907 of the drive crossover. In the second step, the rear pin position two 3982 and cam pin position two 3985 are moving along the recessed portion 3934 after having descended the declining ramp portion 3932. At the same time the rear pin position two 3982 is on the recessed portion 3934, the front pin position two 3962 is elevated from the front pin bearing position two 3965 being raised by the elevated portion 3954. In step two the front pin 3962 is simultaneously disengaged from a tow chain in the drive track 3930 while the rear pin 3982 is engaged with the tow chain. The distance between the pins is the exact distance between two links of the tow chain which is also the distance between the beginning of the inclined ramp portion 3952 and declining ramp portion 3932. In the third step, the front pin position three 3963 is lowered by the front pin bearing position three 3966 by the declining ramp portion 3956 to re-engage the tow chain at the same time the rear tow pin position three 3983 is raised by the cam pin position three 3986 along the inclined ramp portion 3936. In this manner, the pins are alternatively raised and lowered simultaneously, disengaging one pin while the other is being engaged with the tow chain.

The operation of engaging and disengaging 3900 is essential for maintaining center for a load carrying unit or cart in a conveyor system. The operation of engaging and disengaging 3900 puts the pin points of both tow pins precisely in between links of a tow chain. This prevents the system from "dropping links" and "losing center" and keeps a precise distance between any two carts in the conveyor system. In addition to the method described by the operation of engaging and disengaging 3900, both tow pins may be engaged at the same time to provide additional stability under heavy loads. In a two pin engagement configuration, automatic adjustment mechanisms utilizing springs, pneumatics, or similar adjustment mechanisms will be required to allow one or both of the tow pins to move relative to the cart as the cart traverses turns or bends in the drive track. Furthermore, one or both pins may have to be disengaged to allow a cart to traverse a bend with a high degree of arc due to the change in distance between the two points as they traverse the arc of the bend. In a two pin engagement configuration, the system will be able to support a much greater effective load on the carts or load carrying units. The effective weight limit may be increased by at least 50% over a single tow pin configuration.

With reference now to FIG. 40, a plan view of an embodiment of the take-up system 4000 according to the present invention is provided. A front spring 4030 and rear spring 4032 are mounted around a guide rod 4002. Mounting nuts 4020 and 4022 secure the threaded guide rod 4002 to a fixed mounting point of the drive system 3100 shown in FIG. 31. Front adjustment nut 4024 is threaded onto the guide rod 4002 to move the plate 4010 along the guide rod 4002 to compress the front spring 4030. The center plate 4012 is also moved along the guide rod 4002 to keep the floating chassis 3124 of the drive system 3100 centered. The front spring 4030 and rear spring 4032 work as a pair with another take-up system mounted on the opposite side of the drive system 3100 to keep the floating chassis 3124 centered on two axes and to keep tension on the tow chain. The rear adjustment nut 4026 may be used to adjust the rear limit for movement of the floating chassis 3124 and to move the chassis 3124 forward, adding slack to the tow chain and system.

With reference now to FIGS. 41-43, views of an embodiment of an in-ground drive transition assembly comprising an in ground crossover according to the present invention is provided. The system described in FIGS. 31-39 is primarily configured to work with carts or load carrying units having a side-pin configuration. In some applications, carts with a center-pin configuration are desired. For these center-pin carts, a drive crossover designed to accommodate the center pin carts in needed. With reference first to FIG. 41, a lateral cross-section view of the in-ground transition assembly 4100 comprising in-ground crossover 4150 is provided. In this embodiment, guide wheel 4102 routes a tow chain down to guide wheel 4104. The tow chain then passes beneath guide wheel 4106 and then over guide wheel 4108 to the drive track 4114. Tow chain guides may be mounted on mounting points 4116 which are attached to the interior wall of the in-ground crossover 4150. The guide wheel 4106 is mounted on guide wheel mount 4112. The cover plate 4110 provides a path for the cart wheel 4190 to pass over the in-ground crossover 4150.

With reference now to FIG. 42, a front cross-section view of the in-ground transition assembly 4200 comprising in-ground crossover 4250 is provided. The guide wheels 4202 guide the tow chain first over the guide wheels 4204 and then under the guide wheels 4206. The guide wheels 4206 are mounted on guide wheel mounts 4212. Additional tow chain guides may be mounted in the in-ground crossover 4250.

With reference now to FIG. 43, a plan view of the in-ground transition assembly 4300 is provided. For the in-ground transition assembly 4300, a tow chain would travel to and from the conveyor drive assembly by the guide wheels 4318. The tow chain would pass over the guide wheels 4308, under the guide wheels 4306, over the guide wheels 4304, around the guide wheels 4302 and then into the drive track 4320. The cover plate 4310 provides a path for a cart wheel to traverse the in-ground transition assembly 4300.

Elevated Conveyor System

FIGS. 44-47 illustrate a high-line (or "hi-line") embodiment of the present invention conveyor system.

With reference now to FIGS. 44-47, a hi-line trolley 4400 in a dual-pin set center configuration is provided. The trolley 4400 comprises the same general pin configuration as the on-surface version shown in FIGS. 31-39. However, instead of rolling along a surface, the trolley 4400 is elevated above the surface and runs in a track 4490. The track 4490 may be elevated as many as 30 feet or more above a supporting surface. A set of supporting pillars would provide the elevation to the track housing 4460 that surrounds and supports the track 4490. The track 4490 guides the leading 4420 and trailing 4410 pin assemblies along the conveyor path. The chain 4470 engages with the leading tow pin assembly 4422 and trailing tow pin assembly 4412. A trolley frame 4480 mates the leading 4420 and trailing 4410 tow pin assemblies. The control arm 4428 of the leading tow pin assembly 4420 raises and lowers the tow pin 4430 within the tow pin assembly 4422 by way of the connecting arm 4426 that joins the control arm 4428 to the tow pin body 4436. The control arm 4428 operates around the pivot point 4424.

The control arm 4428 may be raised or lowered by an actuation assembly or other mechanical means, or may engage with the plate 4414 of the trailing tow pin assembly 4410. The plate 4414 primarily will engage the control arm 4428 when a trolley 4400 is at an accumulation station or is coming into contact with another trolley at some point on the conveyor line. This may be useful for pausing the trolley 4400 at some point in an assembly process using the hi-line conveyor system. The tow pin frame housing 4427 connects to the trolley frame 4480. The tow pin assembly 4420 is guided in the track 4490 by the wheels 4434 and guide bearings 4435 that are attached to the sides and top of the tow pin assembly frame 4421. The wheels 4434 and bearing 4435 enable the trolley 4400 to travel through the track 4490 smoothly and with minimal friction. The track housing 4460 surrounds the chain 4470, chain guide 4472, trolley 4400 and track 4490.

The track housing 4460 not only provide support to the entire hi-line system, but also serves to capture any grease or other debris that may drip down from the chain 4470 or trolley 4400. The trolley 4400 would move a set of items around the conveyor system by having the items hang from the trolley 4400. In a preferred embodiment, the objects would hang on the opposite side of the track housing 4460 from any supporting pillars. The objects may hang from any suitable hanging apparatus designed to provide support and any desired movement to the object.

Accordingly, the conveyor system as described herein implemented as an elevated (or high line or "hi-line") conveyor system may comprise many of the elements of the on surface conveyor system including accumulators, turning devices, load carrying units, pushers, and one or more drive assemblies. The drive assemblies used in the elevated conveyor system may be either an elevated in-ground drive assembly such as those shown in U.S. Pat. Pub. 2013/0048472 in at least FIG. 13, or an elevated surface-mounted drive system as described in the present application. The elevated conveyor system uses components common with the surface-mounted counterpart, but may also include a partial enclosure for any conveyor track to prevent dripping of lubricants or oils from the conveyor track or tow chain. In one embodiment, the elevated conveyor system comprises a set of conveyor track suspended or elevated by pylons, pillars, or other structures, a drive assembly, an accumulator, a load carrier turning mechanism, and a set of hanging load carriers.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A conveyor system comprising:
   a conveyor track comprising a tow chain guide configured to support a conveyor tow chain and further comprising an inclined portion adapted to raise and lower a tow pin;
   a load carrying unit having a front tow pin assembly including a front tow pin configured to engage and disengage with the tow chain and a rear tow pin assembly including a rear tow pin configured to engage and disengage with the tow chain;
   a drive assembly configured to engage and propel the tow chain without the use of a separate drive chain, the drive assembly comprising:
     a floating-chassis take-up system; and
     an automatic tensioner;
   wherein the floating-chassis take-up system and automatic tensioner operate to automatically maintain a desired tension in the tow chain; and
   wherein the front tow pin is engaged and disengaged from the tow chain by an interior disengaging assembly, and the rear tow pin is engaged and disengaged from the tow chain by the inclined portion of the conveyor track.

2. The system of claim 1 wherein the floating-chassis take-up system further comprises a set of cam guides and at least one tensioning spring.

3. The system of claim 2 wherein the floating-chassis take-up system further comprises a set of guide rods.

4. The system of claim 1 wherein the floating-chassis take-up system comprises a means for tensioning selected from the group consisting of: a set of springs; a set of hydraulic tensioners; a set of pneumatic tensioners; and a set of air-over-oil tensioners.

5. The system of claim 1 wherein the drive assembly further comprises a variable speed motor.

6. The system of claim 1 further comprising an accumulation assembly for accumulating a plurality of load carrying units.

7. The system of claim 1 further comprising a turning assembly for rotating an upper portion of the at least one load carrying unit.

8. The system of claim 1 further comprising a drive transition configured to direct the tow chain into the drive assembly, the drive transition being mounted along a plane other than a plane of the drive assembly.

9. The system of claim 1 further comprising a cam pin/roller rotatably mounted to the rear tow pin assembly for engaging the inclined portion to raise and lower the rear tow pin.

10. The system of claim 1 further comprising a housing surrounding in part the rear tow pin assembly and a guide pin fixably connected to the rear tow pin and configured to travel vertically along a vertically extended channel formed in the housing.

11. A conveyor system comprising:
    an elevated conveyor track comprising a tow chain guide configured to support a conveyor tow chain and further comprising an inclined portion adapted to raise and lower a tow pin;
    a hanging load carrying unit having a front tow pin assembly including a front tow pin configured to engage and disengage with the tow chain and a rear tow pin assembly including a rear tow pin configured to engage and disengage with the tow chain; and a drive assembly configured to engage and propel the tow chain without the use of a separate drive chain, the drive assembly comprising:
- a floating-chassis take-up system; and
- an automatic tensioner;

wherein the floating-chassis take-up system and automatic tensioner operate to automatically maintain a desired tension in the tow chain; and wherein the front tow pin is engaged and disengaged from the tow chain by an interior disengaging assembly, and the rear tow pin is engaged and disengaged from the tow chain by the inclined portion of the conveyor track.

12. The system of claim 11 wherein the elevated conveyor track includes an at least partially enclosed housing configured to retain oils and lubricants to prevent dripping during conveyor system operation.

13. The system of claim 11 further comprising an accumulation assembly for accumulating a plurality of hanging load carrying units.

14. The system of claim 11 further comprising a turning assembly for rotating a lower hanging portion of the at least one hanging load carrying unit.

15. The system of claim 11 further comprising a cam pin/roller rotatably mounted to the rear tow pin assembly for engaging the inclined portion to raise and lower the rear tow pin.

16. The system of claim 11 further comprising a housing surrounding in part the rear tow pin assembly and a guide pin fixably connected to the rear tow pin and configured to travel vertically along a vertically extended channel formed in the housing.

* * * * *